US009902370B2

United States Patent
Haga et al.

(10) Patent No.: US 9,902,370 B2
(45) Date of Patent: *Feb. 27, 2018

(54) METHOD FOR HANDLING TRANSMISSION OF FRAUDULENT FRAMES WITHIN IN-VEHICLE NETWORK

(71) Applicant: PANASONIC INTELLECTUAL PROPERTY CORPORATION OF AMERICA, Torrance, CA (US)

(72) Inventors: Tomoyuki Haga, Nara (JP); Hideki Matsushima, Osaka (JP); Manabu Maeda, Osaka (JP); Yuji Unagami, Osaka (JP); Yoshihiro Ujiie, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,007

(22) Filed: Jun. 28, 2017

(65) Prior Publication Data
US 2017/0361808 A1   Dec. 21, 2017

Related U.S. Application Data

(63) Continuation of application No. 15/183,443, filed on Jun. 15, 2016, now Pat. No. 9,725,073, which is a (Continued)

(30) Foreign Application Priority Data

Feb. 20, 2015  (JP) .................................. 2015-032008

(51) Int. Cl.
*B60R 25/10* (2013.01)
*B60R 25/30* (2013.01)
(Continued)

(52) U.S. Cl.
CPC .......... *B60R 25/307* (2013.01); *H04L 9/0891* (2013.01); *H04L 9/3242* (2013.01);
(Continued)

(58) Field of Classification Search
CPC combination set(s) only.
See application file for complete search history.

(56) References Cited

U.S. PATENT DOCUMENTS 6,525,643 B1 * 2/2003 Okada .................... B60R 25/24
340/426.1
9,725,073 B2 * 8/2017 Haga .................... B60R 25/307
(Continued)

FOREIGN PATENT DOCUMENTS

| JP | 2004-348274 | 12/2004 |
|----|-------------|---------|
| JP | 2013-098719 | 5/2013  |
| WO | 2007/032488 | 3/2007  |

OTHER PUBLICATIONS

International Search Report of PCT application No. PCT/JP2015/002163 dated Jun. 30, 2015.
(Continued)

*Primary Examiner* — Travis Hunnings
(74) *Attorney, Agent, or Firm* — Greenblum & Bernstein, P.L.C.

(57) ABSTRACT

An anti-fraud method for use in an in-vehicle network system including a plurality of electronic control units that exchange data frames, each having added thereto a message authentication code (MAC), via a bus includes receiving a data frame transmitted on the bus, and generating a first MAC by using a MAC key and a value of a counter that counts a number of times a data frame having added thereto a MAC is transmitted. The method also includes performing verification that the data frame received has added thereto the generated first MAC and incrementing a number of error occurrences when the verification has failed for the data
(Continued)

[FIG. 1 OVERALL CONFIGURATION OF IN-VEHICLE NETWORK SYSTEM 10]

frame, the data frame including a predetermined message ID. When the number of error occurrences exceeds a predetermined threshold, a process associated in advance with the predetermined message ID is executed.

13 Claims, 46 Drawing Sheets

Related U.S. Application Data continuation of application No. PCT/JP2015/002163, filed on Apr. 21, 2015.

(60) Provisional application No. 61/990,340, filed on May 8, 2014.

(51) Int. Cl.
    *H04L 9/08*     (2006.01)
    *H04L 9/32*     (2006.01)
    *H04L 29/08*     (2006.01)

(52) U.S. Cl.
    CPC ........ *H04L 67/12* (2013.01); *B60R 2325/108* (2013.01); *H04L 2209/84* (2013.01)

(56) References Cited

U.S. PATENT DOCUMENTS

2008/0288137 A1    11/2008  Hatta
2014/0310530 A1*  10/2014  Oguma ................. H04L 9/3242
                                                                      713/181
2016/0264071 A1*   9/2016  Ujiie ..................... B60R 16/023

OTHER PUBLICATIONS

Chung-Wei Lin et al., "Cyber-Security for the Controller Area Network(CAN) Communication Protocol" SCIENCE, vol. 1, No. 2, 2012.

CAN Specification Version 2.0, 1991, [online] CAN in Automation(CiA), [searched on Nov. 14, 2014], Internet<URL:http://www.can-cia.org/fileadmin/cia/specifications/CAN20A.pdf>.

H. Krawczyk et al., "HMAC: Keyed-Hashing for Message Authentication" Network Working Group, RFC2104, Feb. 1997.

* cited by examiner

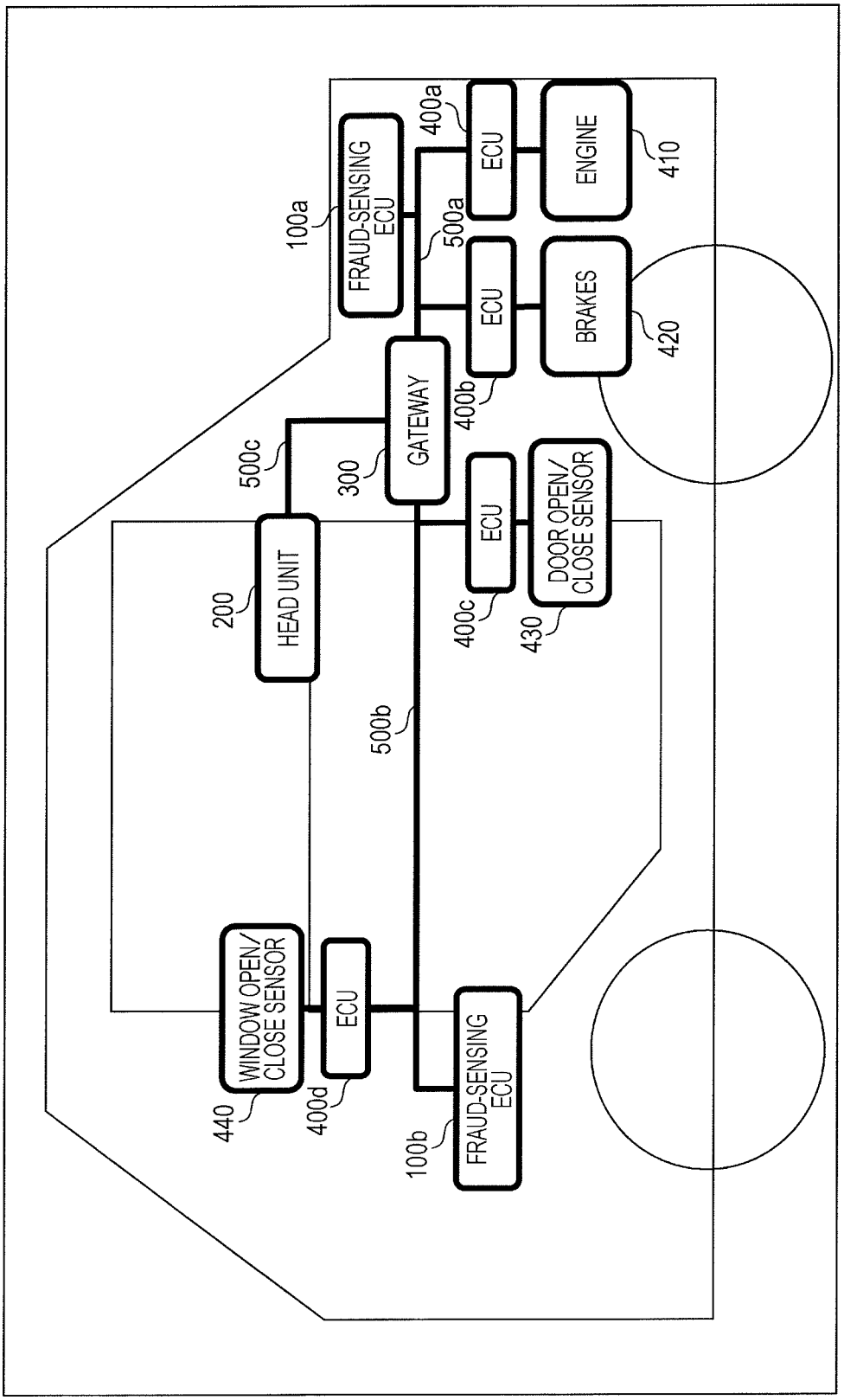

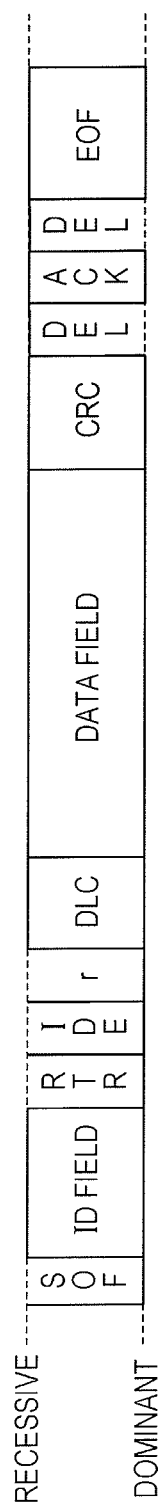
[FIG. 2 DATA FRAME FORMAT]

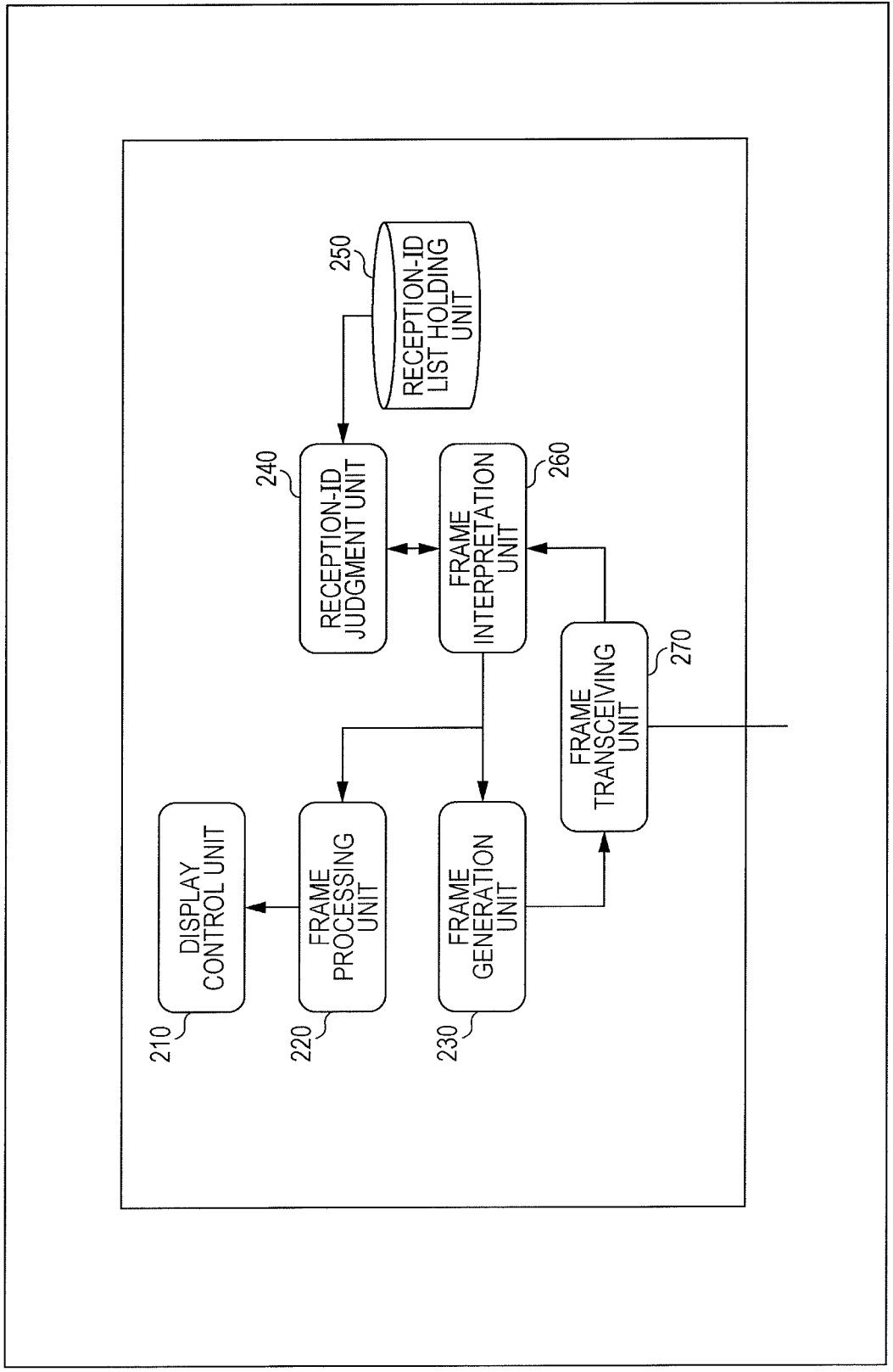
[FIG. 4 CONFIGURATION DIAGRAM OF HEAD UNIT 200]

[FIG. 5 RECEPTION-ID LIST]

| RECEPTION-ID LIST [EXPRESSED IN DECIMAL FORM] |
|---|
| 0x0001 [1] |
| 0x0002 [2] |
| 0x0003 [3] |
| 0x0004 [4] |

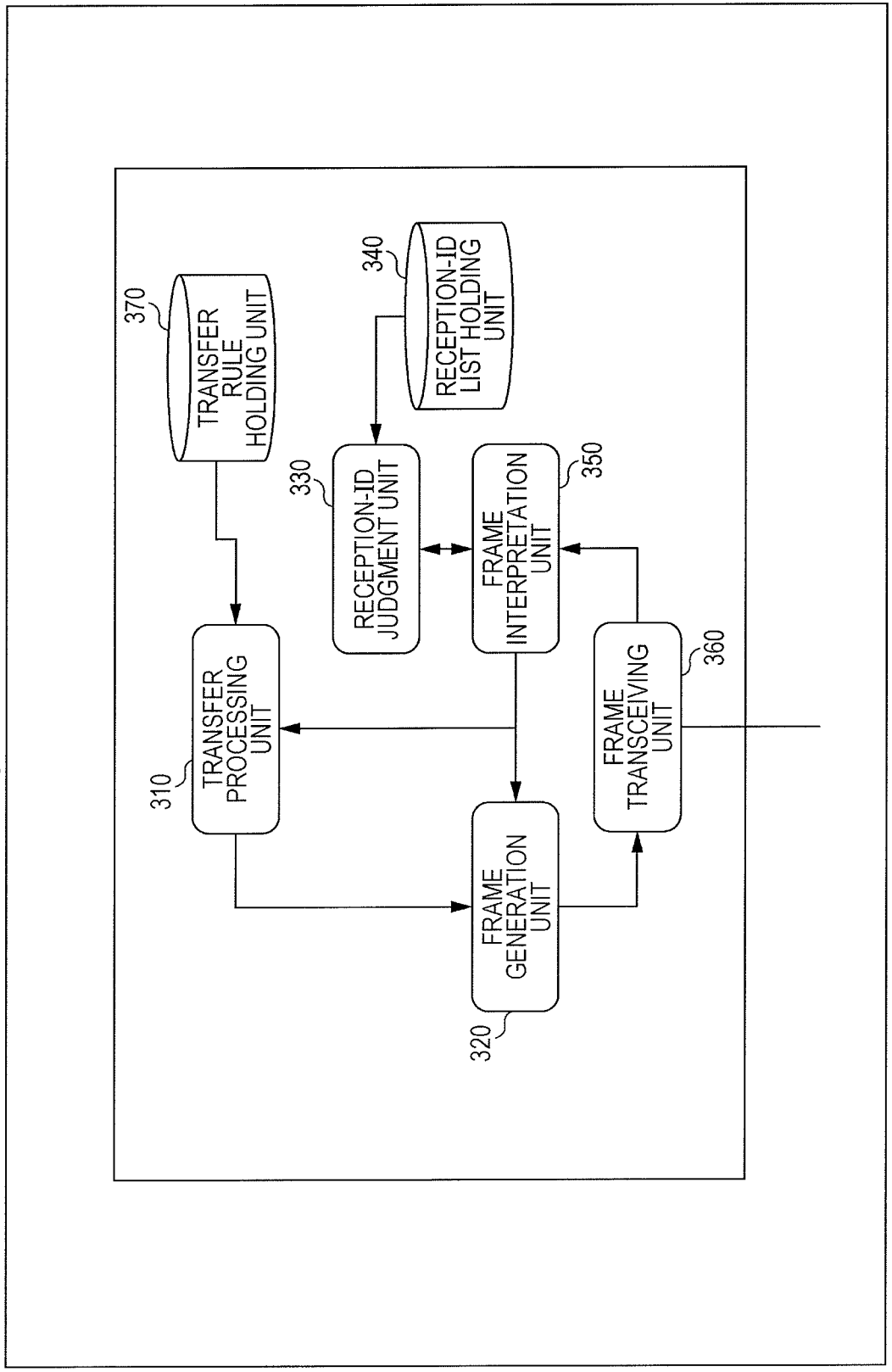

[FIG. 7 TRANSFER RULES]

| TRANSFER SOURCE | TRANSFER DESTINATION | ID [EXPRESSED IN DECIMAL FORM] |
|---|---|---|
| 500a | 500b | * |
| 500a | 500c | * |
| 500b | 500a | 0x0003[3] |
| 500b | 500c | * |
| 500c | 500a | — |
| 500c | 500b | — |

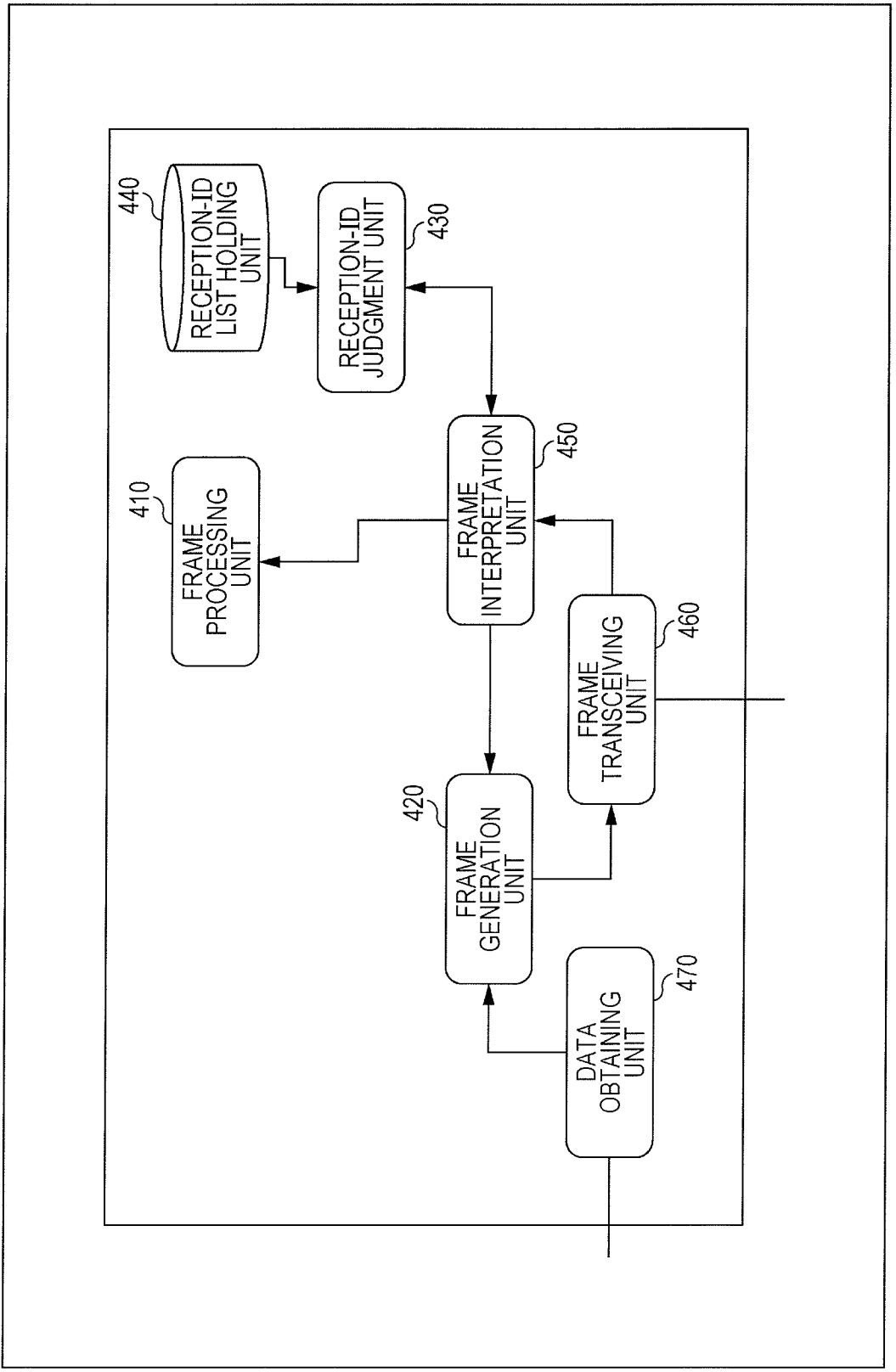

[FIG. 9 RECEPTION-ID LIST]

| RECEPTION-ID LIST [EXPRESSED IN DECIMAL FORM] |
|---|
| 0x0001[1] |
| 0x0002[2] |
| 0x0003[3] |

[FIG. 10 EXAMPLE FRAME FROM ENGINE ECU 400a]

| ID [EXPRESSED IN DECIMAL FORM] | DATA [EXPRESSED IN DECIMAL FORM] |
|---|---|
| 0x0001[1] | 0x00[0] |
| 0x0001[1] | 0x01[1] |
| 0x0001[1] | 0x02[2] |
| 0x0001[1] | 0x03[3] |
| 0x0001[1] | 0x04[4] |
| ... | ... |

[FIG. 11 EXAMPLE FRAME FROM BRAKE ECU 400b]

| ID [EXPRESSED IN DECIMAL FORM] | DATA [EXPRESSED IN DECIMAL FORM] |
|---|---|
| 0x0002[2] | 0x64[100] |
| 0x0002[2] | 0x5a[90] |
| 0x0002[2] | 0x50[80] |
| 0x0002[2] | 0x46[70] |
| 0x0002[2] | 0x3c[60] |
| ... | ... |

[FIG. 12 EXAMPLE FRAME FROM DOOR OPEN/CLOSE SENSOR ECU 400c]

| ID [EXPRESSED IN DECIMAL FORM] | DATA [EXPRESSED IN DECIMAL FORM] |
|---|---|
| 0x0003[3] | 0x01[1] |
| 0x0003[3] | 0x01[1] |
| 0x0003[3] | 0x00[0] |
| 0x0003[3] | 0x00[0] |
| 0x0003[3] | 0x00[0] |
| ... | ... |

[FIG. 13 EXAMPLE FRAME FROM WINDOW OPEN/CLOSE SENSOR ECU 400d]

| ID [EXPRESSED IN DECIMAL FORM] | DATA [EXPRESSED IN DECIMAL FORM] |
|---|---|
| 0x0004[4] | 0x00[0] |
| 0x0004[4] | 0x0a[10] |
| 0x0004[4] | 0x14[20] |
| 0x0004[4] | 0x1e[30] |
| 0x0004[4] | 0x28[40] |
| ... | ... |

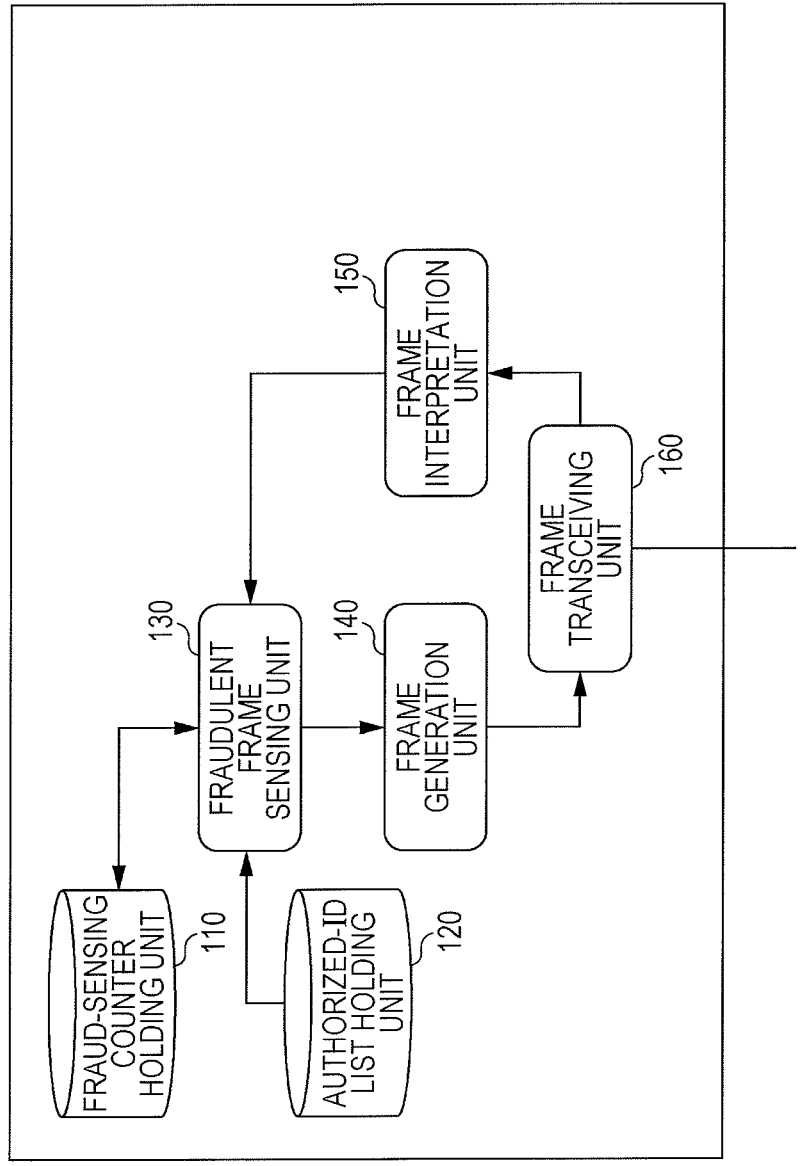

[FIG. 15 AUTHORIZED-ID LIST FORMAT]

| ID [EXPRESSED IN DECIMAL FORM] |
|---|
| 0x0001 [1] |
| 0x0002 [2] |
| 0x0003 [3] |

[FIG. 16 AUTHORIZED-ID LIST FORMAT]

| ID [EXPRESSED IN DECIMAL FORM] |
|---|
| 0x0001 [1] |
| 0x0002 [2] |
| 0x0003 [3] |
| 0x0004 [4] |

[FIG. 17 FRAUD-SENSING-COUNTER SAVING LIST]

| ID [EXPRESSED IN DECIMAL FORM] | FRAUD-SENSING COUNTER |
|---|---|
| 0x0001[1] | 0 |
| 0x0002[2] | 0 |
| 0x0003[3] | 0 |
| 0x0004[4] | 1 |
| 0x0005[5] | 0 |
| ... | ... |

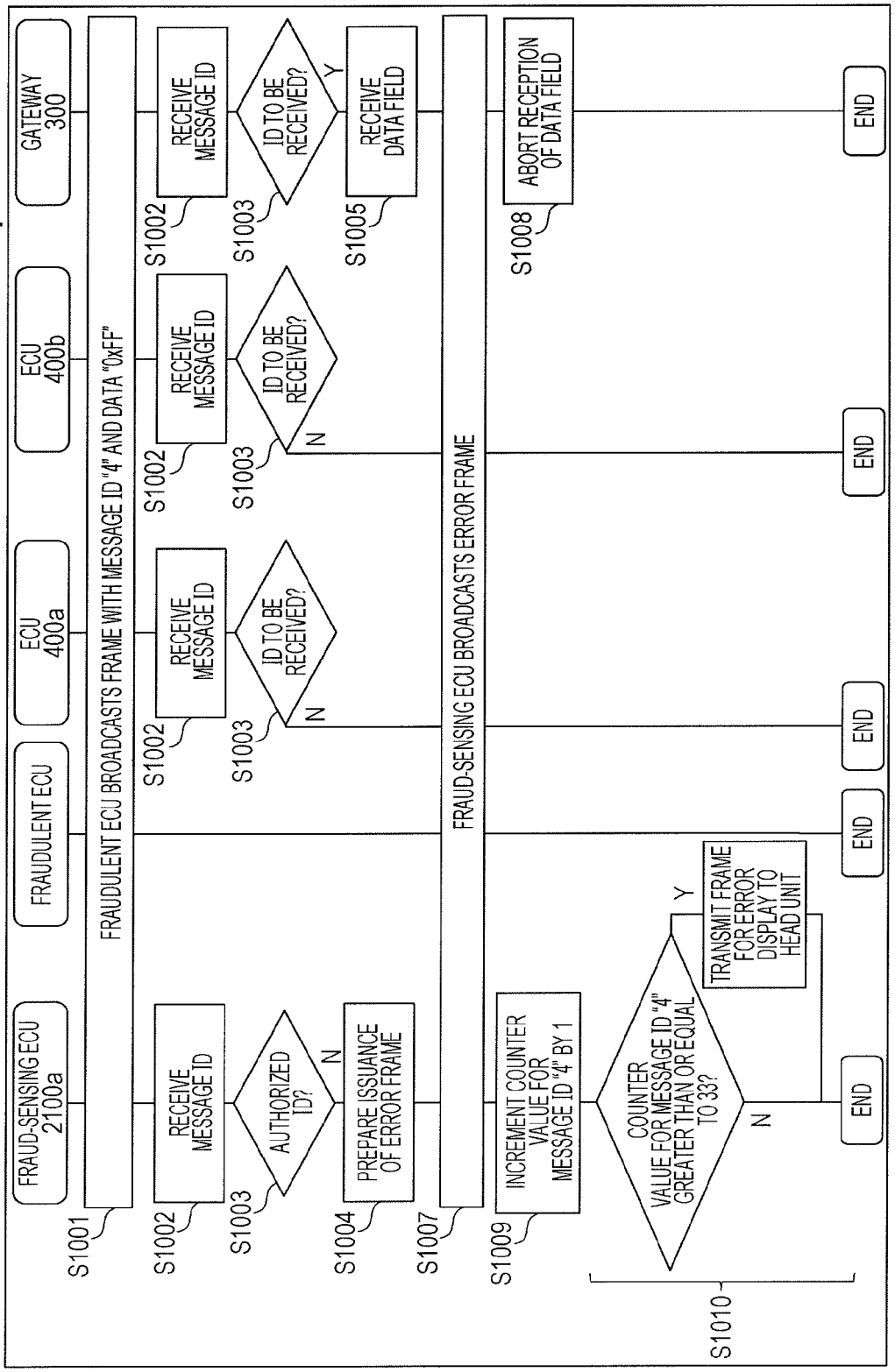

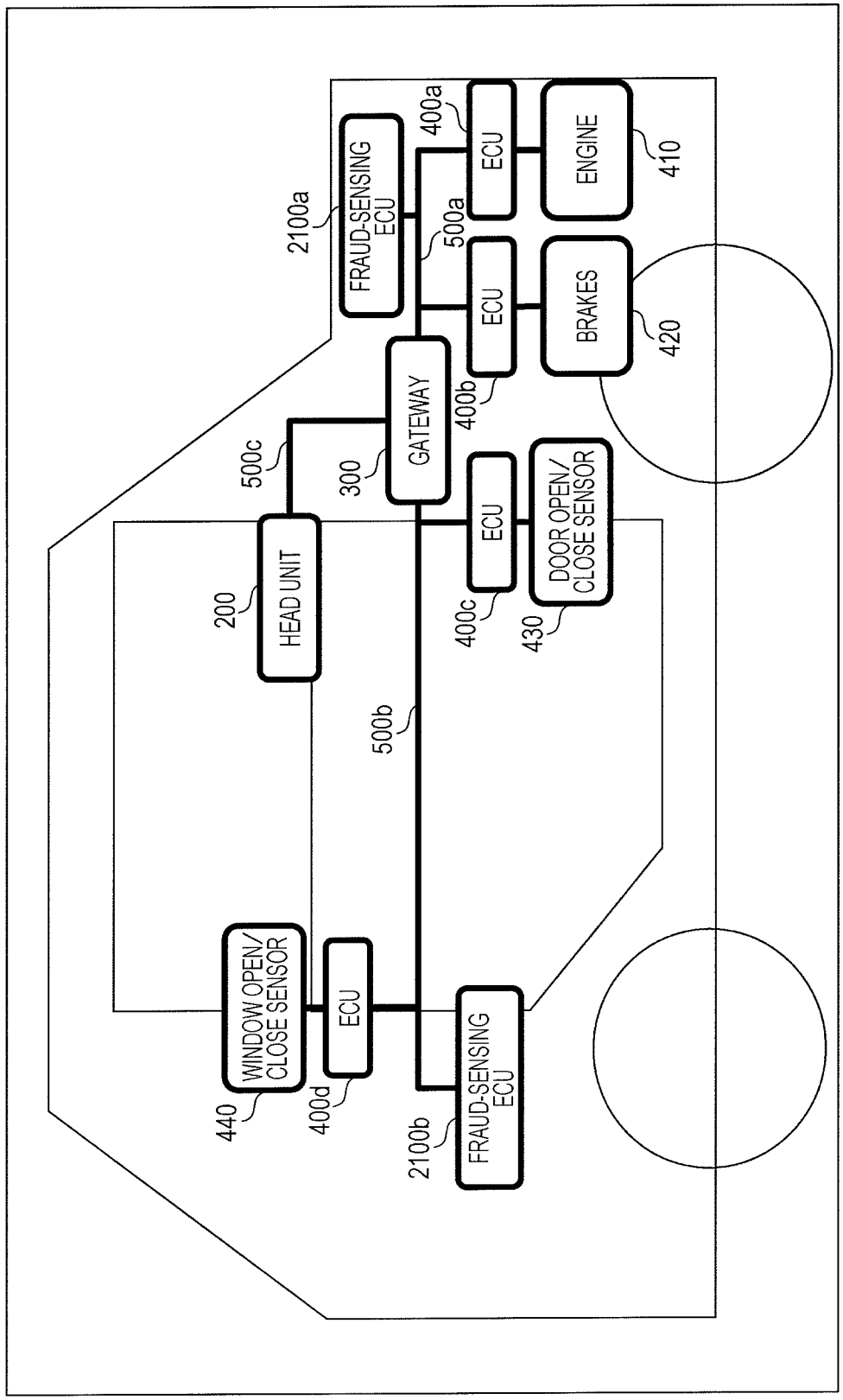

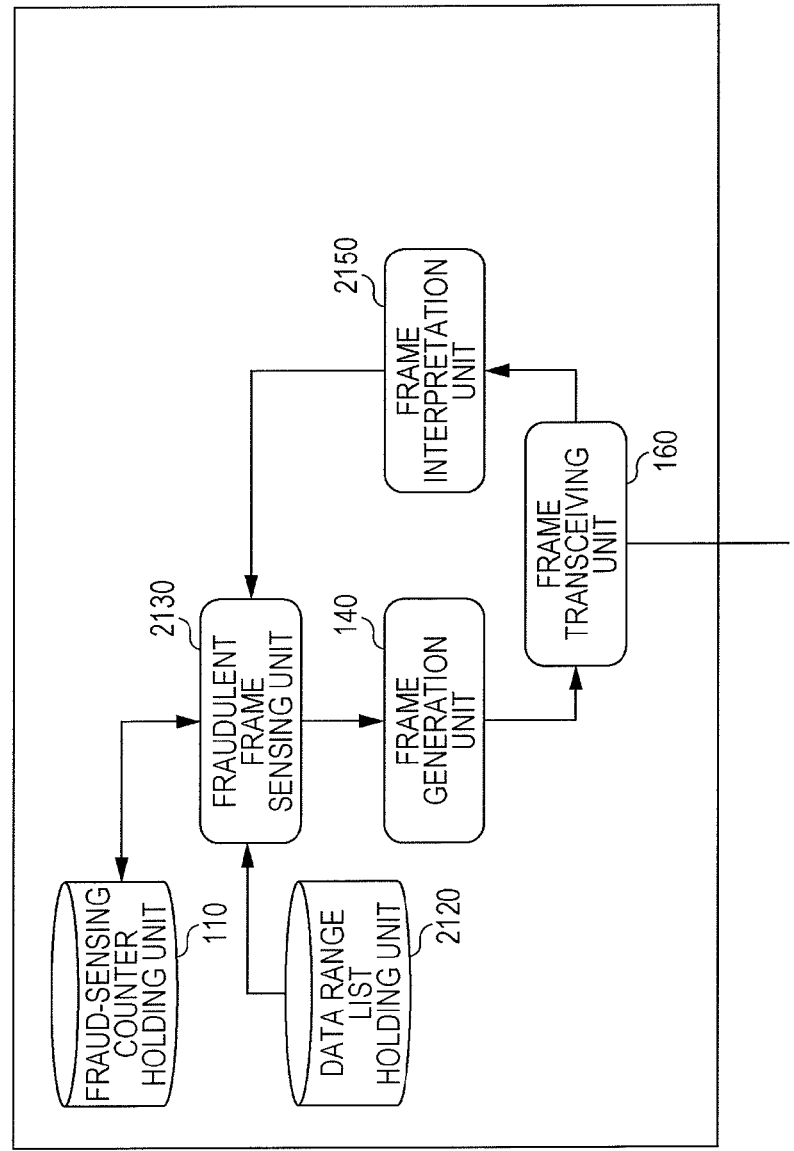
[FIG. 20 CONFIGURATION DIAGRAM OF FRAUD-SENSING ECU 2100a]

[FIG. 21] DATA RANGE LIST FORMAT

| ID [EXPRESSED IN DECIMAL FORM] | DATA RANGE |
|---|---|
| 0x0001[1] | 0 TO 180 |
| 0x0002[2] | 0 TO 100 |
| 0x0003[3] | 0, 1 |
| 0x0004[4] | 0 TO 100 |
| ... | ... |

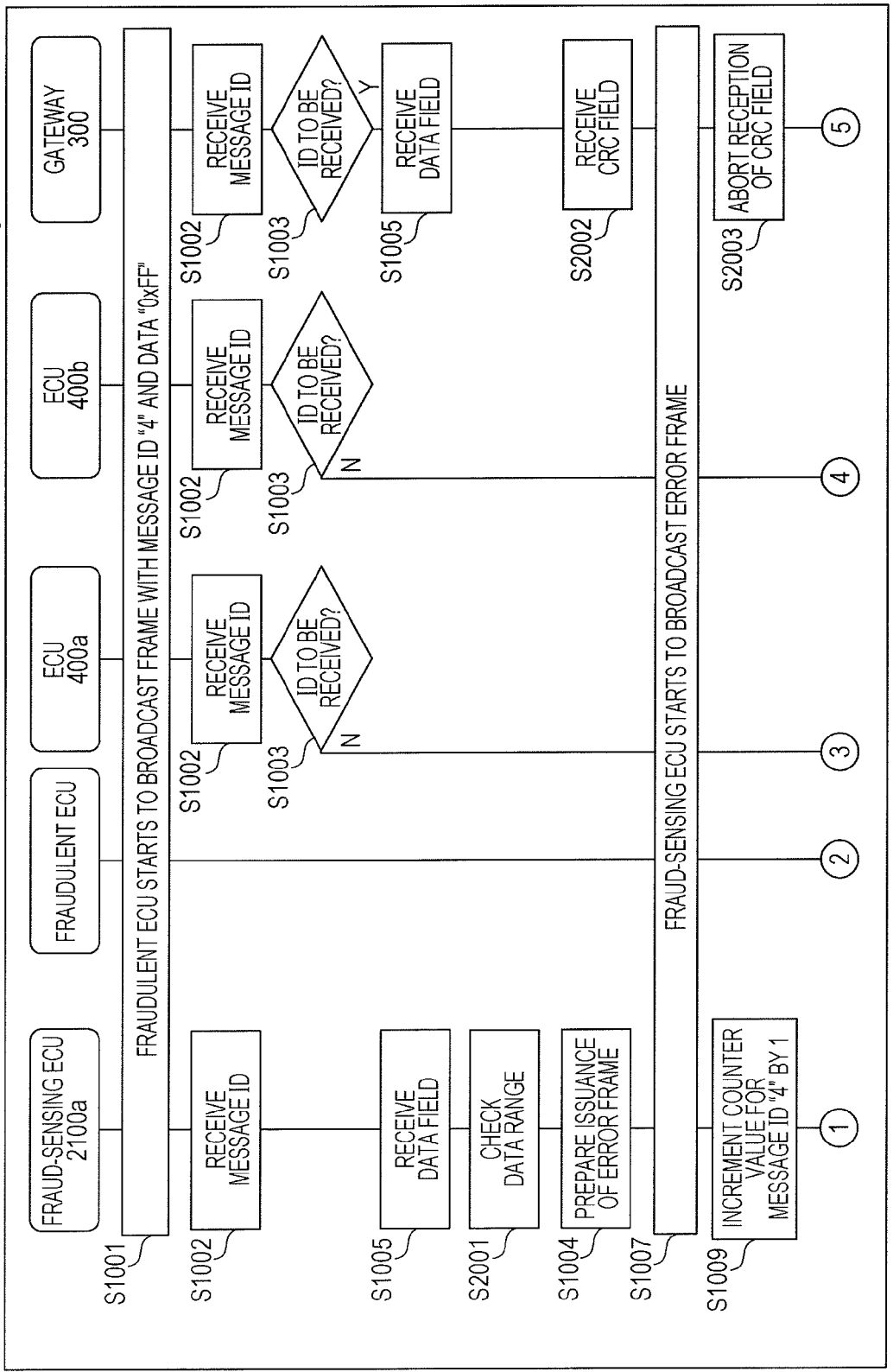

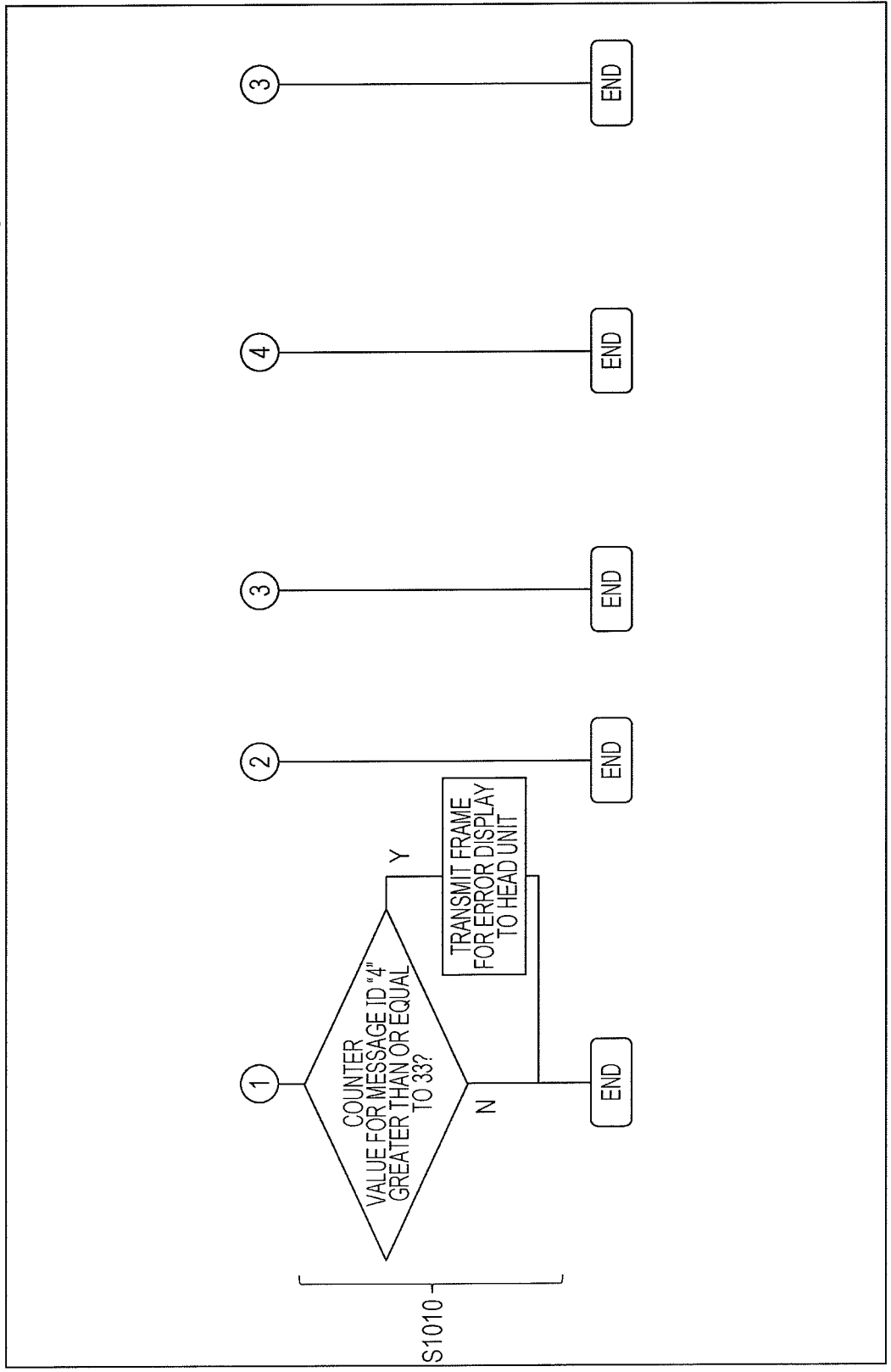

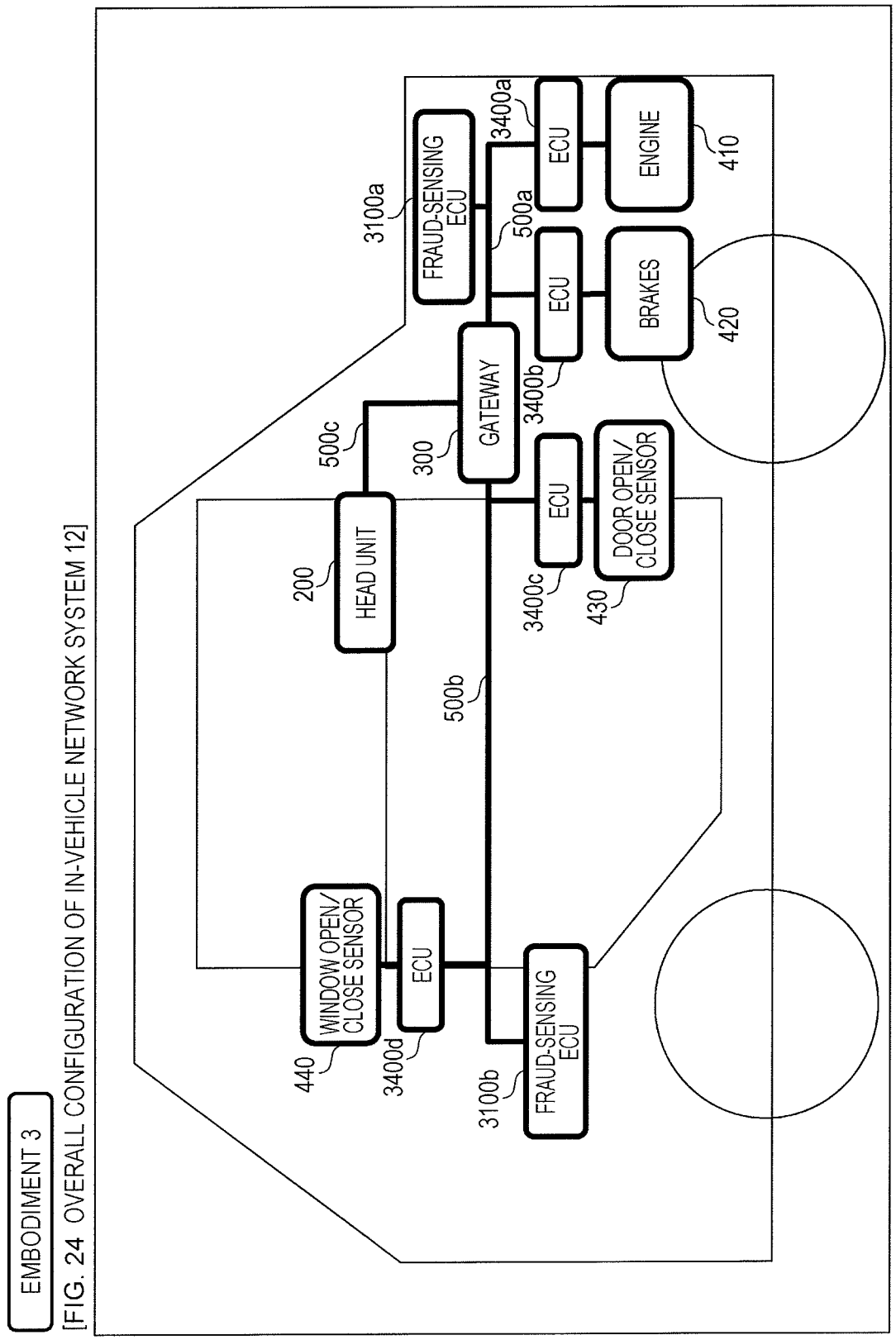
[FIG. 24 OVERALL CONFIGURATION OF IN-VEHICLE NETWORK SYSTEM 12]

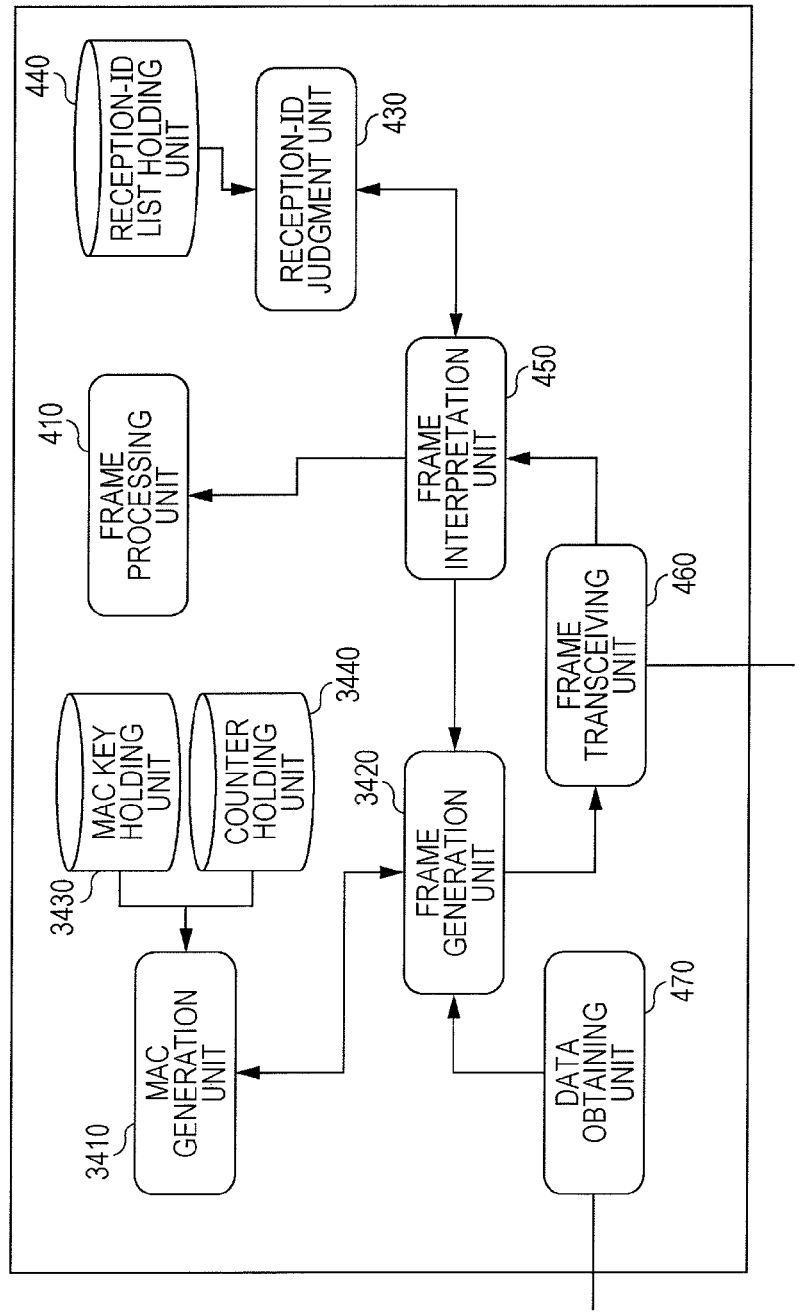
[FIG. 25 CONFIGURATION DIAGRAM OF ECU 3400a]

[FIG. 26 EXAMPLE FRAME FROM ENGINE ECU 3400a]

| ID [EXPRESSED IN DECIMAL FORM] | DATA [EXPRESSED IN DECIMAL FORM] |
|---|---|
| 0x0001[1] | 0x00[0] 00[0] 1a c4 f7 d3 |
| 0x0001[1] | 0x01[1] 01[1] f9 3b 65 9e |
| 0x0001[1] | 0x02[2] 02[2] 34 5c ef 79 |
| 0x0001[1] | 0x03[3] 03[3] 90 2a e3 dd |
| 0x0001[1] | 0x04[4] 04[4] 31 2c d5 ee |
| ... | ... |

[FIG. 27 EXAMPLE FRAME FROM BRAKE ECU 3400b]

| ID [EXPRESSED IN DECIMAL FORM] | DATA [EXPRESSED IN DECIMAL FORM] |
|---|---|
| 0x0002[2] | 0x64[100] 01[1] 34 5c ef 79 |
| 0x0002[2] | 0x5a[90] 02[2] 31 2c d5 ee |
| 0x0002[2] | 0x50[80] 03[3] 90 2a e3 dd |
| 0x0002[2] | 0x46[70] 04[4] 1a c4 f7 d3 |
| 0x0002[2] | 0x3c[60] 05[5] f9 3b 65 9e |
| ... | ... |

[FIG. 28 EXAMPLE FRAME FROM DOOR OPEN/CLOSE SENSOR ECU 3400c]

| ID [EXPRESSED IN DECIMAL FORM] | DATA [EXPRESSED IN DECIMAL FORM] |
|---|---|
| 0x0003[3] | 0x01[1] 01[1] 31 2c d5 ee |
| 0x0003[3] | 0x01[1] 02[2] 34 5c ef 79 |
| 0x0003[3] | 0x00[0] 03[3] f9 3b 65 9e |
| 0x0003[3] | 0x00[0] 04[4] 90 2a e3 dd |
| 0x0003[3] | 0x00[0] 05[5] 1a c4 f7 d3 |
| ... | ... |

[FIG. 29 EXAMPLE FRAME FROM WINDOW OPEN/CLOSE SENSOR ECU 3400d]

| ID [EXPRESSED IN DECIMAL FORM] | DATA [EXPRESSED IN DECIMAL FORM] |
|---|---|
| 0x0004[4] | 0x00[0] 01[1] 90 2a e3 dd |
| 0x0004[4] | 0x0a[10] 02[2] 31 2c d5 ee |
| 0x0004[4] | 0x14[20] 03[3] 1a c4 f7 d3 |
| 0x0004[4] | 0x1e[30] 04[4] f9 3b 65 9e |
| 0x0004[4] | 0x28[40] 05[5] 34 5c ef 79 |
| ... | ... |

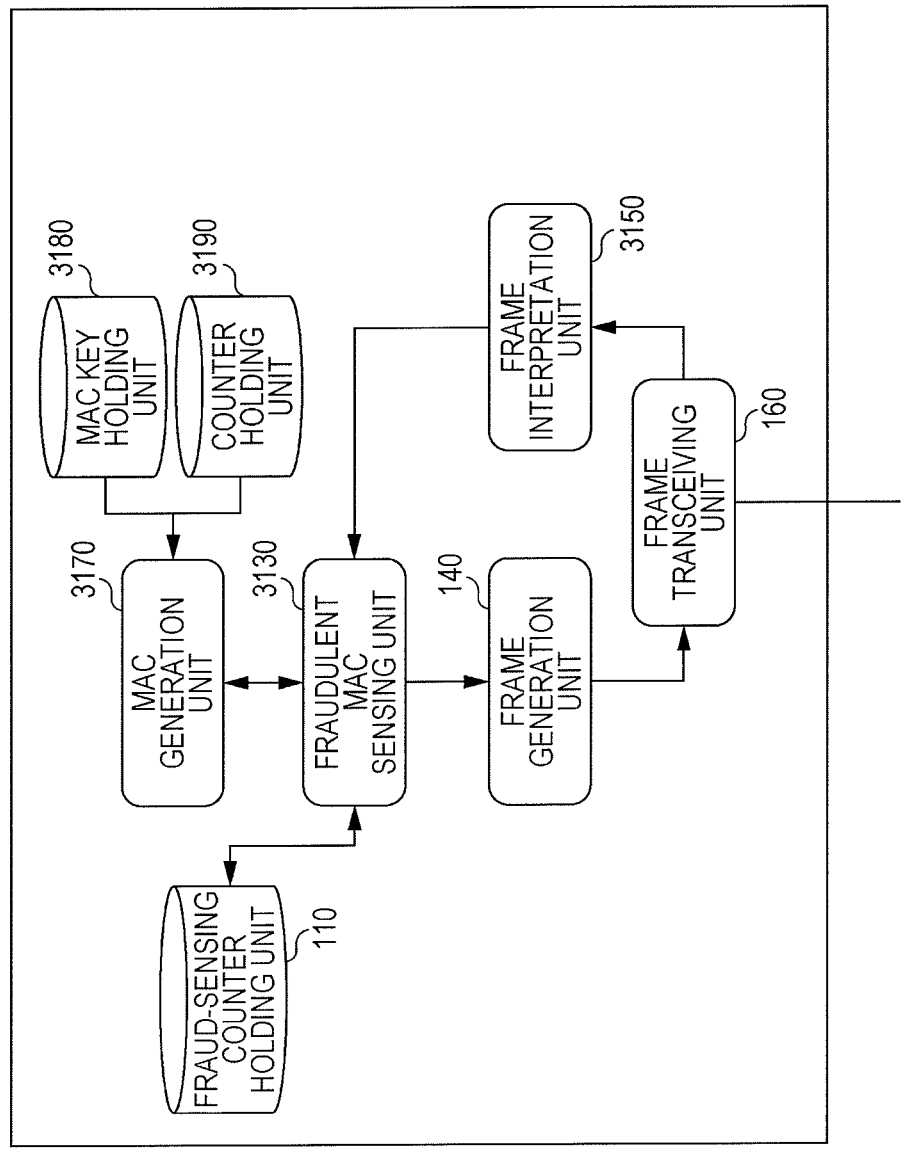
[FIG. 30 CONFIGURATION DIAGRAM OF FRAUD-SENSING ECU 3100a]

[FIG. 31 COUNTER SAVING TABLE]

| ID [EXPRESSED IN DECIMAL FORM] | COUNTER |
|---|---|
| 0x0001[1] | 1 |
| 0x0002[2] | 10 |
| 0x0003[3] | 15 |
| 0x0004[4] | 100 |
| 0x0005[5] | 0 |
| ... | ... |

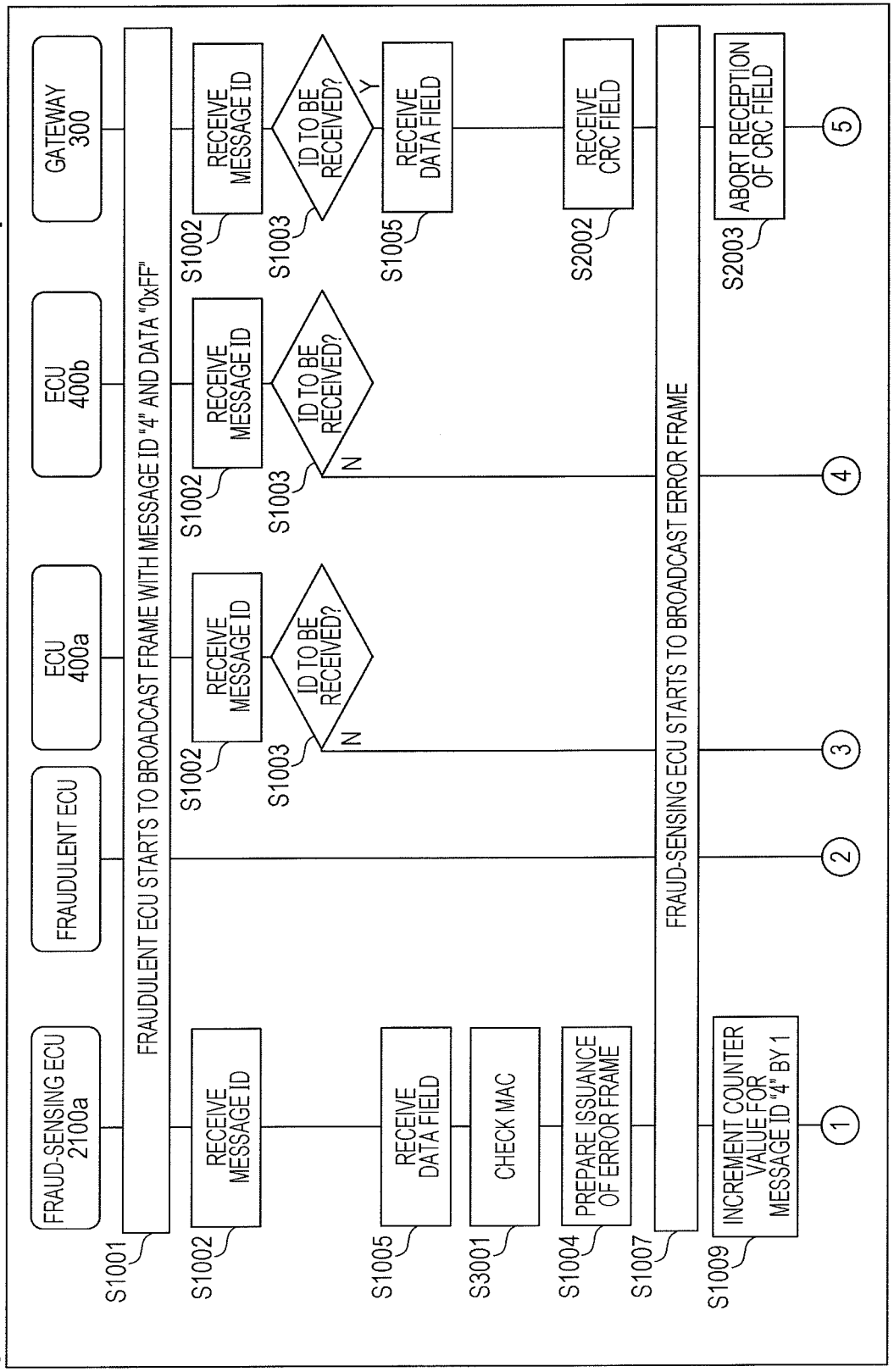

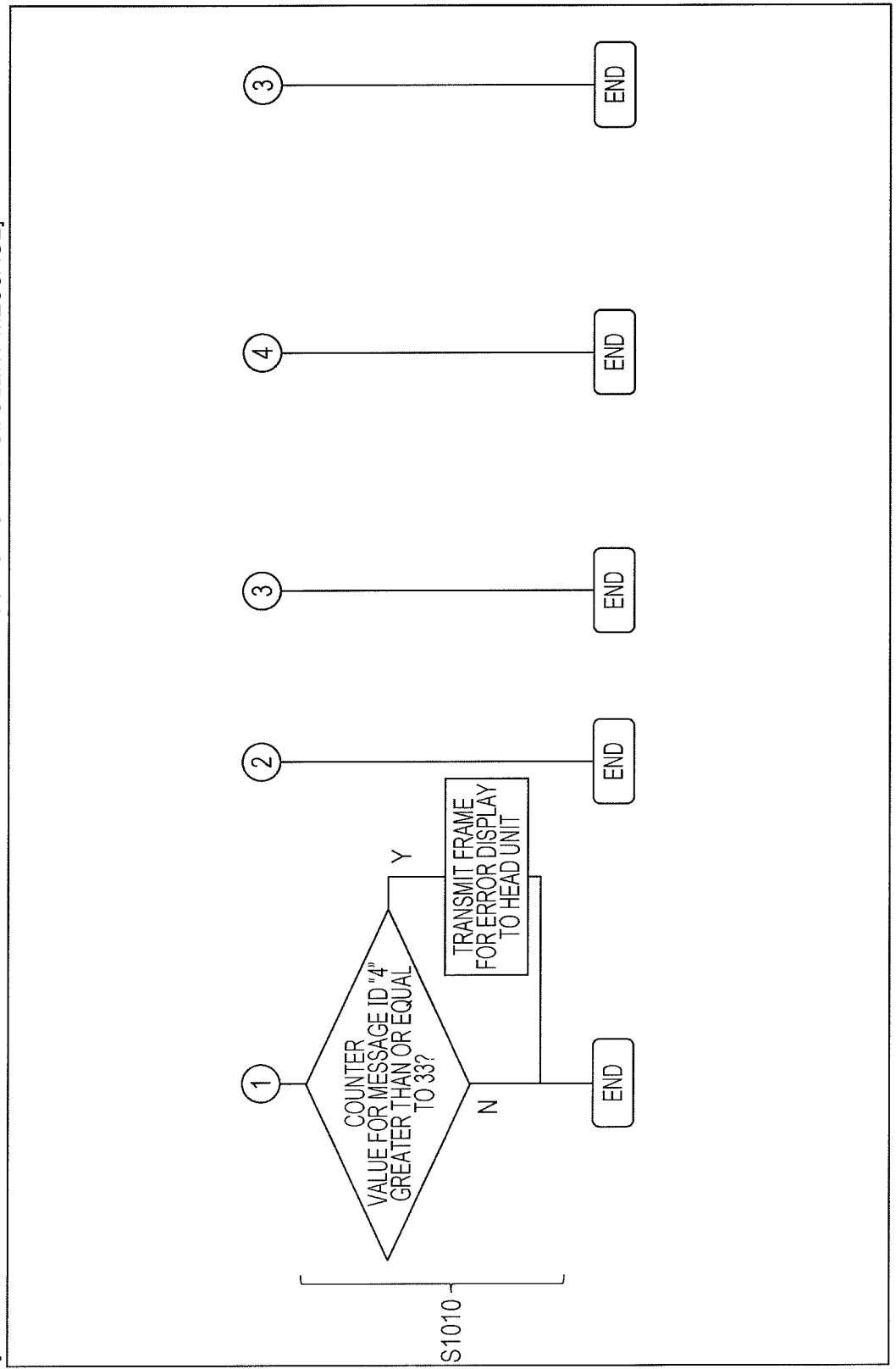

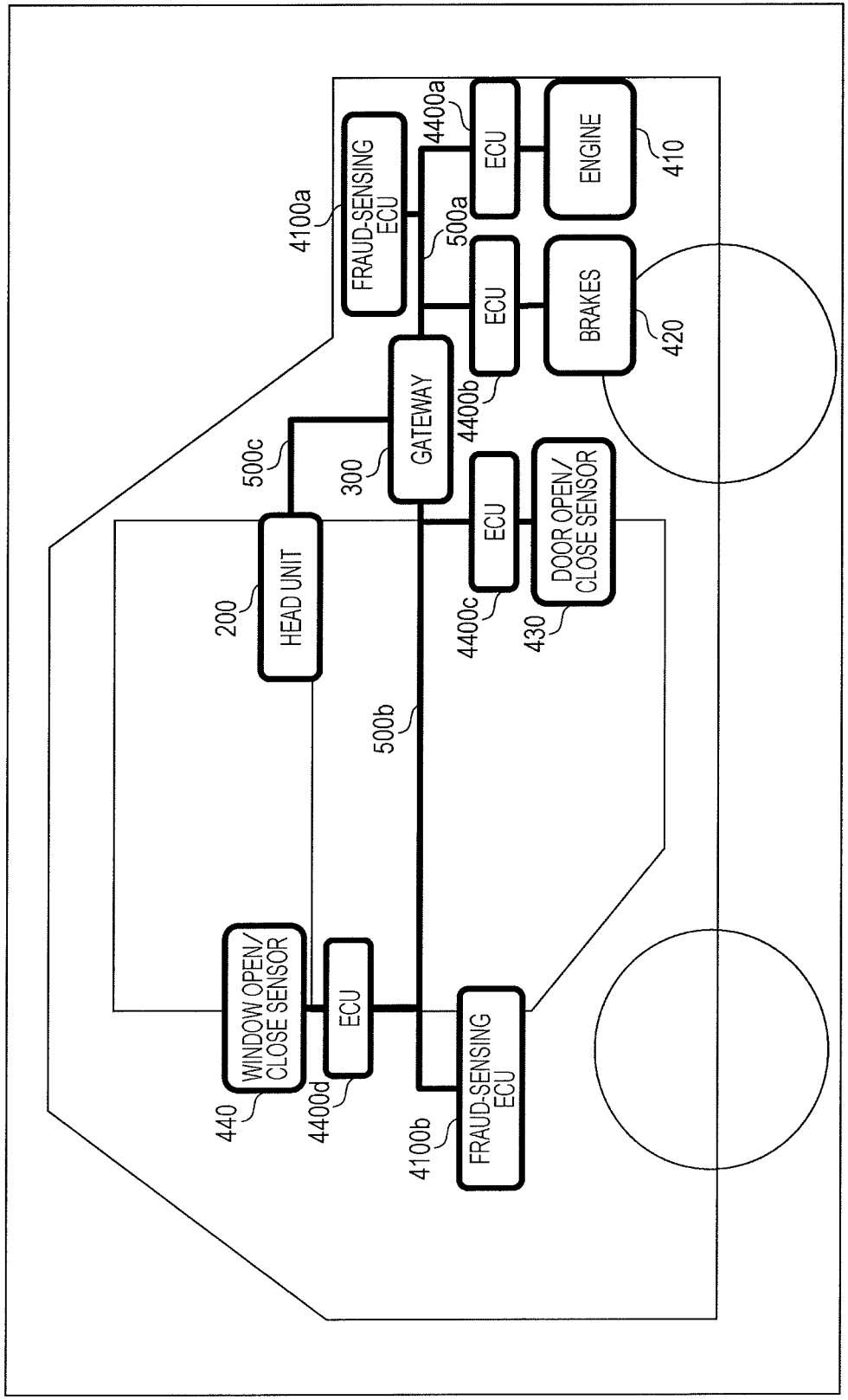

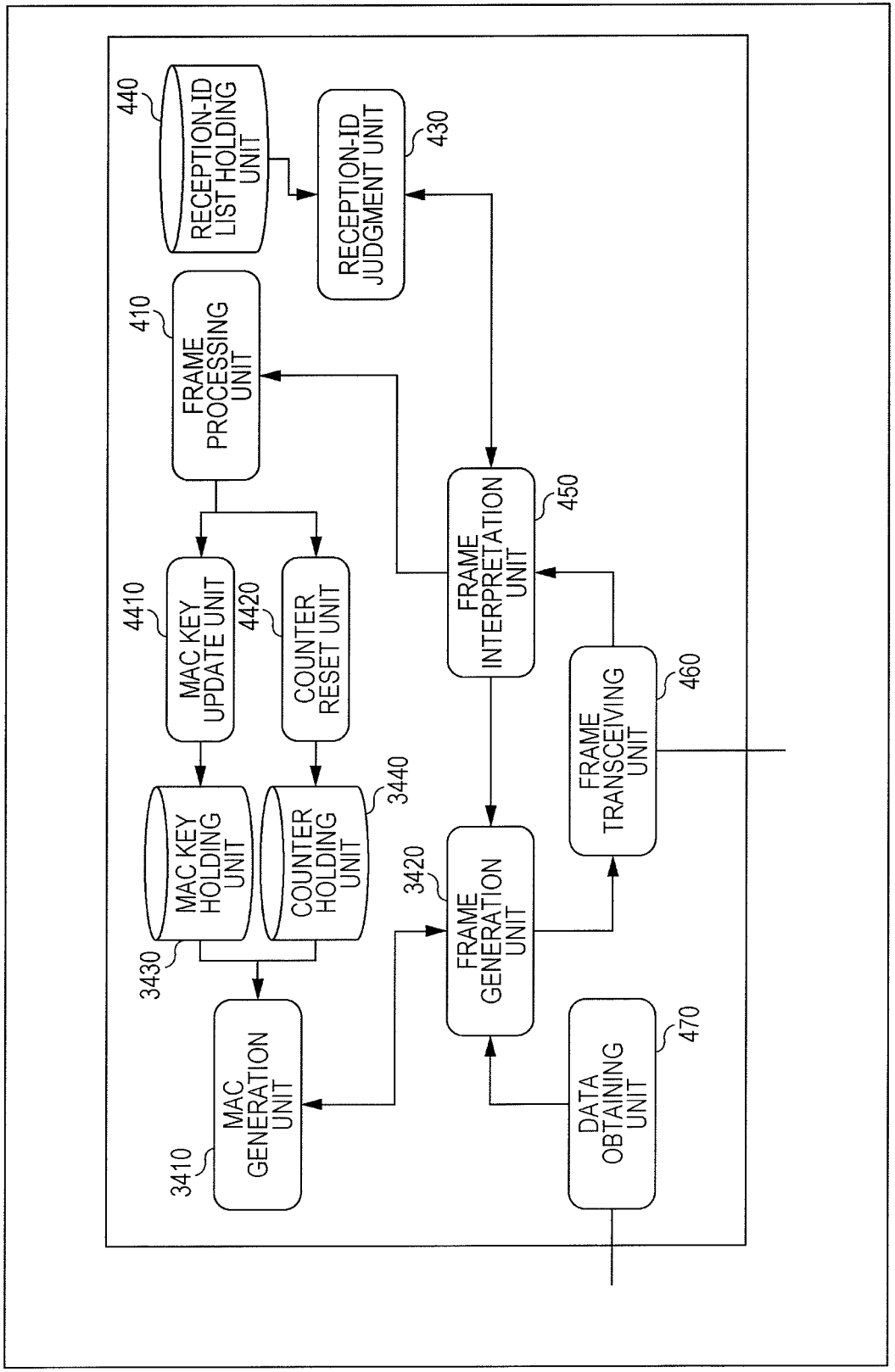

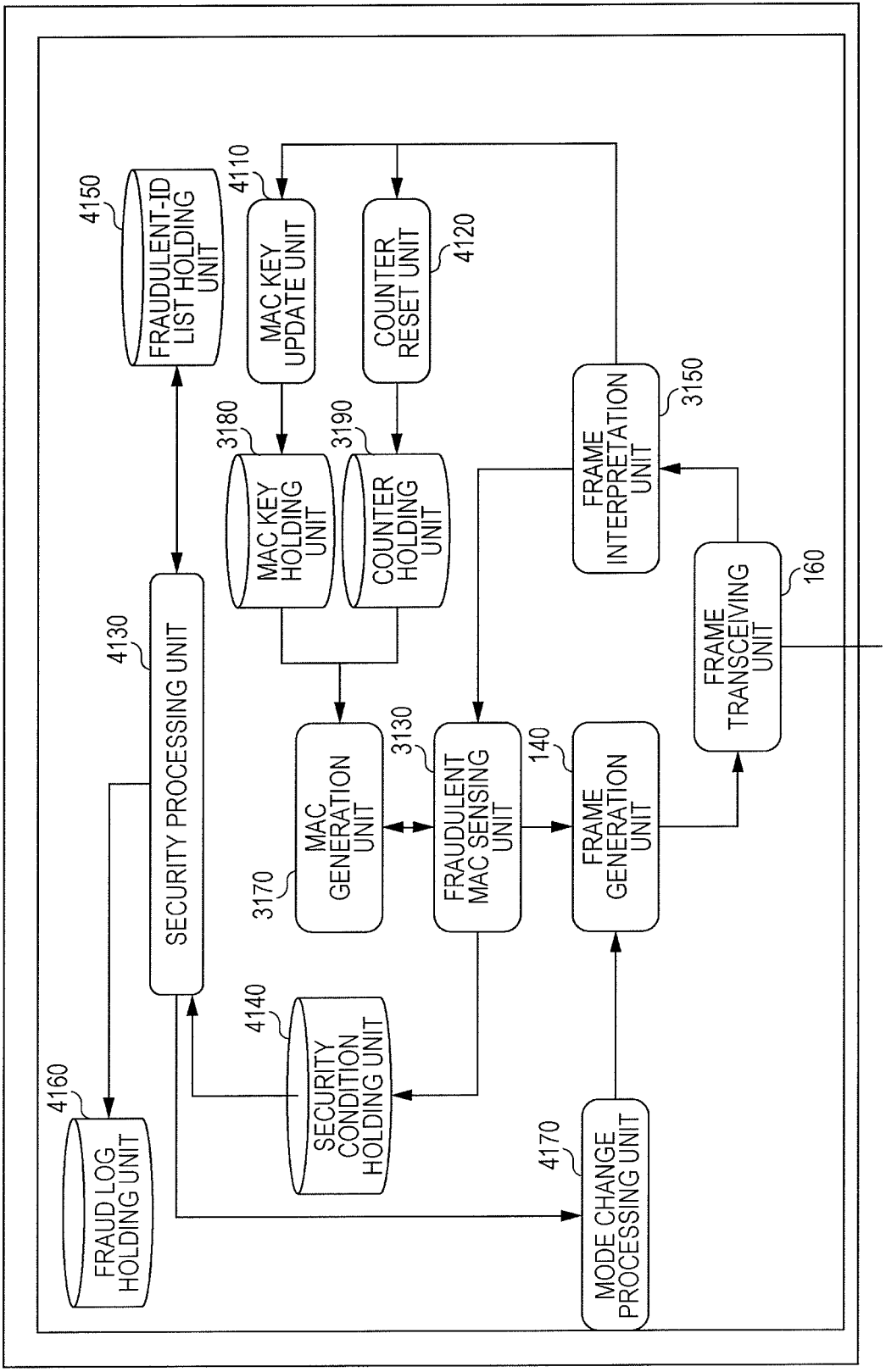
[FIG. 36 CONFIGURATION DIAGRAM OF FRAUD-SENSING ECU 4100a]

[FIG. 37 RECEPTION-ID LIST]

| RECEPTION-ID LIST [EXPRESSED IN DECIMAL FORM] |
|---|
| 0x0001[1] |
| 0x0002[2] |
| 0x0003[3] |
| 0x1000[4096] |
| 0x2000[8192] |
| 0x3000[12288] |

900

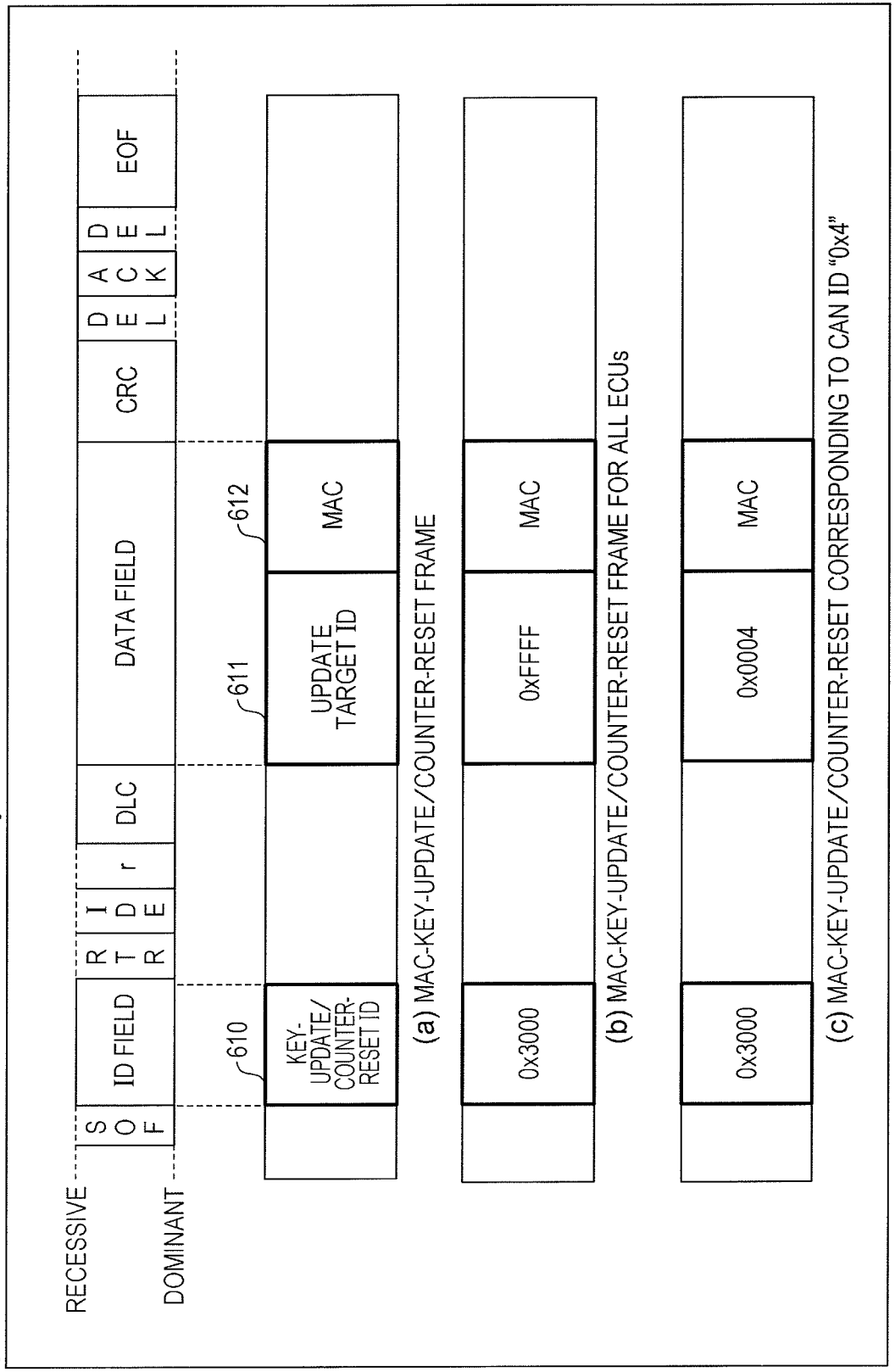

[FIG. 39 KEY TABLE IN MAC KEY HOLDING UNIT]

| KEY ID | UPDATE INFORMATION | KEY VALUE |
|---|---|---|
| 0x1[1] | BEFORE UPDATE | 0x239·····A4 |
| 0x1[1] | AFTER UPDATE | 0xC67·····26 |
| 0x2[2] | BEFORE UPDATE | 0x429·····1C |
| 0x2[2] | AFTER UPDATE | 0xB2C·····34 |
| 0x3[3] | BEFORE UPDATE | 0x976·····1D |
| 0x3[3] | AFTER UPDATE | 0xC2D·····6A |
| 0x4[4] | BEFORE UPDATE | 0x3A9·····AC |
| 0x4[4] | AFTER UPDATE | 0x8D7·····DA |

[FIG. 40 COUNTER TABLE]

| COUNTER ID [DECIMAL] | COUNTER VALUE |
|---|---|
| 0x1[1] | 0xC816A7C0 |
| 0x2[2] | 0x812937CD |
| 0x3[3] | 0xA82371AC |
| 0x4[4] | 0x23786CDA |

[FIG. 41 SECURITY CONDITION TABLE IN SECURITY CONDITION HOLDING UNIT]

| FUNCTIONAL CATEGORY | MESSAGE ID | FRAUD COUNT | FRAUD COUNT THRESHOLD | SECURITY ACTION ||||
|---|---|---|---|---|---|---|---|
| | | | | ADD TO FRAUDULENT-ID LIST | PROVIDE NOTIFICATION TO HEAD UNIT | RECORD FRAUD LOG | CHANGE MODE |
| DRIVE SYSTEM | 0x1 | 1 | 5 | ENABLED | ENABLED | ENABLED | TRANSITION TO SAFE STATE |
| CHASSIS SYSTEM | 0x2 | 2 | 5 | ENABLED | ENABLED | ENABLED | TRANSITION TO SAFE STATE |
| BODY SYSTEM | 0x3 | 3 | 10 | ENABLED | ENABLED | DISABLED | — |
| | 0x4 | 9 | | | | | |
| SAFE AND COMFORTABLE SUPPORT FUNCTION | 0x100 | 0 | 1 | ENABLED | ENABLED | ENABLED | TRANSITION TO SAFE STATE |
| ITS FUNCTION | 0x200 | 0 | 5 | ENABLED | ENABLED | ENABLED | — |
| TELEMATICS | 0x300 | 0 | 10 | ENABLED | ENABLED | ENABLED | — |
| INFOTAINMENT | 0x400 | 0 | 10 | ENABLED | ENABLED | ENABLED | — |

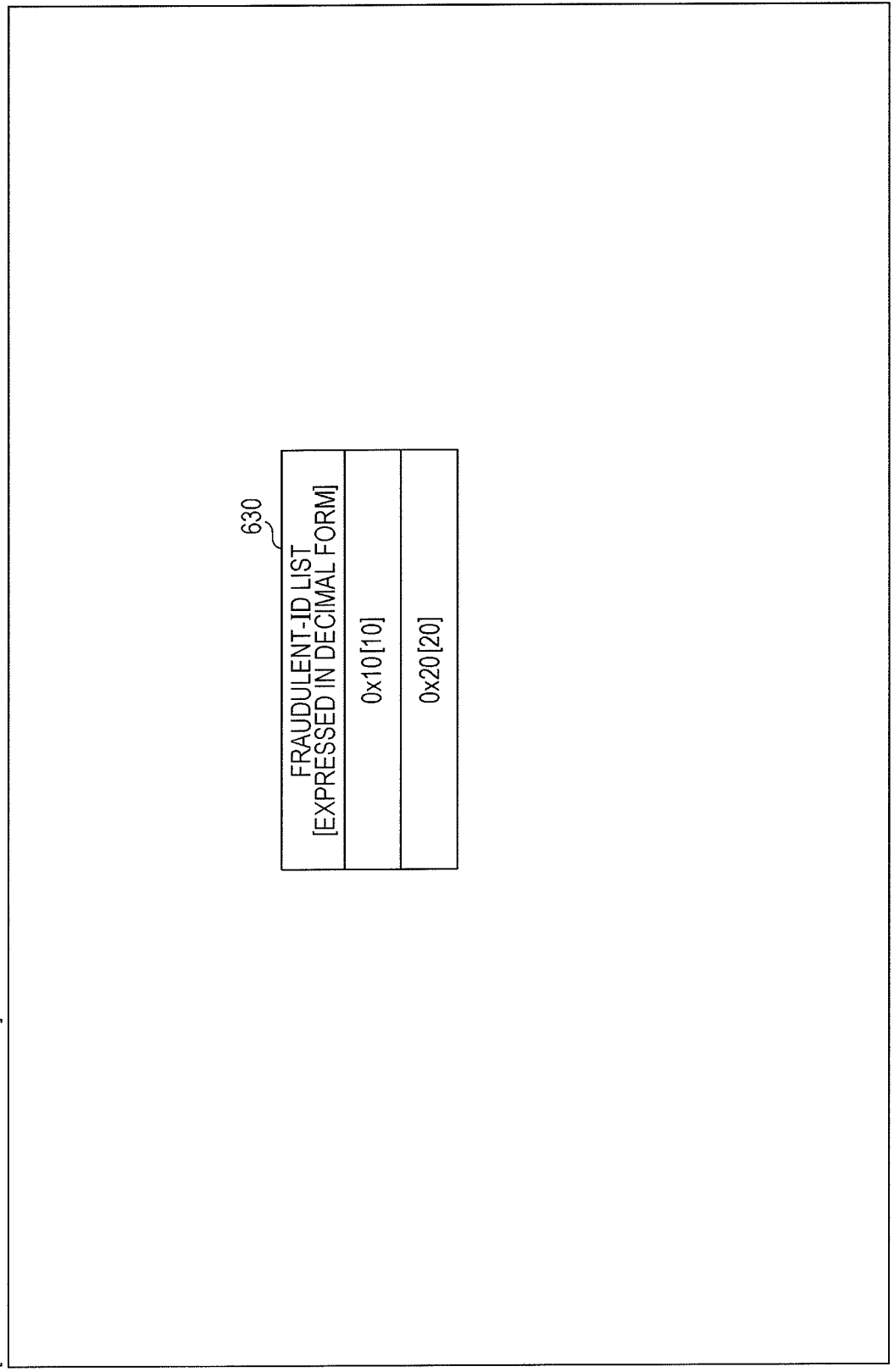
[FIG. 42 FRAUDULENT-ID LIST]
| FRAUDULENT-ID LIST [EXPRESSED IN DECIMAL FORM] |
|---|
| 0x10 [10] |
| 0x20 [20] |
630

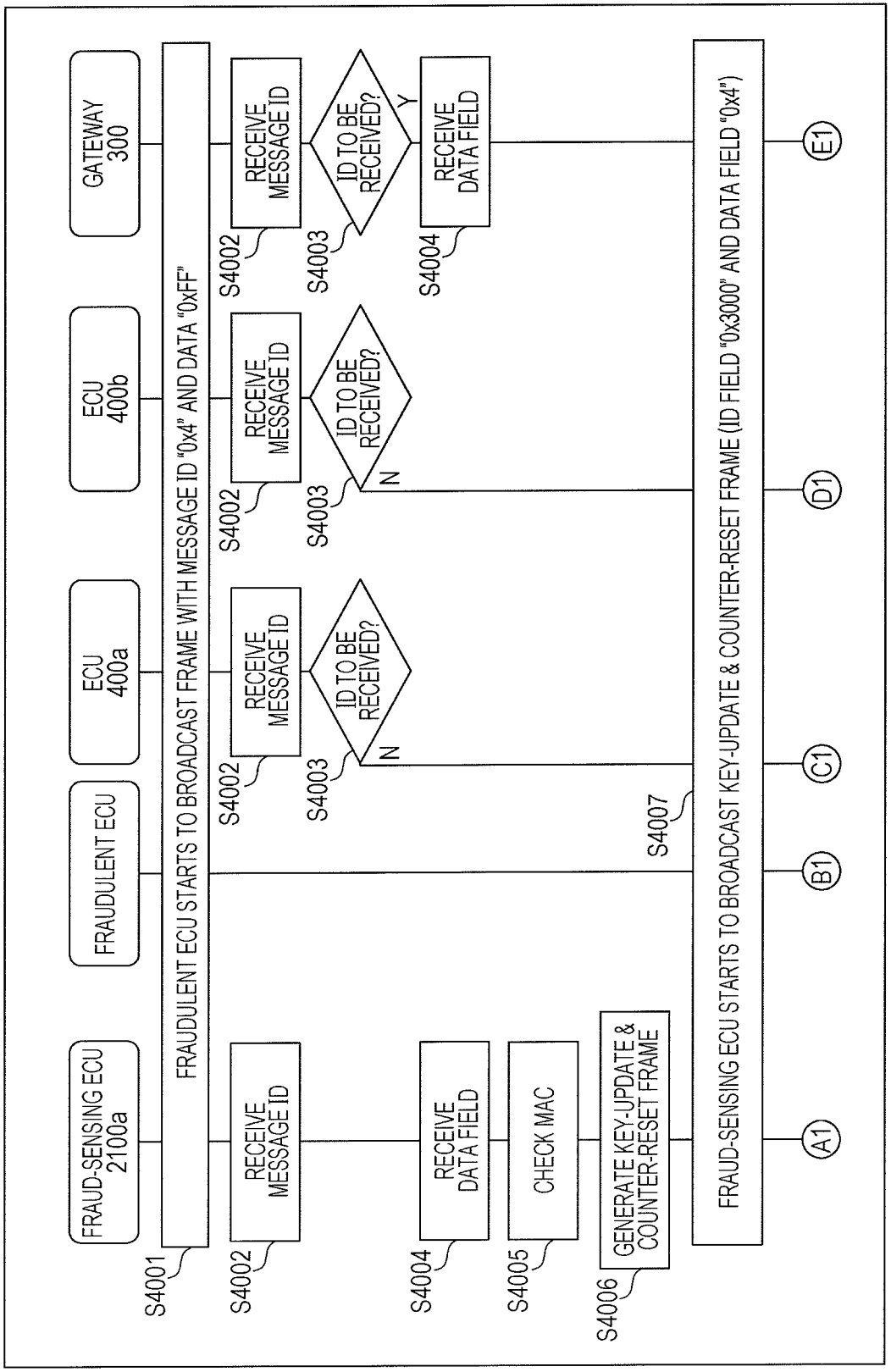

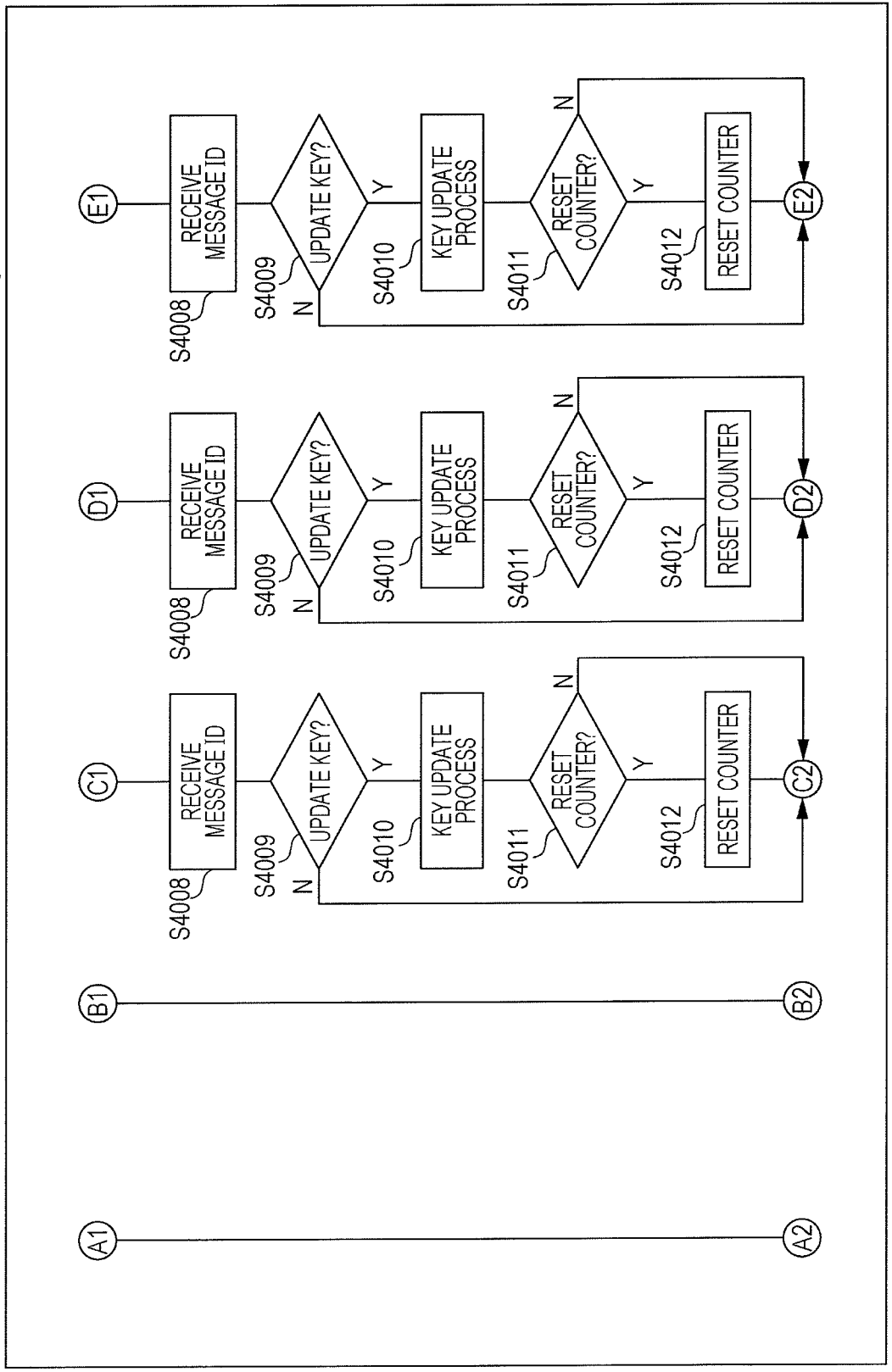

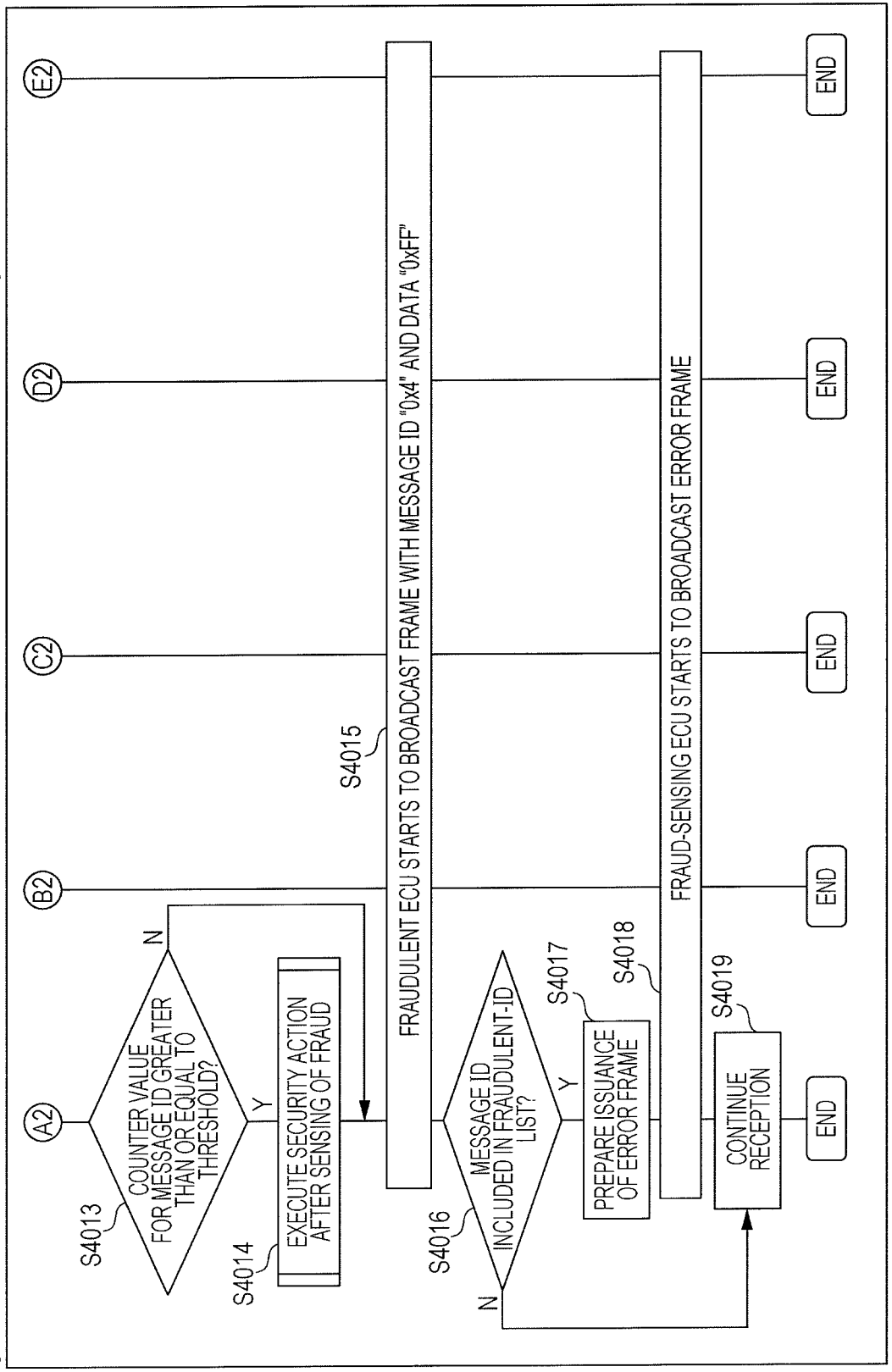

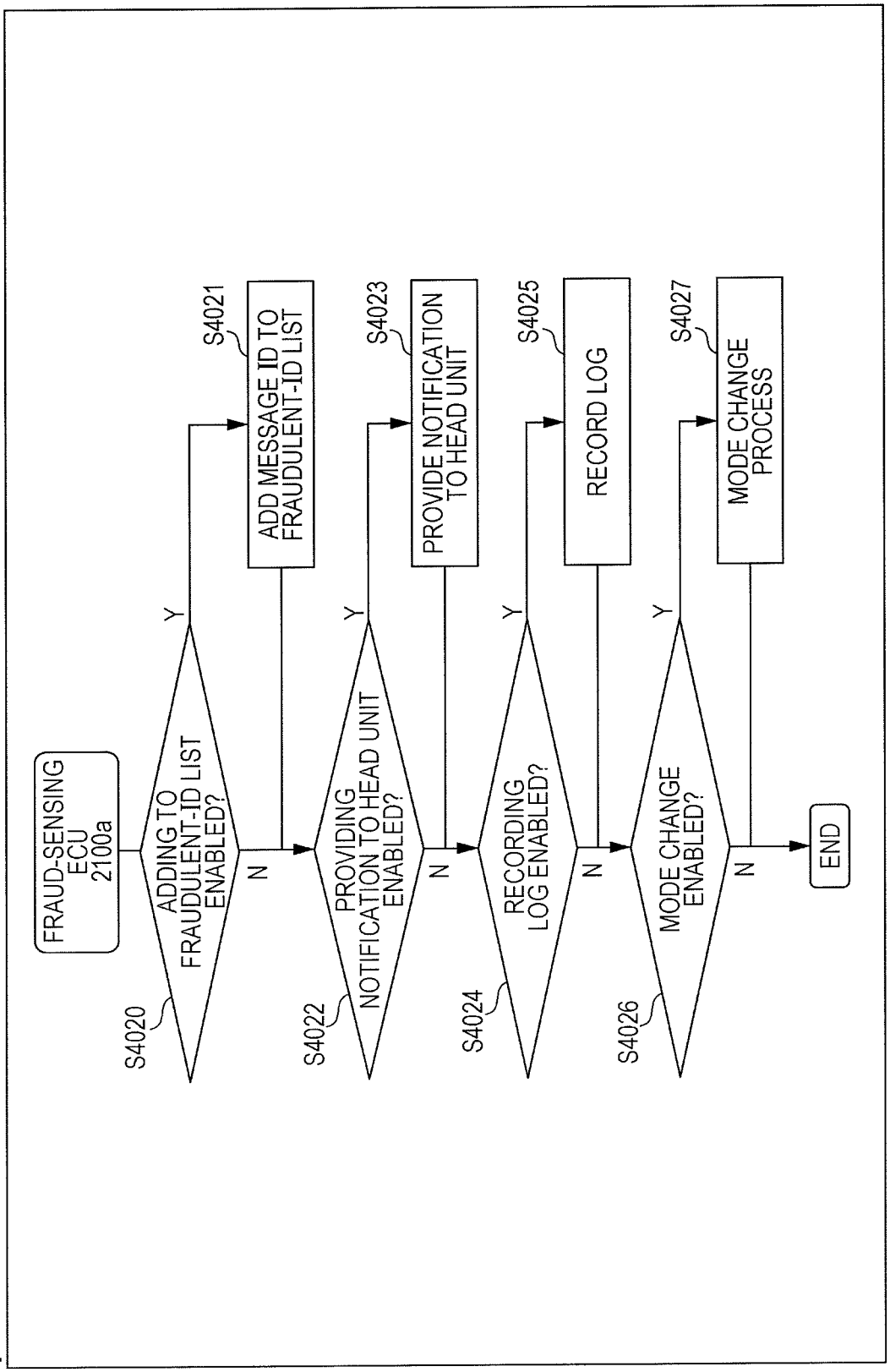

METHOD FOR HANDLING TRANSMISSION OF FRAUDULENT FRAMES WITHIN IN-VEHICLE NETWORK

CROSS-REFERENCE TO RELATED APPLICATIONS

This is a continuation application of pending U.S. patent application Ser. No. 15/183,443, filed on Jun. 15, 2016, which is a continuation of International Application PCT/JP2015/002163, filed Apr. 21, 2015, which claims priority to U.S. Application No. 61/990,340, filed May 8, 2014. The disclosures of these documents, including the specifications, drawings and claims, are incorporated herein by reference in their entirety.

BACKGROUND

1. Technical Field

The present disclosure relates to a technique for sensing and handling fraudulent frames transmitted within an in-vehicle network over which electronic control units perform communication.

2. Description of the Related Art

Systems in recent automobiles accommodate multiple devices called electronic control units (ECUs). A network connecting these ECUs is called an in-vehicle network. There exist multiple in-vehicle network standards. Among all these standards, a standard called CAN (Controller Area Network) specified in ISO 11898-1 is one of the most mainstream in-vehicle network standards (see CAN Specification 2.0 Part A, [online], CAN in Automation (CiA), [searched Nov. 14, 2014], the Internet (URL:http://wwwv-.can-cia.org/fileadmin/cia/specifications/CAN20A.pdf)).

In CAN, each communication path is constituted by two buses, and ECUs connected to the buses are referred to as nodes. Each node connected to a bus transmits and receives a message called a frame. A transmitting node that is to transmit a frame applies a voltage to two buses to generate a potential difference between the buses, thereby transmitting the value "1" called recessive and the value "0" called dominant. When a plurality of transmitting nodes transmit recessive and dominant values at completely the same timing, the dominant value is prioritized and transmitted. A receiving node transmits a frame called an error frame if the format of a received frame is anomalous. In an error frame, 6 consecutive dominant bits are transmitted to notify the transmitting nodes or any other receiving node of frame anomaly.

In CAN, furthermore, there is no identifier that designates a transmission destination or a transmission source. A transmitting node transmits frames each assigned an ID called a message ID (that is, sends signals to a bus), and each receiving node receives only a message ID determined in advance (that is, reads a signal from the bus). In addition, the CSMA/CA (Carrier Sense Multiple Access/Collision Avoidance) scheme is adopted, and arbitration based on message IDs is performed for simultaneous transmission of a plurality of nodes so that a frame with the value of the message ID being small is preferentially transmitted.

Incidentally, a connection of a fraudulent node to a bus in an in-vehicle network and a fraudulent transmission of a frame from the fraudulent node can possibly cause fraudulent control of the vehicle body. In order to block such control caused by fraudulent frame transmission, there is generally known a technique for adding a message authentication code (MAC) to the data field in a CAN frame before transmission (see Japanese Unexamined Patent Application Publication No. 2013-98719).

However, it is difficult to say that the data length of the MAC which can be stored in the data field in a CAN frame is sufficiently long. There is thus a concern of the possibility of a brute-force attack and the like on a MAC from a fraudulent node connected to bus.

SUMMARY

One non-limiting and exemplary embodiment provides an in-vehicle network system with enhanced resistance against a brute-force attack on a MAC and designed to appropriately handle the transmission of a fraudulent frame. The present disclosure further provides a fraud-sensing electronic control unit (fraud-sensing ECU) used for sensing the transmission of a fraudulent frame in the in-vehicle network system, and an anti-fraud method for appropriately handling the transmission of a fraudulent frame.

In one general aspect, the techniques disclosed here feature an anti-fraud method for use in an in-vehicle network system including a plurality of electronic control units that exchange data frames, each having added thereto a message authentication code (MAC), via at least one bus in accordance with a Controller Area Network (CAN) protocol. The anti-fraud method includes receiving a data frame transmitted on the bus, generating a first message authentication code by using a MAC key and a value of a counter that counts the number of times a data frame having added thereto a message authentication code is transmitted, verifying that the received data frame has added thereto the generated first message authentication code, generating, in a case where the verification has failed, a second message authentication code by using a MAC key before update of the MAC key, re-verifying, in a case where the verification has failed, that the received data frame has added thereto the generated second message authentication code, transmitting, in a case where the re-verification has succeeded, via the bus a key-update frame indicating a request for updating the MAC key, and updating the MAC key in response to the transmission of the key-update frame.

It should be noted that general or specific embodiments may be implemented as a system, an apparatus, an integrated circuit, a computer program, a computer-readable recording medium such as a compact disc read-only memory (CD-ROM), or any selective combination of the system, the apparatus, the integrated circuit, the computer program, and the recording medium.

According to an embodiment of the present disclosure, resistance against a brute-force attack on a MAC can be enhanced, and the transmission of a fraudulent frame can be appropriately handled.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a diagram illustrating an overall configuration of an in-vehicle network system according to a first embodiment;

FIG. 2 is a diagram illustrating the format of a data frame specified in the CAN protocol;

FIG. 3 is a diagram illustrating the format of an error frame specified in the CAN protocol;

FIG. 4 is a configuration diagram of a head unit;

FIG. 5 is a diagram illustrating an example of a reception-ID list;

FIG. 6 is a configuration diagram of a gateway;

FIG. 7 is a diagram illustrating an example of transfer rules;

FIG. 8 is a configuration diagram of an ECU according to the first embodiment;

FIG. 9 is a diagram illustrating an example of a reception-ID list;

FIG. 10 is a diagram illustrating an example of an ID and a data field in a frame transmitted from an ECU connected to an engine;

FIG. 11 is a diagram illustrating an example of an ID and a data field in a frame transmitted from an ECU connected to brakes;

FIG. 12 is a diagram illustrating an example of an ID and a data field in a frame transmitted from an ECU connected to a door open/close sensor;

FIG. 13 is a diagram illustrating an example of an ID and a data field in a frame transmitted from an ECU connected to a window open/close sensor;

FIG. 14 is a configuration diagram of a fraud-sensing ECU according to the first embodiment;

FIG. 15 is a diagram illustrating an example of an authorized-ID list held in the fraud-sensing ECU;

FIG. 16 is a diagram illustrating an example of an authorized-ID list held in the fraud-sensing ECU;

FIG. 17 is a diagram illustrating an example of the states of fraud-sensing counters for individual message IDs;

FIG. 18 is a sequence diagram illustrating an example operation for sensing a fraudulent frame and preventing execution of the fraudulent frame in the first embodiment;

FIG. 19 is a diagram illustrating an overall configuration of an in-vehicle network system according to a second embodiment;

FIG. 20 is a configuration diagram of a fraud-sensing ECU according to the second embodiment;

FIG. 21 is a diagram illustrating an example of a data range list held in the fraud-sensing ECU;

FIG. 22 is a sequence diagram illustrating an example operation for sensing a fraudulent frame and preventing execution of the fraudulent frame in the second embodiment (continued in FIG. 23);

FIG. 23 is a sequence diagram illustrating the example operation for sensing a fraudulent frame and preventing execution of the fraudulent frame in the second embodiment (continued from FIG. 22);

FIG. 24 is a diagram illustrating an overall configuration of an in-vehicle network system according to a third embodiment;

FIG. 25 is a configuration diagram of an ECU according to the third embodiment;

FIG. 26 is a diagram illustrating an example of an ID and a data field in a data frame transmitted from an ECU connected to an engine;

FIG. 27 is a diagram illustrating an example of an ID and a data field in a data frame transmitted from an ECU connected to brakes;

FIG. 28 is a diagram illustrating an example of an ID and a data field in a data frame transmitted from an ECU connected to a door open/close sensor;

FIG. 29 is a diagram illustrating an example of an ID and a data field in a data frame transmitted from an ECU connected to a window open/close sensor;

FIG. 30 is a configuration diagram of a fraud-sensing ECU according to the third embodiment;

FIG. 31 is a diagram illustrating an example of counter values for individual message IDs held in a counter holding unit according to the third embodiment;

FIG. 32 is a sequence diagram illustrating an example operation for sensing a fraudulent frame and preventing execution of the fraudulent frame in the third embodiment (continued in FIG. 33);

FIG. 33 is a sequence diagram illustrating an example operation for sensing a fraudulent frame and preventing execution of the fraudulent frame in the third embodiment (continued from FIG. 32);

FIG. 34 is a diagram illustrating an overall configuration of an in-vehicle network system according to a fourth embodiment;

FIG. 35 is a configuration diagram of an ECU according to the fourth embodiment;

FIG. 36 is a configuration diagram of a fraud-sensing ECU according to the fourth embodiment;

FIG. 37 is a diagram illustrating an example of a reception-ID list according to the fourth embodiment;

FIG. 38 is a diagram illustrating an example of an update frame according to the fourth embodiment;

FIG. 39 is a diagram illustrating an example of a key table according to the fourth embodiment;

FIG. 40 is a diagram illustrating an example of a counter table according to the fourth embodiment;

FIG. 41 is a diagram illustrating an example of a security condition table according to the fourth embodiment;

FIG. 42 is a diagram illustrating an example of a fraudulent-ID list according to the fourth embodiment;

FIG. 43 is a sequence diagram illustrating example operations in the fourth embodiment, such as sensing a fraudulent frame, updating a MAC key, and resetting a counter value (continued in FIG. 44);

FIG. 44 is a sequence diagram illustrating the example operations in the fourth embodiment, such as sensing a fraudulent frame, updating a MAC key, and resetting a counter value (continued in FIG. 45);

FIG. 45 is a sequence diagram illustrating the example operations in the fourth embodiment, such as sensing a fraudulent frame, updating a MAC key, and resetting a counter value (continued from FIG. 44); and FIG. 46 is a flowchart illustrating a security action process in the fourth embodiment.

DETAILED DESCRIPTION

An anti-fraud method according to an aspect of the present disclosure is an anti-fraud method for use in an in-vehicle network system including a plurality of electronic control units that exchange data frames, each having added thereto a message authentication code (MAC), via at least one bus in accordance with a Controller Area Network (CAN) protocol. The anti-fraud method includes receiving a data frame transmitted on the bus, generating a first message authentication code by using a MAC key and a value of a counter that counts the number of times a data frame having added thereto a message authentication code is transmitted, verifying that the received data frame has added thereto the generated first message authentication code, generating, in a case where the verification has failed, a second message authentication code by using a MAC key before update of the MAC key, re-verifying, in a case where the verification has failed, that the received data frame has added thereto the generated second message authentication code, transmitting, in a case where the re-verification has succeeded, via the bus a key-update frame indicating a request for updating the MAC key, and updating the MAC key in response to the transmission of the key-update frame. Accordingly, when a MAC is assigned for the transmission of a data frame or when a data frame is received and a MAC is verified, data used for the generation of the MAC (such as a MAC key) is updated. This may enhance resistance of an in-vehicle network system against a brute-force attack on a MAC from a fraudulent ECU that transmits a fraudulent frame.

The at least one bus may include a plurality of buses, each of the plurality of buses belonging to any group among a plurality of types of groups, and the method may further include executing, in a case where the verification has failed, by each of the plurality of electronic control units, a process determined in advance in association with a group to which a bus to which the electronic control unit is connected among the plurality of buses belongs. This enables measures determined in advance for each group of ECUs to be taken in a case where a fraudulent data frame is transmitted.

The method may further include executing, in a case where the number of times the verification has failed for a data frame including a predetermined message ID exceeds a predetermined threshold, a process associated in advance with the predetermined message ID. This enables predetermined measures to be taken when the verification of the MAC has failed a certain number or more.

The process associated in advance with the predetermined message ID may be control for imposing certain limitations on a function of a vehicle in which the in-vehicle network system is installed to bring the vehicle into a predetermined specific state. Accordingly, when a fraud is sensed a certain number or more, control is performed to bring the state of the vehicle into a predetermined state, and, for example, the ill effects of a fraudulent ECU may be reduced.

The method may further include transmitting, in a case where a message ID of a data frame that has started to be transmitted on the bus is identical to any of one or more message IDs indicated in a predetermined fraudulent-ID list, an error frame before an end of the data frame is transmitted, and the process associated in advance with the predetermined message ID may be adding the predetermined message ID to the fraudulent-ID list. Accordingly, if a fraudulent frame having the same message ID is transmitted when the verification of the MAC has failed a certain number or more, the content of the fraudulent frame is overwritten with an error frame, thereby enabling adverse effects of the fraudulent frame to be reduced.

The process associated in advance with the predetermined message ID may be recording log information indicating the predetermined message ID on a recording medium. This makes it possible to save evidence and the like of, for example, a fraudulent attack.

The method may further include transmitting via the bus a counter-reset frame indicating a request for resetting the counter in response to failure of re-verification performed using the second message authentication code, and resetting the counter in response to transmission of the counter-reset frame. This enables a counter value to be reset in a situation where it is necessary to reset a counter value.

Furthermore, an in-vehicle network system according to an aspect of the present disclosure is an in-vehicle network system including a plurality of electronic control units that exchange data frames, each having added thereto a message authentication code (MAC), via at least one bus in accordance with a Controller Area Network (CAN) protocol. The in-vehicle network system includes a first electronic control unit and a second electronic control unit. The first electronic control unit includes one or more memories, and circuitry which, in operation, generates a third message authentication code by using a first MAC key and a value of a first counter that counts the number of times a data frame having added thereto a message authentication code has been transmitted, adds the generated third message authentication code to a data frame, and transmits the data frame on the bus. The second electronic control unit includes one or more memories, and circuitry which, in operation, receives a data frame transmitted on the bus, generates a first message authentication code by using a second MAC key and a value of a second counter that counts the number of times a data frame having added thereto a message authentication code has been received, verifies that the received data frame has added thereto the first message authentication code, generates, in a case where the verification has failed, a second message authentication code by using a MAC key before update of the MAC key, re-verifies, in a case where the verification has failed, that the received data frame has added thereto the generated second message authentication code, transmits, in a case where the re-verification has succeeded, via the bus a key-update frame indicating a request for updating a MAC key, and updates the second MAC key in response to the transmission of the key-update frame. The first electronic control unit updates the first MAC key in response to receipt of the key-update frame. Accordingly, a MAC key is updated, which may result in enhanced resistance of an in-vehicle network system against a brute-force attack on a MAC from a fraudulent ECU that transmits a fraudulent frame.

Furthermore, an electronic control unit according to an aspect of the present disclosure is an electronic control unit for communication via a bus in accordance with a Controller Area Network (CAN) protocol. The electronic control unit includes one or more memories, and circuitry which, in operation, receives a data frame from the bus, generates a first message authentication code by using a MAC key and a value of a counter that counts the number of times a data frame having added thereto a message authentication code has been received, verifies that the received data frame has added thereto the generated first message authentication code (MAC), generates, in a case where the verification has failed, a second message authentication code by using a MAC key before update of the MAC key, re-verifies, in a case where the verification has failed, that the received data frame has added thereto the generated second message authentication code, transmits, in a case where the re-verification has succeeded, via the bus a key-update frame indicating a request for updating the MAC key, and updates the MAC key in response to the transmission of the key-update frame. This enables ECUs connected to a bus to synchronously update MAC keys in response to receipt of a MAC key update request frame.

It should be noted that these general or specific aspects may be implemented as a system, a method, an integrated circuit, a computer program, or a computer-readable recording medium such as a CD-ROM, or may be implemented as any combination of the system, the method, the integrated circuit, the computer program, or the recording medium.

In the following, an in-vehicle network system including a fraud-sensing ECU according to embodiments will be described with reference to the drawings. Each of the embodiments described below shows a specific example of the present disclosure. Thus, the numerical values, constituent elements, the arrangement and connection of the constituent elements, steps (processes), the processing order of the steps, etc. shown in the following embodiments are mere examples, and do not limit the scope of the present disclosure. Among the constituent elements in the following embodiments, constituent elements not recited in any one of the independent claims are constituent elements that can be optionally added. In addition, the drawings are schematic and not representative of exact proportions or dimensions.

First Embodiment

An embodiment of the present disclosure will now be described with reference to the drawings in the context of an in-vehicle network system 10 including a fraud-sensing ECU that implements an anti-fraud method for sensing and handling a fraudulent frame by using message IDs.

1.1 Overall Configuration of in-Vehicle Network System 10

FIG. 1 is a diagram illustrating an overall configuration of an in-vehicle network system 10 according to a first embodiment. The in-vehicle network system 10 is an example of a network communication system in which communication is established in accordance with the CAN protocol, and is a network communication system in an automobile provided with various devices such as a control device and a sensor. The in-vehicle network system 10 is configured to include buses 500a, 500b, and 500c, fraud-sensing ECUs 100a and 100b, a head unit 200, a gateway 300, and nodes connected to the buses, called ECUs, such as ECUs 400a to 400d connected to various devices. While the in-vehicle network system 10 may include numerous ECUs other than the ECUs 400a to 400d, which are not illustrated in FIG. 1, the description will be given here focusing on the ECUs 400a to 400d, for convenience. Each ECU is a device including, for example, digital circuits such as a processor (microprocessor) and a memory, analog circuits, a communication circuit, and so forth. The memory is a ROM, a RAM, or the like, and is capable of storing a control program (computer program) executed by the processor. For example, the processor operates in accordance with the control program (computer program), thereby allowing the ECU to implement various functions. The computer program is constituted by a plurality of instruction codes indicating instructions for the processor to achieve a predetermined function. Here, the description is based on the assumption that a fraudulent ECU that transmits a fraudulent frame can possibly be connected to the buses 500a and 500b.

The fraud-sensing ECUs 100a and 100b are ECUs connected to the bus 500a and the bus 500b, respectively, and having a function of determining whether frames transmitted from the ECUs 400a to 400d, etc. are fraudulent or not and transmitting an error frame if the frames are fraudulent.

The ECUs 400a to 400d are each connected to any bus, and are connected to an engine 401, brakes 402, a door open/close sensor 403, and a window open/close sensor 404, respectively. Each of the ECUs 400a to 400d obtains the state of the device connected thereto (such as the engine 401), and periodically transmits a frame (data frame described below) or the like indicating the state to a network (that is, the bus).

The gateway 300 is connected to the bus 500a to which the fraud-sensing ECU 100a, the ECU 400a, and the ECU 400b are coupled, the bus 500b to which the fraud-sensing ECU 100b, the ECU 400c, and the ECU 400d are coupled, and a bus 500c to which the head unit 200 is coupled, and has a function of transferring frames received from the respective buses to other buses. It is also possible to switch for each connected bus between whether or not to transfer a received frame. The gateway 300 is also a kind of ECU.

The head unit 200 has a function of receiving a frame, and has a function of receiving frames transmitted from the ECUs 400a to 400d and displaying various states on a display (not illustrated) to present the states to a user. The head unit 200 is also a kind of ECU.

In the in-vehicle network system 10, each ECU exchanges frames in accordance with the CAN protocol. There are the following frames in the CAN protocol: a data frame, a remote frame, an overload frame, and an error frame. The description will first focus on the data frame and the error frame, for convenience of illustration.

1.2 Data Frame Format

A description will now be given of the data frame, which is a frame used in a network compliant with the CAN protocol.

FIG. 2 is a diagram illustrating the format of a data frame specified in the CAN protocol. In this figure there is illustrated a data frame in the standard ID format specified in the CAN protocol. The data frame is made up of the following fields: SOF (Start Of Frame), ID field, RTR (Remote Transmission Request), IDE (Identifier Extension), reserved bit "r", DLC (Data Length Code), data field, CRC (Cyclic Redundancy Check) sequence, CRC delimiter "DEL", ACK (Acknowledgement) slot, ACK delimiter "DEL", and EOF (End Of Frame).

The SOF is made up of one dominant bit. The recessive value is set for a state where a bus is idle, and is changed to the dominant value by the SOF to indicate the start of frame transmission.

The ID field is a field made up of 11 bits for storing an ID (message ID) that is a value indicating a type of data. It is designed such that a high priority is placed on a frame whose ID has a small value in order to use the ID field to arbitrate communication when a plurality of nodes simultaneously start transmission.

The RTR is a value for identifying a data frame and a remote frame, and is made up of one dominant bit for a data frame.

The IDE and "r" are both made up of one dominant bit.

The DLC is made up of 4 bits, and is a value indicating the length of the data field. The IDE, "r", and the DLC are collectively referred to as a control field.

The data field is a value made up of up to 64 bits, indicating the content of data to be transmitted. The length is adjustable every 8 bits. The specification of data to be sent is not specified in the CAN protocol and is defined in the in-vehicle network system 10. Accordingly, the specification is dependent on the type of vehicle, the manufacturer (producer), and so forth.

The CRC sequence is made up of 15 bits. The CRC sequence is calculated by using transmission values of the SOF, the ID field, the control field, and the data field.

The CRC delimiter is a delimiter made up of one recessive bit, indicating the end of the CRC sequence. The CRC sequence and the CRC delimiter are collectively referred to as a CRC field.

The ACK slot is made up of 1 bit. A transmitting node sets the recessive value in the ACK slot when transmitting the frame. A receiving node sets the dominant value in the ACK slot and transmits the frame if the receiving node has been able to correctly receive the frame up to the CRC sequence. Since the dominant value overrides the recessive value, if the ACK slot is constituted by the dominant value after transmission, the transmitting node can confirm that any receiving node has been successful in receiving the frame.

The ACK delimiter is a delimiter made up of one recessive bit, indicating the end of the ACK.

The EOF is made up of 7 recessive bits, and indicates the end of the data frame.

1.3 Error Frame Format

FIG. 3 is a diagram illustrating the format of an error frame specified in the CAN protocol. The error frame is constituted by an error flag (primary), an error flag (secondary), and an error delimiter.

The error flag (primary) is used to inform any other node of the occurrence of an error. A node that has sensed an error transmits 6 consecutive dominant bits in order to inform any other node of the occurrence of the error. This transmission violates a bit-stuffing rule (in which the same value should not be transmitted over 6 or more consecutive bits) in the CAN protocol, and induces the transmission of an error frame (secondary) from any other node.

The error flag (secondary) is made up of 6 consecutive dominant bits, which is used to inform any other node of the occurrence of an error. All the nodes that have received the error flag (primary) and sensed the violation of the bit-stuffing rule transmit an error flag (secondary).

The error delimiter "DEL" is made up of 8 consecutive recessive bits, and indicates the end of the error frame.

1.4 Configuration of Head Unit 200

The head unit 200 is a kind of ECU disposed on, for example, an instrument panel or the like of an automobile, including a display device such as a liquid crystal display (LCD) for displaying information to be viewed by a driver, an input unit for accepting the operation of the driver, and so forth.

FIG. 4 is a configuration diagram of the head unit 200. The head unit 200 is configured to include a frame transceiving unit 270, a frame interpretation unit 260, a reception-ID judgment unit 240, a reception-ID list holding unit 250, a frame processing unit 220, a display control unit 210, and a frame generation unit 230. These constituent elements are functional ones, and each of their functions is implemented by an element in the head unit 200, such as a communication circuit, an LCD, a processor that executes a control program stored in a memory, or a digital circuit.

The frame transceiving unit 270 transmits and receives a frame compliant with the CAN protocol to and from the bus 500c. The frame transceiving unit 270 receives a frame from the bus 500c bit-by-bit, and transfers the frame to the frame interpretation unit 260. Further, the frame transceiving unit 270 transmits the content of a frame of which the frame transceiving unit 270 has been notified by the frame generation unit 230 to the bus 500c bit-by-bit.

The frame interpretation unit 260 receives the values of the frame from the frame transceiving unit 270, and interprets and maps the values into the respective fields in the frame formats specified in the CAN protocol. The frame interpretation unit 260 transfers a value judged to correspond to the ID field to the reception-ID judgment unit 240. In accordance with a determination result sent from the reception-ID judgment unit 240, the frame interpretation unit 260 determines whether to transfer the value in the ID field and the data field that appears after the ID field to the frame processing unit 220 or to abort reception of the frame (that is, abort interpretation of the frame) after the determination result has been received. Further, the frame interpretation unit 260 notifies the frame generation unit 230 that the frame generation unit 230 is requested to transmit an error frame if the frame is judged not to comply with the CAN protocol, for example, if the values of the CRC do not match or if an item whose value should be fixed to the dominant value has the recessive value. Further, when an error frame is received, that is, when an error frame is interpreted to have started from a value in the received frame, the frame interpretation unit 260 discards the subsequent part of the frame, that is, aborts interpretation of the frame. For example, in a case where an error frame is interpreted to have started in the middle of the data frame, the interpretation of the data frame is aborted and a particular process is not performed according to the data frame.

The reception-ID judgment unit 240 receives the value in the ID field sent from the frame interpretation unit 260, and determines whether or not to receive the respective fields of the frame after the ID field, in accordance with a list of message IDs held in the reception-ID list holding unit 250. The reception-ID judgment unit 240 notifies the frame interpretation unit 260 of the determination result.

The reception-ID list holding unit 250 holds a reception-ID list that is a list of IDs (message IDs) which the head unit 200 receives. FIG. 5 is a diagram illustrating an example of the reception-ID list. The head unit 200 receives a frame (message) whose message ID is "1" from the ECU 400a connected to the engine 401, a frame whose message ID is "2" from the ECU 400b connected to the brakes 402, a frame whose message ID is "3" from the ECU 400c connected to the door open/close sensor 403, and a frame whose message ID is "4" from the ECU 400d connected to the window open/close sensor 404.

On the basis of the content of the received frame (for example, the content of the message ID and the data field), for example, the frame processing unit 220 forms an image to be displayed on the LCD and notifies the display control unit 210 of the image. The frame processing unit 220 may hold the content of the received data field and select and notify an image to be displayed on the LCD (for example, an image for displaying the vehicle speed, an image for displaying the open or closed state of a window, etc.) in accordance with the operation of the driver which has been accepted through the input unit.

The display control unit 210 displays, on the LCD or the like, the content of which the display control unit 210 has been notified by the frame processing unit 220.

In accordance with a notification of instructions from the frame interpretation unit 260 to transmit an error frame, the frame generation unit 230 forms an error frame and notifies the frame transceiving unit 270 of the error frame for transmission.

1.5 Example Reception-ID List 1

FIG. 5 is a diagram illustrating an example of a reception-ID list held in each of the head unit 200, the gateway 300, the ECU 400c, and the ECU 400d.

The reception-ID list illustrated by way of example in this figure is used to selectively receive and process a frame including a message ID that is an ID (message ID) whose value is any of "1", "2", "3", and "4". For example, the reception-ID list holding unit 250 of the head unit 200 holds the reception-ID list illustrated in FIG. 5. In this case, for a frame whose message ID is none of "1", "2", "3", and "4", the interpretation of the frame subsequent to the ID field by the frame interpretation unit 260 is aborted.

1.6 Configuration of Gateway 300

FIG. 6 is a configuration diagram of the gateway 300. The gateway 300 is configured to include a frame transceiving unit 360, a frame interpretation unit 350, a reception-ID judgment unit 330, a reception-ID list holding unit 340, a frame generation unit 320, a transfer processing unit 310, and a transfer rule holding unit 370. These constituent elements are functional ones, and each of their functions is implemented by an element in the gateway 300, such as a communication circuit, a processor that executes a control program stored in a memory, or a digital circuit.

The frame transceiving unit 360 transmits and receives a frame compliant with the CAN protocol to and from each of the buses 500a, 500b, and 500c. The frame transceiving unit 360 receives a frame from a bus bit-by-bit, and transfers the frame to the frame interpretation unit 350. Further, the frame transceiving unit 360 transmits the content of the frame to the buses 500a, 500b, and 500c bit-by-bit on the basis of the frame and bus information indicating a bus at the transfer destination of which the frame transceiving unit 360 has been notified by the frame generation unit 320.

The frame interpretation unit 350 receives the values of the frame from the frame transceiving unit 360, and interprets and maps the values into the respective fields in the frame formats specified in the CAN protocol. The frame interpretation unit 350 transfers a value judged to correspond to the ID field to the reception-ID judgment unit 330. In accordance with a determination result sent from the reception-ID judgment unit 330, the frame interpretation unit 350 determines whether to transfer the value in the ID field and the data field (data) that appears after the ID field to the transfer processing unit 310 or to abort reception of the frame (that is, abort interpretation of the frame) after the determination result has been received. Further, the frame interpretation unit 350 notifies the frame generation unit 320 that the frame generation unit 320 is requested to transmit an error frame if the frame is judged not to comply with the CAN protocol. Further, when an error frame is received, that is, when an error frame is interpreted to have started from a value in the received frame, the frame interpretation unit 350 discards the subsequent part of the frame, that is, aborts interpretation of the frame.

The reception-ID judgment unit 330 receives the value in the ID field sent from the frame interpretation unit 350, and determines whether or not to receive the respective fields of the frame after the ID field, in accordance with a list of message IDs held in the reception-ID list holding unit 340. The reception-ID judgment unit 330 notifies the frame interpretation unit 350 of the determination result.

The reception-ID list holding unit 340 holds a reception-ID list (see FIG. 5) that is a list of IDs (message IDs) which the gateway 300 receives.

The transfer processing unit 310 determines a bus to which transfer is made in accordance with transfer rules held in the transfer rule holding unit 370 on the basis of the message ID of the received frame, and notifies the frame generation unit 320 of bus information indicating the bus to which transfer is made and the message ID and data sent from the frame interpretation unit 350. Note that the gateway 300 does not transfer an error frame received from a certain bus to any other bus.

The transfer rule holding unit 370 holds transfer rules that are information representing rules for the transfer of frames to the respective buses. FIG. 7 is a diagram illustrating an example of the transfer rules.

In accordance with a notification of instructions to transmit an error frame, which is sent from the frame interpretation unit 350, the frame generation unit 320 forms an error frame and notifies the frame transceiving unit 360 of the error frame for transmission. Further, the frame generation unit 320 forms a frame by using the message ID and data sent from the transfer processing unit 310, and notifies the frame transceiving unit 360 of the frame and the bus information.

1.7 Example Transfer Rules

FIG. 7 illustrates an example of transfer rules held in the gateway 300. The transfer rules associate buses at transfer sources, buses at transfer destinations, and IDs (message IDs) to be transferred with one another. In FIG. 7, "*" indicates that a frame is transferred regardless of the message ID. In this figure, furthermore, "–" indicates no frame to be transferred. The illustrated example indicates that the frames received from the bus 500a are set to be transferred to the bus 500b and the bus 500c regardless of the message ID. It also indicates that the frames received from the bus 500b are set so that all the frames are transferred to the bus 500c whereas only a frame whose message ID is "3" is transferred to the bus 500a. It also indicates that the frames received from the bus 500c are set not to be transferred to the bus 500a or the bus 500b.

1.8 Configuration of ECU 400a

FIG. 8 is a configuration diagram of the ECU 400a. The ECU 400a is configured to include a frame transceiving unit 460, a frame interpretation unit 450, a reception-ID judgment unit 430, a reception-ID list holding unit 440, a frame processing unit 410, a frame generation unit 420, and a data obtaining unit 470. These constituent elements are functional ones, and each of their functions is implemented by an element in the ECU 400a, such as a communication circuit, a processor that executes a control program stored in a memory, or a digital circuit.

The frame transceiving unit 460 transmits and receives a frame compliant with the CAN protocol to and from the bus 500a. The frame transceiving unit 460 receives a frame from the bus 500a bit-by-bit, and transfers the frame to the frame interpretation unit 450. Further, the frame transceiving unit 460 transmits the content of a frame of which the frame transceiving unit 460 has been notified by the frame generation unit 420 to the bus 500a.

The frame interpretation unit 450 receives the values of the frame from the frame transceiving unit 460, and interprets and maps the values into the respective fields in the frame formats specified in the CAN protocol. The frame interpretation unit 450 transfers a value judged to correspond to the ID field to the reception-ID judgment unit 430. In accordance with a determination result sent from the reception-ID judgment unit 430, the frame interpretation unit 450 determines whether to transfer the value in the ID field and the data field that appears after the ID field to the frame processing unit 410 or to abort reception of the frame (that is, abort interpretation of the frame) after the determination result has been received. Further, the frame interpretation unit 450 notifies the frame generation unit 420 that the frame generation unit 420 is requested to transmit an error frame if the frame is judged not to comply with the CAN protocol. Further, when an error frame is received, that is, when an error frame is interpreted to have started from a value in the received frame, the frame interpretation unit 450 discards the subsequent part of the frame, that is, aborts interpretation of the frame.

The reception-ID judgment unit 430 receives the value in the ID field sent from the frame interpretation unit 450, and determines whether or not to receive the respective fields of the frame after the ID field, in accordance with a list of message IDs held in the reception-ID list holding unit 440. The reception-ID judgment unit 430 notifies the frame interpretation unit 450 of the determination result.

The reception-ID list holding unit 440 holds a reception-ID list that is a list of IDs (message IDs) which the ECU 400*a* receives. FIG. 9 is a diagram illustrating an example of the reception-ID list.

The frame processing unit 410 performs a process related to a function that is different for each ECU in accordance with the data of the received frame.

For example, the ECU 400*a* connected to the engine 401 has a function of sounding an alarm when a door is open while the vehicle speed is over 30 km per hour. The ECU 400*a* includes, for example, a speaker or the like for sounding an alarm. The frame processing unit 410 of the ECU 400*a* manages data (for example, information indicating the state of the doors) received from any other ECU, and performs processes such as a process for sounding an alarm in a certain condition on the basis of the average speed per hour obtained from the engine 401.

The data obtaining unit 470 obtains data indicating the state of the elements connected to the ECUs, such as devices and sensors, and notifies the frame generation unit 420 of the data.

In accordance with a notification of instructions to transmit an error frame, which is sent from the frame interpretation unit 450, the frame generation unit 420 forms an error frame and notifies the frame transceiving unit 460 of the error frame for transmission. Further, the frame generation unit 420 adds a message ID determined in advance to the value of the data sent from the data obtaining unit 470 to form a frame, and notifies the frame transceiving unit 460 of the frame.

Each of the ECUs 400*b* to 400*d* also has a configuration basically similar to that of the ECU 400*a* described above. However, the reception-ID list held in the reception-ID list holding unit 440 may have content different from one ECU to another. The ECU 400*b* holds the reception-ID list illustrated by way of example in FIG. 9, and the ECU 400*c* and the ECU 400*d* hold the reception-ID list illustrated by way of example in FIG. 5. Furthermore, the content of the process of the frame processing unit 410 differs from one ECU to another. For example, the content of the process of the frame processing unit 410 in the ECU 400*c* includes a process related to a function of sounding an alarm if a door is opened while the brakes are released. For example, the frame processing units 410 in the ECU 400*b* and the ECU 400*d* do not perform a special process. Each ECU may have functions other than those described for illustrative purposes here. The content of respective frames transmitted from the ECUs 400*a* to 400*d* will be described below with reference to FIGS. 10 to 13.

1.9 Example Reception-ID List 2

FIG. 9 is a diagram illustrating an example of a reception-ID list held in each of the ECU 400*a* and the ECU 400*b*. The reception-ID list illustrated by way of example in this figure is used to selectively receive and process a frame including a message ID that is an ID (message ID) whose value is any of "1", "2", and "3". For example, the reception-ID list holding unit 440 of the ECU 400*a* holds the reception-ID list illustrated in FIG. 9. In this case, for a frame whose message ID is none of "1", "2", and "3", the interpretation of the frame subsequent to the ID field by the frame interpretation unit 450 is aborted.

1.10 Example Transmission Frame from Engine-Related ECU 400*a*

FIG. 10 is a diagram illustrating an example of an ID (message ID) and a data field (data) in a frame transmitted from the ECU 400*a* connected to the engine 401. The ECU 400*a* transmits a frame whose message ID is "1". The data represents the average speed per hour (km/h), taking a value in the range from a minimum speed of 0 (km/h) to a maximum speed of 180 (km/h), and has a length of 1 byte. FIG. 10 illustrates, from top to bottom, message IDs and data corresponding to frames transmitted sequentially from the ECU 400*a*, by way of example, and depicts acceleration, increasing the speed from 0 km/h in increments of 1 km/h.

1.11 Example Transmission Frame from Brake-Related ECU 400*b*

FIG. 11 is a diagram illustrating an example of an ID (message ID) and a data field (data) in a frame transmitted from the ECU 400*b* connected to the brakes 402. The ECU 400*b* transmits a frame whose message ID is "2". The data represents the degree to which the brakes are applied, expressed as a percentage (%), and has a length of 1 byte. A percentage of 0(%) indicates a state where the brakes are not applied at all and 100(%) indicates a state where the brakes are maximally applied. FIG. 11 illustrates, from top to bottom, message IDs and data corresponding to frames transmitted sequentially from the ECU 400*b*, by way of example, and depicts a gradual easing off of the brakes from 100%.

1.12 Example Transmission Frame from Door-Open/Close-Sensor-Related ECU 400*c*

FIG. 12 is a diagram illustrating an example of an ID (message ID) and a data field (data) in a frame transmitted from the ECU 400*c* connected to the door open/close sensor 403. The ECU 400*c* transmits a frame whose message ID is "3". The data represents the open or closed state of the door, and has a length of 1 byte. The data has the value "1" for a door-open state and the value "0" for a door-closed state. FIG. 12 illustrates, from top to bottom, message IDs and data corresponding to frames transmitted sequentially from the ECU 400*c*, by way of example, and depicts a gradual transition from the door-open state to the closed state.

1.13 Example Transmission Frame from Window-Open/Close-Sensor-Related ECU 400*d*

FIG. 13 is a diagram illustrating an example of an ID (message ID) and a data field (data) in a frame transmitted from the ECU 400*d* connected to the window open/close sensor 404. The ECU 400*d* transmits a frame whose message ID is "4". The data represents the open or closed state of the window, expressed as a percentage (%), and has a length of 1 byte. A percentage of 0(%) indicates a state where the window is completely closed and 100(%) indicates a state where the window is completely open. FIG. 13 illustrates, from top to bottom, message IDs and data corresponding to frames transmitted sequentially from the ECU 400d, by way of example, and depicts a gradual transition from the window-closed state to the open state.

1.14 Configuration of Fraud-Sensing ECU 100a

FIG. 14 is a configuration diagram of the fraud-sensing ECU 100a. The fraud-sensing ECU 100a is configured to include a frame transceiving unit 160, a frame interpretation unit 150, a fraudulent frame sensing unit 130, an authorized-ID list holding unit 120, a fraud-sensing counter holding unit 110, and a frame generation unit 140. These constituent elements are functional ones, and each of their functions is implemented by an element in the fraud-sensing ECU 100a, such as a communication circuit, a processor that executes a control program stored in a memory, or a digital circuit. While the fraud-sensing ECU 100b also has a configuration basically similar to that described above, the content of list information (authorized-ID list) held in the authorized-ID list holding unit 120 is different between the fraud-sensing ECU 100a and the fraud-sensing ECU 100b.

The frame transceiving unit 160 transmits and receives a frame compliant with the CAN protocol to and from the bus 500a. That is, the frame transceiving unit 160 serves as a so-called receiving unit that receives a frame when frame transmission on a bus is started, and serves as a so-called transmitting unit that transmits an error frame and the like to a bus. That is, the frame transceiving unit 160 receives a frame from the bus 500a bit-by-bit, and transfers the frame to the frame interpretation unit 150. Further, the frame transceiving unit 160 transmits the content of a frame of which the frame transceiving unit 160 has been notified by the frame generation unit 140 to the bus 500a.

The frame interpretation unit 150 receives the values of the frame from the frame transceiving unit 160, and interprets and maps the values into the respective fields in the frame formats specified in the CAN protocol. The frame interpretation unit 150 transfers a value judged to correspond to the ID field to the fraudulent frame sensing unit 130. Further, the frame interpretation unit 150 notifies the frame generation unit 140 that the frame generation unit 140 is requested to transmit an error frame if the frame is judged not to comply with the CAN protocol. Further, when an error frame is received, that is, when an error frame is interpreted to have started from a value in the received frame, the frame interpretation unit 150 discards the subsequent part of the frame, that is, aborts interpretation of the frame.

The fraudulent frame sensing unit 130 receives the value in the ID field sent from the frame interpretation unit 150, and determines whether or not the value in the ID field meets a predetermined condition indicating a fraud. That is, the fraudulent frame sensing unit 130 functions as a so-called determination unit that determines whether or not the content of a predetermined field in a received frame meets a predetermined condition indicating a fraud. The predetermined condition indicating a fraud is a condition in which the value in the ID field is not found in the list of message IDs held in the authorized-ID list holding unit 120. That is, the fraudulent frame sensing unit 130 determines whether the sent value (message ID) of the ID field is fraudulent or not, in accordance with the list of message IDs held in the authorized-ID list holding unit 120. If a message ID which is not found in this list (that is, an authorized-ID list described below) is received, the fraudulent frame sensing unit 130 notifies the fraud-sensing counter holding unit 110 of the received message ID in order to increment the number of times a fraud has been sensed. If a message ID which is not found in the authorized-ID list is received, the fraudulent frame sensing unit 130 further notifies the frame generation unit 140 that the frame generation unit 140 is requested to transmit an error frame. Further, when the number of times a fraud has been sensed reaches a certain number or more, the fraudulent frame sensing unit 130 is notified of this by the fraud-sensing counter holding unit 110, and notifies the frame generation unit 140 that the frame generation unit 140 is requested to transmit an error display message (frame) indicating the presence of a fraudulent ECU that issues the corresponding message ID. The message ID of the error display message is determined in advance, and the head unit 200 is configured to receive the message (frame) of the message ID and to provide error display. Although the error display message is not described herein for convenience of illustration, the message ID of the error display message is listed in the reception-ID lists held in the gateway 300 and the head unit 200 and in the authorized-ID list described below. Note that the message ID for the error display message is not illustrated in FIG. 15 and FIG. 16.

The authorized-ID list holding unit 120 holds an authorized-ID list that is a list defining in advance message IDs included in frames to be transmitted on the bus 500a in the in-vehicle network system 10 (see FIG. 15 and FIG. 16).

The fraud-sensing counter holding unit 110 holds a fraud-sensing counter for counting the number of times sensing has been performed for each message ID, and, upon being notified of a message ID by the fraudulent frame sensing unit 130, increments (increases) the corresponding fraud-sensing counter. When a fraud-sensing counter reaches a certain number (a predetermined number of times sensing has been performed) or more, the fraud-sensing counter holding unit 110 notifies the fraudulent frame sensing unit 130 that the certain number has been exceeded. Examples of the term "certain number (predetermined number of times sensing has been performed)", as used herein, include a value determined in accordance with handling rules for a transmission error counter in the CAN protocol. In the CAN protocol, the transmission error counter counts up by 8 each time an ECU blocks transmission by using an error frame. As a result, when a transmission error counter in a transmitting node counts up to 128, the transmitting node is specified to transition to a passive state so that frame transmission is no longer performed. Accordingly, setting the certain number to 17, which is larger than 128/8 (=16), allows an error display message to be transmitted from the fraud-sensing ECU 100a when the presence of a transmitting node (fraudulent ECU) that ignores a rule related to a transmission error counter in the CAN protocol is estimated. If a fraudulent ECU that transmits a fraudulent frame follows a rule related to a transmission error counter in the CAN protocol, the transmission of an error frame from the fraud-sensing ECU 100a causes the transmission error counter of the fraudulent ECU to increment by 8. In this case, when the transmission error counter of the fraudulent ECU increases up to 128 due to the repeated transmission of a fraudulent frame, the fraudulent ECU transitions to the passive state to stop a fraudulent frame from being transmitted from the fraudulent ECU.

In accordance with a notification of instructions to transmit an error frame, which is sent from the frame interpretation unit 150, the frame generation unit 140 forms an error frame and notifies the frame transceiving unit 160 of the error frame for transmission. In addition, in accordance with a notification of instructions to transmit an error frame, which is sent from the fraudulent frame sensing unit 130, the frame generation unit 140 forms an error frame and notifies the frame transceiving unit 160 of the error frame for transmission. In accordance with a notification of instructions to transmit an error display message, which is sent from the fraudulent frame sensing unit 130, furthermore, the frame generation unit 140 notifies the frame transceiving unit 160 of an error display message for transmission.

1.15 Example Authorized-ID List in Fraud-Sensing ECU 100*a*

FIG. 15 is a diagram illustrating an example of an authorized-ID list held in the authorized-ID list holding unit 120 of the fraud-sensing ECU 100*a*. The authorized-ID list illustrated by way of example in this figure indicates that a frame including a message ID that is an ID (message ID) whose value is any of "1", "2", and "3" may be allowed to flow into the bus 500*a*.

1.16 Example Authorized-ID List in Fraud-Sensing ECU 100*b*

FIG. 16 is a diagram illustrating an example of an authorized-ID list held in the authorized-ID list holding unit 120 of the fraud-sensing ECU 100*b*. The authorized-ID list illustrated by way of example in this figure indicates that a frame including a message ID that is an ID (message ID) whose value is any of "1", "2", "3", and "4" may be allowed to flow into the bus 500*b*.

1.17 Example Fraud-Sensing-Counter Saving List

FIG. 17 is a diagram illustrating an example of the states of fraud-sensing counters for individual message IDs. The illustrated example indicates that only a fraud-sensing counter whose message ID is "4" has sensed a fraud once while no fraud has been sensed for the other message IDs. That is, the illustrated example indicates a case where the fraud-sensing ECU 100*a* has sensed a transmission of a message (frame) with message ID "4", which would not have flowed into the bus 500*a*, and the fraud-sensing counter corresponding to the message ID "4" has been incremented by 1.

1.18 Sequence for Fraudulent-Frame Sensing

A description will now be given of the operation of the fraud-sensing ECU 100*a*, the ECU 400*a*, the ECU 400*b*, the gateway 300, and so forth connected to the bus 500*a* in the in-vehicle network system 10 having the configuration described above in a case where a fraudulent ECU is connected to the bus 500*a*.

FIG. 18 is a sequence diagram illustrating an example operation for, in response to sensing of a fraudulent frame (message) by the fraud-sensing ECU 100*a*, preventing any other ECU from performing a process corresponding to the fraudulent frame. In this figure, an example is illustrated in which a fraudulent ECU transmits a data frame whose message ID is "4" and data field (data) is "255 (0xFF)" to the bus 500*a*. Here, respective sequences represent individual process procedures (steps) performed by various devices.

First, a fraudulent ECU starts to transmit a data frame whose message ID is "4" and data is "255 (0xFF)" (sequence S1001). The values of the bits included in the frame are sequentially delivered to the bus 500*a* in the order of the SOF, the ID field (message ID), etc. in accordance with the data frame format described above.

When the fraudulent ECU completes the delivery of the frame up to the ID field (message ID) to the bus 500*a*, each of the fraud-sensing ECU 100*a*, the ECU 400*a*, the ECU 400*b*, and the gateway 300 receives a message ID (sequence S1002).

Each of the ECU 400*a*, the ECU 400*b*, and the gateway 300 checks the message ID by using the reception-ID list held therein (sequence S1003). At this time, the fraud-sensing ECU 100*a* checks the message ID by using the authorized-ID list held therein (sequence S1004). That is, the fraud-sensing ECU 100*a* determines whether or not the content of the ID field in the transmitted frame meets a predetermined condition (in which the content is not listed in the authorized-ID list) indicating a fraud.

In sequence S1003, the ECU 400*a* and the ECU 400*b* terminate reception since the respectively held reception-ID lists do not include "4" (see FIG. 9). That is, a frame that the fraudulent ECU continuously transmits is no longer interpreted, nor is the process corresponding to the frame performed. In sequence S1003, furthermore, the gateway 300 continues reception since the held reception-ID list includes "4" (see FIG. 5). In sequence S1004, the fraud-sensing ECU 100*a* judges that the message ID is fraudulent since the held authorized-ID list does not include "4", and then starts to prepare the issuance of an error frame (sequence S1005).

Subsequently to sequence S1003, the gateway 300 continues the reception of the frame. For example, while the fraud-sensing ECU 100*a* is preparing the issuance of an error frame, the part subsequent to the ID field, namely, the RTR and the control field (IDE, r, DLC), is sequentially delivered to the bus 500*a* from the fraudulent ECU, and then the data field is sequentially delivered bit-by-bit. The gateway 300 receives the RTR and the control field (IDE, r, DLC), and then starts the reception of the data field (sequence S1006).

Then, the preparation of the issuance of an error frame is completed, and the fraud-sensing ECU 100*a* transmits an error frame (sequence S1007). The transmission of the error frame is performed before the transmission of the end of the fraudulent frame (for example, before the transmission of the end of the CRC sequence). In the illustrated example operation, the error frame is transmitted in the middle of the data field. The transmission of the error frame is started, thus allowing the middle part of the data field in the frame being transmitted from the fraudulent ECU to be overwritten with the error frame (a bit sequence of the prioritized dominant value) on the bus 500*a*.

The gateway 300 which has received the error frame transmitted in sequence S1007 aborts reception of the frame being transmitted from the fraudulent ECU during the reception of the data field (sequence S1008). That is, the data field from the fraudulent ECU has been overwritten with the error frame, and the gateway 300 detects the error frame and thus does not continue the reception of the frame being transmitted from the fraudulent ECU.

The fraud-sensing ECU 100*a* increments the fraud-sensing counter corresponding to the message ID "4" of the data frame for which the error frame has been transmitted (sequence S1009).

If the fraud-sensing counter corresponding to the message ID "4" becomes greater than or equal to 17 as a result of the increment, the fraud-sensing ECU 100*a* transmits a frame indicating error display (error display message) so that the frame can be received by the head unit 200 (sequence S1010). Consequently, the frame processing unit 220 of the head unit 200 performs a process for providing error display, and an error notification is issued via an LCD or the like. The error notification may be issued via, in place of display on an LCD or the like, audio output, light emission, or the like.

1.19 Advantageous Effects of First Embodiment

A fraud-sensing ECU illustrated in the first embodiment determines whether a transmitted frame (data frame) is a fraudulent frame or not by using an authorized-ID list in terms of the ID field of the frame. This enables the occurrence of a fraud to be determined based on the ID field in the data frame, and can thus prevent existing nodes (that is, ECUs other than a fraud-sensing ECU and a fraudulent ECU) from interpreting a fraudulent frame and from performing a process corresponding to the frame. In addition, it is only required to receive the data frame up to the ID field subsequent to the SOF at the beginning of the data frame to perform determination, thereby making it possible to reduce bus traffic, compared to the case where determination is performed after the receipt of the latter part or the like of the data frame.

In addition, the fraud-sensing ECU counts the number of times an error frame has been transmitted, by using fraud-sensing counters, and can thus detect that a transmission error counter in a node that transmits a fraudulent message ID has reached an upper limit value at which the transition to the passive state is required according to the CAN protocol in response to receipt of an error frame. This makes it possible to determine whether or not a node that transmits a fraudulent message ID is compatible with the specification of an error counter in the CAN protocol.

In addition, the use of only a fraud-sensing ECU as a node for judgment of a fraudulent frame can minimize the effect on the existing network configuration, resulting in the amount of processing and the amount of power consumption being reduced in the entire system.

Second Embodiment

An embodiment of the present disclosure will now be described in the context of an in-vehicle network system 11 including a fraud-sensing ECU that implements an anti-fraud method for preventing a process based on a fraudulent frame from being executed on any other node (ECU) on the basis of a data range allowed for each message ID.

2.1 Overall Configuration of in-Vehicle Network System 11

FIG. 19 is a diagram illustrating an overall configuration of an in-vehicle network system 11 according to a second embodiment. The in-vehicle network system 11 is obtained by partially modifying the in-vehicle network system 10 illustrated in the first embodiment. The in-vehicle network system 11 is configured to include buses 500a. 500b, and 500c, fraud-sensing ECUs 2100a and 2100b, a head unit 200, a gateway 300, and nodes connected to the buses, called ECUs, such as ECUs 400a to 400d connected to various devices. Of the constituent elements of the in-vehicle network system 11, constituent elements having functions similar to those in the first embodiment are designated by the same numerals and are not described.

The fraud-sensing ECUs 2100a and 2100b are ECUs connected to the bus 500a and the bus 500b, respectively, and having a function of determining whether frames transmitted from the ECUs 400a to 400d, etc. are fraudulent or not and transmitting an error frame if the frames are fraudulent.

2.2 Configuration of Fraud-Sensing ECU 2100a

FIG. 20 is a configuration diagram of the fraud-sensing ECU 2100a. The fraud-sensing ECU 2100a is configured to include a frame transceiving unit 160, a frame interpretation unit 2150, a fraudulent frame sensing unit 2130, a data range list holding unit 2120, a fraud-sensing counter holding unit 110, and a frame generation unit 140. These constituent elements are functional ones, and each of their functions is implemented by an element in the fraud-sensing ECU 2100a, such as a communication circuit, a processor that executes a control program stored in a memory, or a digital circuit. The fraud-sensing ECU 2100a is obtained by partially modifying the fraud-sensing ECU 100a illustrated in the first embodiment, and constituent elements having functions similar to those in the first embodiment are designated by the same numerals and are not described. The fraud-sensing ECU 2100b also has a configuration similar to that of the fraud-sensing ECU 2100a.

The frame interpretation unit 2150 is obtained by modifying the frame interpretation unit 150 illustrated in the first embodiment, and is configured to receive values of a frame from the frame transceiving unit 160 and to interpret and map the values into the respective fields in the frame formats specified in the CAN protocol. The frame interpretation unit 2150 transfers a value (data) judged to correspond to the data field when the frame is judged to be a data frame, together with the ID (message ID) in the ID field, to the fraudulent frame sensing unit 2130. Further, the frame interpretation unit 2150 notifies the frame generation unit 140 that the frame generation unit 140 is requested to transmit an error frame if the frame is judged not to comply with the CAN protocol. Further, when an error frame is received, that is, when an error frame is interpreted to have started from a value in the received frame, the frame interpretation unit 2150 discards the subsequent part of the frame, that is, aborts interpretation of the frame.

The fraudulent frame sensing unit 2130 is obtained by modifying the fraudulent frame sensing unit 130 illustrated in the first embodiment, and is configured to receive the message ID and the value in the data field (data) sent from the frame interpretation unit 2150 and to determine whether or not these values meet a predetermined condition indicating a fraud. That is, the fraudulent frame sensing unit 2130 functions as a so-called determination unit that determines whether or not the content of a predetermined field in a received frame meets a predetermined condition indicating a fraud. The predetermined condition indicating a fraud is a condition in which the data is not within a data range listed in a data range list held in the data range list holding unit 2120 in association with the message ID. The fraudulent frame sensing unit 2130 determines whether or not a fraud has occurred, in accordance with a data range list held in the data range list holding unit 2120, which is a list defining data ranges for individual message IDs. If data in a range which is not defined in the data range list is received, the fraudulent frame sensing unit 2130 notifies the fraud-sensing counter holding unit 110 of the received message ID in order to increment the number of times a fraud has been sensed. The control performed to, when the number of times a fraud has been sensed reaches a certain number or more, transmit an error display message so that the error display message can be received by the head unit 200 has been described in the first embodiment, and is not described here. If data in a range which is not defined in the data range list is received, the fraudulent frame sensing unit 2130 notifies the frame generation unit 140 that the frame generation unit 140 is requested to transmit an error frame.

The data range list holding unit 2120 holds a data range list that is a list defining in advance ranges allowed for data (the values in the data fields) included in data frames transmitted on a bus in the in-vehicle network system 11 (see FIG. 21).

2.3 Example Data Range List

FIG. 21 is a diagram illustrating an example of the data range list held in the data range list holding unit 2120 of the fraud-sensing ECU 2100a. In the data range list, each ID (message ID) is associated with a data range allowed as the value in the data field (data) in a data frame with the message ID. In the example illustrated in FIG. 21, the data range "0 to 180" is set to be normal for a data frame whose message ID is "1", the data range "0 to 100" for a data frame whose message ID is "2" or "4", and the data range "0, 1" for a data frame whose message ID is "3".

2.4 Sequence for Fraudulent-Frame Sensing

A description will now be given of the operation of the fraud-sensing ECU 2100a, the ECU 400a, the ECU 400b, the gateway 300, and so forth connected to the bus 500a in the in-vehicle network system 11 having the configuration described above in a case where a fraudulent ECU is connected to the bus 500a.

FIG. 22 and FIG. 23 illustrate a sequence diagram illustrating an example operation for, in response to sensing of a fraudulent frame (message) by the fraud-sensing ECU 2100a, preventing any other ECU from performing a process corresponding to the fraudulent frame. In FIG. 22 and FIG. 23, as in FIG. 18 given in the first embodiment, an example is illustrated in which a fraudulent ECU transmits a data frame whose message ID is "4" and data field (data) is "255 (0xFF)" to the bus 500a. The same sequences as the sequences illustrated in the first embodiment are designated by the same numerals, and are described here in a simplified way.

First, a fraudulent ECU starts to transmit a fraudulent data frame (sequence S1001). Each of the fraud-sensing ECU 2100a, the ECU 400a, the ECU 400b, and the gateway 300 receives a message ID (sequence S1002). Each of the ECU 400a, the ECU 400b, and the gateway 300 checks the message ID by using the reception-ID list held therein (sequence S1003). The ECU 400a and the ECU 400b terminate reception since the respectively held reception-ID lists do not include "4" (see FIG. 9). The gateway 300 continues reception and receives the data field since the held reception-ID list includes "4" (see FIG. 5) (sequence S1006a). Likewise, the fraud-sensing ECU 2100a also receives the data field (sequence S1006a).

Subsequently to sequence S1006a, the fraud-sensing ECU 2100a checks the data in the data field by using the data range list (see FIG. 21) (sequence S2001). That is, the fraud-sensing ECU 2100a determines whether or not the content of the ID field in the transmitted frame meets a predetermined condition (in which the content is not within the ranges of data contained in the data range list) indicating a fraud. The fraud-sensing ECU 2100a judges that the data frame is fraudulent since the data range list does not contain the value of "255 (0xFF)" corresponding to the ID "4", and then starts to prepare the issuance of an error frame (sequence S1005).

While the fraud-sensing ECU 2100a is preparing the issuance of an error frame, the CRC field (the CRC sequence and the CRC delimiter), which is a part subsequent to the data field, is sequentially delivered bit-by-bit to the bus 500a from the fraudulent ECU. The gateway 300 starts the reception of the CRC field (sequence S2002).

Then, the preparation of the issuance of an error frame is completed, and the fraud-sensing ECU 2100a transmits an error frame (sequence S1007). The transmission of the error frame is started, thus allowing the middle part of the CRC sequence in the frame being transmitted from the fraudulent ECU to be overwritten with the error frame (a bit sequence of the prioritized dominant value) on the bus 500a.

The gateway 300 which has received the error frame transmitted in sequence S1007 aborts reception of the data frame being transmitted from the fraudulent ECU during the reception of the CRC field including the CRC sequence (sequence S2003). That is, the CRC sequence from the fraudulent ECU has been overwritten with the error frame, and the gateway 300 detects the error frame and thus does not continue the reception of the data frame being transmitted from the fraudulent ECU.

The fraud-sensing ECU 2100a increments the fraud-sensing counter corresponding to the ID "4" of the data frame for which the error frame has been transmitted (sequence S1009). If the fraud-sensing counter corresponding to the ID "4" becomes greater than or equal to 17 as a result of the increment, the fraud-sensing ECU 2100a transmits an error display message (sequence S1010).

2.5 Advantageous Effects of Second Embodiment

A fraud-sensing ECU illustrated in the second embodiment determines whether a transmitted frame is a fraudulent frame or not by using a data range list in terms of the ID field and the data field in the frame (data frame). This enables the occurrence of a fraud to be determined based on a combination of the ID field and the data field in a data frame, and can thus prevent existing ECUs (that is, ECUs other than a fraud-sensing ECU and a fraudulent ECU) from interpreting a fraudulent frame and from performing a process corresponding to the frame. In addition, it is only required to receive the data frame up to the data field to perform determination, thereby making it possible to reduce bus traffic, compared to the case where determination is performed after the receipt of the latter part of the data frame.

In addition, the fraud-sensing ECU counts the number of times an error frame has been transmitted, by using fraud-sensing counters, and can thus detect that a transmission error counter in a node that transmits a fraudulent message ID has reached an upper limit value at which the transition to the passive state is required according to the CAN protocol in response to receipt of an error frame. This makes it possible to determine whether or not a node that transmits a fraudulent message ID is compatible with the specification of an error counter in the CAN protocol.

In addition, the use of only a fraud-sensing ECU as a node for judgment of a fraudulent frame can minimize the effect on the existing network configuration, resulting in the amount of processing and the amount of power consumption being reduced in the entire system.

Third Embodiment

An embodiment of the present disclosure will now be described in the context of an in-vehicle network system 12 including a fraud-sensing ECU that implements an anti-fraud method for preventing a process based on a fraudulent frame from being executed on any other node (ECU) by using a message authentication code (MAC) calculated based on a message ID, data, and a counter value.

3.1 Overall Configuration of in-Vehicle Network System 12

FIG. 24 is a diagram illustrating an overall configuration of an in-vehicle network system 12 according to a third embodiment. The in-vehicle network system 12 is obtained by partially modifying the in-vehicle network system 10 illustrated in the first embodiment. The in-vehicle network system 12 is configured to include buses 500a, 500b, and 500c, fraud-sensing ECUs 3100a and 3100b, a head unit 200, a gateway 300, and nodes connected to the buses, called ECUs, such as ECUs 3400a to 3400d connected to various devices. Of the constituent elements of the in-vehicle network system 12, constituent elements having functions similar to those in the first embodiment are designated by the same numerals and are not described.

The fraud-sensing ECUs 3100a and 3100b are ECUs connected to the bus 500a and the bus 500b, respectively, and having a function of determining whether frames transmitted from the ECUs 3400a to 3400d, etc. are fraudulent or not and transmitting an error frame if the frames are fraudulent.

The ECUs 3400a to 3400d are each connected to any bus, and are connected to the engine 401, the brakes 402, the door open/close sensor 403, and the window open/close sensor 404, respectively. Each of the ECUs 3400a to 3400d obtains the state of the device connected thereto (such as the engine 401), and periodically transmits a data frame indicating the state to a network (that is, the bus). The data frame to be transmitted has a data field which is assigned a message authentication code (MAC) derived from a message ID, a data value, and a counter value incremented for each transmission through computation.

3.2 Configuration of ECU 3400a

FIG. 25 is a configuration diagram of the ECU 3400a. The ECU 3400a is configured to include a frame transceiving unit 460, a frame interpretation unit 450, a reception-ID judgment unit 430, a reception-ID list holding unit 440, a frame processing unit 410, a frame generation unit 3420, a data obtaining unit 470, a MAC generation unit 3410, a MAC key holding unit 3430, and a counter holding unit 3440. These constituent elements are functional ones, and each of their functions is implemented by an element in the ECU 3400a, such as a communication circuit, a processor that executes a control program stored in a memory, or a digital circuit. The ECU 3400a is obtained by partially modifying the ECU 400a illustrated in the first embodiment, and constituent elements having functions similar to those in the first embodiment are designated by the same numerals and are not described.

The frame generation unit 3420 is obtained by partially modifying the frame generation unit 420 illustrated in the first embodiment. In accordance with a notification of instructions to transmit an error frame, which is sent from the frame interpretation unit 450, the frame generation unit 3420 forms an error frame and notifies the frame transceiving unit 460 of the error frame for transmission. Further, the frame generation unit 3420 notifies the MAC generation unit 3410 of the value of the data sent from the data obtaining unit 470 and a message ID determined in advance, and receives a calculated MAC. The frame generation unit 3420 forms a frame in such a manner that the frame includes the message ID determined in advance, the value of the data sent from the data obtaining unit 470, and the MAC received from the MAC generation unit 3410 (see FIG. 26), and notifies the frame transceiving unit 460 of the frame.

The MAC generation unit 3410 calculates (derives through computation) a MAC by using a MAC key held in the MAC key holding unit 3430 for a value (composite value) obtained by combining the message ID and the value of the data sent from the frame generation unit 3420 with a counter value held in the counter holding unit 3440, and notifies the frame generation unit 3420 of the MAC obtained as a result of the calculation. Here, HMAC (Hash-based Message Authentication Code) (see RFC 2104 HMAC: Keyed-Hashing for Message Authentication) is adopted as a MAC computation method, and the first 4 bytes of a value obtained as a result of the computation with a value obtained by padding the composite value described above to a pre-determined block (for example, 4 bytes) using a MAC key are regarded as a MAC. While the composite value used for calculating a MAC uses here a message ID, the value of data, and a counter value held in the counter holding unit 3440, any one or a combination of two of these three values may be used to calculate a MAC.

The MAC key holding unit 3430 holds a MAC key necessary for computing a MAC.

The counter holding unit 3440 holds a counter value necessary for computing a MAC. The counter value is incremented each time a data frame is properly transmitted from the frame transceiving unit 460.

The ECUs 3400b to 3400d are obtained by partially modifying the ECUs 400b to 400d illustrated in the first embodiment, respectively, and each have a configuration basically similar to that of the ECU 3400a described above. However, the reception-ID list held in the reception-ID list holding unit 440 may have content different from one ECU to another. For example, the ECU 3400a and the ECU 3400b hold the reception-ID list illustrated by way of example in FIG. 9, and the ECU 3400c and the ECU 3400d hold the reception-ID list illustrated by way of example in FIG. 5. In addition, as illustrated in the first embodiment, the content of the process of the frame processing unit 410 differs from one ECU to another. The content of frames respectively transmitted from the ECUs 3400a to 3400d will now be described with reference to FIGS. 26 to 29.

3.3 Example Transmission Frame from Engine-Related ECU 3400a

FIG. 26 is a diagram illustrating an example of an ID (message ID) and a data field (data) in a data frame transmitted from the ECU 3400a connected to the engine 401. The ECU 3400a transmits a frame whose message ID is "1". In this figure, the data is delimited with spaces in blocks of 1 byte, in which the first 1 byte represents the average speed per hour (km/h), the following 1 byte represents the counter value, and the following 4 bytes represent the MAC. In the example illustrated in FIG. 26, the MAC is expressed in hexadecimal form. The average speed per hour (km/h) in the first 1 byte takes a value in the range from a minimum speed of 0 (km/h) to a maximum speed of 180 (km/h). FIG. 26 illustrates, from top to bottom, message IDs and data corresponding to frames transmitted sequentially from the ECU 3400a, by way of example, and depicts a gradual increase in counter value and acceleration, increasing the average speed per hour from 0 km/h in increments of 1 km/h.

3.4 Example Transmission Frame from Brake-Related ECU 3400b

FIG. 27 is a diagram illustrating an example of an ID (message ID) and a data field (data) in a data frame transmitted from the ECU 3400b connected to the brakes 402. The ECU 3400b transmits a frame whose message ID is "2". In this figure, the data is delimited with spaces in blocks of 1 byte, in which the first 1 byte represents the degree to which the brakes are applied, expressed as a percentage (%), the following 1 byte represents the counter value, and the following 4 bytes represent the MAC. In the example illustrated in FIG. 27, the MAC is expressed in hexadecimal form. In the degree to which the brakes are applied in the first 1 byte, a state where the brakes are not applied at all is represented by 0(%) and a state where the brakes are maximally applied is represented by 100(%). FIG. 27 illustrates, from top to bottom, message IDs and data corresponding to frames transmitted sequentially from the ECU 3400b, by way of example, and depicts a gradual increase in counter value and a gradual easing off of the brakes from 100%.

3.5 Example Transmission Frame from Door-Open/Close-Sensor-Related ECU 3400c FIG. 28 is a diagram illustrating an example of an ID (message ID) and a data field (data) in a data frame transmitted from the ECU 3400c connected to the door open/close sensor 403. The ECU 3400c transmits a frame whose message ID is "3". In this figure, the data is delimited with spaces in blocks of 1 byte, in which the first 1 byte represents the open or closed state of the door, the following 1 byte represents the counter value, and the following 4 bytes represent the MAC. In the example illustrated in FIG. 28, the MAC is expressed in hexadecimal form. In the open or closed state of the door in the first 1 byte, the door-open state is represented by "1" and the door-closed state is represented by "0". FIG. 28 illustrates, from top to bottom, message IDs and data corresponding to frames transmitted sequentially from the ECU 3400c, by way of example, and depicts a gradual increase in counter value and a gradual transition from the door-open state to the closed state.

3.6 Example Transmission Frame from Window-Open/Close-Sensor-Related ECU 3400d FIG. 29 is a diagram illustrating an example of an ID (message ID) and a data field (data) in a data frame transmitted from the ECU 3400d connected to the window open/close sensor 404. The ECU 3400d transmits a frame whose message ID is "4". In this figure, the data is delimited with spaces in blocks of 1 byte, in which the first 1 byte represents the open or closed state of the window, expressed as a percentage (%), the following 1 byte represents the counter value, and the following 4 bytes represent the MAC. In the example illustrated in FIG. 29, the MAC is expressed in hexadecimal form. In the open or closed state of the window in the first 1 byte, a state where the window is completely closed is represented by 0(%) and a state where the window is completely open is represented by 100(%). FIG. 29 illustrates, from top to bottom, message IDs and data corresponding to frames transmitted sequentially from the ECU 3400d, by way of example, and depicts a gradual increase in counter value and a gradual transition from the window-closed state to the open state.

3.7 Configuration of Fraud-Sensing ECU 3100a

FIG. 30 is a configuration diagram of the fraud-sensing ECU 3100a. The fraud-sensing ECU 3100a is constituted by a frame transceiving unit 160, a frame interpretation unit 3150, a fraudulent MAC sensing unit 3130, a MAC key holding unit 3180, a counter holding unit 3190, a frame generation unit 140, a MAC generation unit 3170, and a fraud-sensing counter holding unit 110. These constituent elements are functional ones, and each of their functions is implemented by an element in the fraud-sensing ECU 3100a, such as a communication circuit, a processor that executes a control program stored in a memory, or a digital circuit. The fraud-sensing ECU 3100a is obtained by partially modifying the fraud-sensing ECU 100a illustrated in the first embodiment, and constituent elements having functions similar to those in the first embodiment are designated by the same numerals and are not described. The fraud-sensing ECU 3100b also has a similar configuration.

The frame interpretation unit 3150 is obtained by modifying the frame interpretation unit 150 illustrated in the first embodiment, and is configured to receive values of a frame from the frame transceiving unit 160 and to interpret and map the values into the respective fields in the frame formats specified in the CAN protocol. The frame interpretation unit 3150 transfers a value (data) judged to correspond to the data field when the frame is judged to be a data frame, together with the ID (message ID) in the ID field, to the fraudulent MAC sensing unit 3130. Further, the frame interpretation unit 3150 notifies the frame generation unit 140 that the frame generation unit 140 is requested to transmit an error frame if the frame is judged not to comply with the CAN protocol. Further, when an error frame is received, that is, when an error frame is interpreted to have started from a value in the received frame, the frame interpretation unit 3150 discards the subsequent part of the frame, that is, aborts interpretation of the frame.

The fraudulent MAC sensing unit 3130 has a function of receiving the message ID and the value in the data field (data) sent from the frame interpretation unit 3150 and verifying the MAC in the data field. The fraudulent MAC sensing unit 3130 notifies the MAC generation unit 3170 of the message ID and the value in the data field, which have been sent, and obtains a MAC generated by the MAC generation unit 3170. The fraudulent MAC sensing unit 3130 determines whether or not the data in the data field meets a predetermined condition indicating a fraud. That is, the fraudulent MAC sensing unit 3130 functions as a so-called determination unit that determines whether or not the content of a predetermined field in a received frame meets a predetermined condition indicating a fraud. The predetermined condition indicating a fraud is failure of verification in a preset verification process procedure (a procedure including the generation of a MAC, the comparison of MACs, and so forth), that is, a condition in which the MAC included in the data does not match the MAC generated by the MAC generation unit 3170. The fraudulent MAC sensing unit 3130 compares the MAC obtained from the MAC generation unit 3170 with the MAC in the data field to determine whether or not a fraud has occurred (that is, verify the MAC). If a match is not found as a result of the comparison between the values of the two MACs, the fraudulent MAC sensing unit 3130 notifies the fraud-sensing counter holding unit 110 of the received message ID in order to increment the number of times a fraud has been sensed. The control performed to, when the number of times a fraud has been sensed reaches a certain number or more, transmit an error display message so that the error display message can be received by the head unit 200 has been described in the first embodiment, and is not described here. If a match is not found as a result of the comparison between the values of the two MACs, furthermore, the fraudulent MAC sensing unit 3130 notifies the frame generation unit 140 that the frame generation unit 140 is requested to transmit an error frame. If a match is found as a result of the comparison between the MAC values, the fraudulent MAC sensing unit 3130 notifies the MAC generation unit 3170 that the MAC generation unit 3170 is requested to increment the counter value corresponding to the message ID, which is held in the counter holding unit 3190.

The MAC generation unit 3170 obtains the corresponding MAC key from the MAC key holding unit 3180 by using the message ID sent from the fraudulent MAC sensing unit 3130, and obtains the corresponding counter from the counter holding unit 3190. The MAC generation unit 3170 calculates (derives through computation) a MAC by using the MAC key obtained from the MAC key holding unit 3180 for the value in the data field (the value in the first 1 byte) sent from the fraudulent MAC sensing unit 3130 and the counter value obtained from the counter holding unit 3190, and notifies the fraudulent MAC sensing unit 3130 of the calculated MAC. The fraud-sensing ECUs 3100a and 3100b and the ECUs 3400a to 3400d use the same algorithm to calculate a MAC by using a MAC key.

The MAC key holding unit 3180 holds a MAC key necessary for computing a MAC in association with each message ID. The MAC keys held in the MAC key holding unit 3180 have different values for the respective message IDs associated therewith. If it is assumed that a single transmitting node transmits frames each corresponding to one of a plurality of message IDs, MAC keys used for ECUs and fraud-sensing ECUs may be keys different for each transmitting node. The MAC keys may also be configured such that, for example, the same value is used for frames to be transmitted on the same bus, the same key (value) is used even on different buses, the same key is used for each vehicle, the same key is used for the same type of vehicle, the same key is used for each same producer, or the same key is used for different producers.

The counter holding unit 3190 holds, for each message ID, a counter value necessary for computing a MAC value. The counter value is incremented when a frame is properly received (that is, when the MACs match as a result of comparison by the fraudulent MAC sensing unit 3130).

3.8 Example of Counter Values

FIG. 31 is a diagram illustrating an example of counter values for the individual message IDs held in the counter holding unit 3190. In this figure, the counter whose message ID is "1" indicates 1 count, the counter whose message ID is "2" indicates 10 counts, the counter whose message ID is "3" indicates 15 counts, and the counter whose message ID is "4" indicates 100 counts. The counter value corresponding to each of the message IDs represents the number of times a frame including the message ID has been properly received.

3.9 Sequence for Fraudulent-Frame Sensing

A description will now be given of the operation of the fraud-sensing ECU 3100a, the ECU 3400a, the ECU 3400b, the gateway 300, and so forth connected to the bus 500a in the in-vehicle network system 12 having the configuration described above in a case where a fraudulent ECU is connected to the bus 500a.

FIG. 32 and FIG. 33 illustrate a sequence diagram illustrating an example operation for, in response to sensing of a fraudulent frame (message) by the fraud-sensing ECU 3100a, preventing any other ECU from performing a process corresponding to the fraudulent frame. In FIG. 32 and FIG. 33, as in FIG. 18 given in the first embodiment and FIG. 22 and FIG. 23 given in the second embodiment, an example is illustrated in which a fraudulent ECU is connected to the bus 500a. This fraudulent ECU transmits a data frame whose message ID is "4" and data field (data) is "0xFF FF FF FF FF FF" (6 bytes). The same sequences as the sequences illustrated in the first embodiment or 2 are designated by the same numerals, and are described here in a simplified way.

First, a fraudulent ECU starts to transmit the fraudulent data frame described above (sequence S1001a). Each of the fraud-sensing ECU 3100a, the ECU 3400a, the ECU 3400b, and the gateway 300 receives a message ID (sequence S1002). Each of the ECU 3400a, the ECU 3400b, and the gateway 300 checks the message ID by using the reception-ID list held therein (sequence S1003). The ECU 3400a and the ECU 3400b terminate reception since the respectively held reception-ID lists do not include "4" (see FIG. 9). The gateway 300 continues reception and receives the data field since the held reception-ID list includes "4" (see FIG. 5) (sequence S1006a). Likewise, the fraud-sensing ECU 3100a also receives the data field (sequence S1006a).

Subsequently to sequence S1006a, the fraud-sensing ECU 3100a verifies (checks) the MAC included in the data in the data field (sequence S3001). That is, the fraud-sensing ECU 3100a determines whether or not the content of the ID field in the transmitted frame meets a predetermined condition (failure of verification of the MAC) indicating a fraud. The fraud-sensing ECU 3100a verifies the MAC by comparing the MAC, which is the last 4 bytes for the 6-byte data "0xFF FF FF FF FF FF" in the data field in the data frame transmitted from the fraudulent ECU, with a MAC determined by using the MAC key and the counter corresponding to the message ID "4". Here, a match is not found as a result of the comparison and verification fails. Thus, the fraud-sensing ECU 3100a judges that the data frame is fraudulent, and then starts to prepare the issuance of an error frame (sequence S1005).

While the fraud-sensing ECU 3100a is preparing the issuance of an error frame, the gateway 300 starts the reception of the CRC field (sequence S2002).

Then, the preparation of the issuance of an error frame is completed, and the fraud-sensing ECU 3100a transmits an error frame (sequence S1007). The transmission of the error frame is started, thus allowing the middle part of the CRC sequence in the frame being transmitted from the fraudulent ECU to be overwritten with the error frame on the bus 500a.

The gateway 300 which has received the error frame transmitted in sequence S1007 aborts reception of the data frame being transmitted from the fraudulent ECU during the reception of the CRC field including the CRC sequence (sequence S2003).

The fraud-sensing ECU 3100a increments the fraud-sensing counter corresponding to the ID "4" of the data frame for which the error frame has been transmitted (sequence S1009). If the fraud-sensing counter corresponding to the ID "4" becomes greater than or equal to 17 as a result of the increment, the fraud-sensing ECU 3100a transmits an error display message (sequence S1010).

3.10 Advantageous Effects of Third Embodiment

A fraud-sensing ECU illustrated in the third embodiment determines whether a transmitted frame is a fraudulent frame or not by verifying a MAC included in a data field of a frame (data frame). This can prevent existing ECUs (that is, ECUs other than a fraud-sensing ECU and a fraudulent ECU) from interpreting a fraudulent frame and from performing a process corresponding to the frame. In addition, it is only required to receive the data frame up to the data field to perform determination, thereby making it possible to reduce bus traffic, compared to the case where determination is performed after the receipt of the latter part of the data frame.

In addition, the fraud-sensing ECU counts the number of times an error frame has been transmitted, by using fraud-sensing counters, and can thus detect that a transmission error counter in a node that transmits a fraudulent message ID has reached an upper limit value at which the transition to the passive state is required according to the CAN protocol in response to receipt of an error frame. This makes it possible to determine whether or not a node that transmits a fraudulent message ID is compatible with the specification of an error counter in the CAN protocol.

In addition, the use of only a fraud-sensing ECU as a node for the verification of a MAC can eliminate the need for an ECU other than the fraud-sensing ECU to perform verification, resulting in the amount of processing and the amount of power consumption being reduced in the entire system.

Fourth Embodiment

An embodiment of the present disclosure will now be described in the context of an in-vehicle network system 13 including a fraud-sensing ECU that, in response to a failure in the verification of a message authentication code (MAC) upon receipt of a data frame, transmits an update frame to the source ECU that has transmitted the data frame including the MAC to request an update of data used for generating a MAC and that re-verifies the MAC. In the in-vehicle network system 13, as illustrated in the third embodiment, an ECU transmits a frame (data frame) including a MAC generated through calculation by using a message ID, the value of data, and a counter value, and the fraud-sensing ECU verifies the MAC in the received frame. In the in-vehicle network system 13, an anti-fraud method for performing, in response to a failure in the verification of the MAC, processes such as updating either or both of a MAC key and a counter value which are used for generating a MAC.

4.1 Overall Configuration of in-Vehicle Network System 13

FIG. 34 is a diagram illustrating an overall configuration of an in-vehicle network system 13 according to a fourth embodiment. The in-vehicle network system 13 is obtained by partially modifying the in-vehicle network system 12 illustrated in the third embodiment (or the in-vehicle network system 10 illustrated in the first embodiment). The in-vehicle network system 13 is configured to include buses 500a, 500b, and 500c, fraud-sensing ECUs 4100a and 4100b, a head unit 200, a gateway 300, and nodes connected to the buses, called ECUs, such as ECUs 4400a to 4400d connected to various devices. Of the constituent elements of the in-vehicle network system 13, constituent elements having functions similar to those in the first embodiment (or the third embodiment) are designated by the same numerals and are not described.

The fraud-sensing ECUs 4100a and 4100b are ECUs connected to the bus 500a and the bus 500b, respectively, and having a function of determining whether frames transmitted from the ECUs 4400a to 4400d, etc. are fraudulent or not and transmitting an error frame if the frames are fraudulent, a function of transmitting an update frame for providing instructions to update either or both of a MAC key and a counter value, and any other function. Examples of the update frame specifically include a key-update frame for providing instructions to update a MAC key, a key-update & counter-reset frame for providing instructions to update a MAC key and to reset a counter value, and a counter-reset frame for providing instructions to reset a counter. Of these update frames, the key-update frame and the key-update & counter-reset frame are so-called MAC key update request frames having a feature as a frame for requesting an update of a MAC key. Of the update frames, furthermore, the counter-reset frame and the key-update & counter-reset frame are so-called counter reset request frames having a feature as a frame for requesting an update (reset) of a counter value. While the storage of a MAC in the data field of a data frame is illustrated in the third embodiment by way of example, it is difficult to say that the data length of the MAC which can be stored in the data field is sufficiently long. On the contrary, an appropriate update of a MAC key or an appropriate reset of a counter value in the in-vehicle network system 13 can produce effects in enhancing resistance against a brute-force attack and the like on a MAC from a fraudulent ECU.

The ECUs 4400a to 4400d are each connected to any bus, and are connected to the engine 401, the brakes 402, the door open/close sensor 403, and the window open/close sensor 404, respectively. Each of the ECUs 4400a to 4400d obtains the state of the device connected thereto (such as the engine 401), and periodically transmits a data frame indicating the state to a network (that is, the bus). The data frame to be transmitted has a data field which is assigned a message authentication code (MAC) derived from a message ID, a data value, and a counter value incremented for each transmission through computation.

4.2 Configuration of ECU 4400a

FIG. 35 is a configuration diagram of the ECU 4400a. The ECU 4400a is configured to include a frame transceiving unit 460, a frame interpretation unit 450, a reception-ID judgment unit 430, a reception-ID list holding unit 440, a frame processing unit 410, a frame generation unit 3420, a data obtaining unit 470, a MAC generation unit 3410, a MAC key holding unit 4430, a counter holding unit 3440, a MAC key update unit 4410, and a counter reset unit 4420. These constituent elements are functional ones, and each of their functions is implemented by an element in the ECU 4400a, such as a communication circuit, a processor that executes a control program stored in a memory, or a digital circuit. The ECU 4400a is obtained by partially modifying the ECU 3400a illustrated in the third embodiment (or the ECU 400a illustrated in the first embodiment), and constituent elements having functions similar to those in the first and third embodiments are designated by the same numerals and are not described.

The MAC key holding unit 4430 is implemented by a storage medium such as a memory, and holds a key table in which two MAC keys before and after an update (keys necessary for calculating a MAC) are associated with each key ID for identifying a MAC key. The key table and the update of a MAC key will be described later with reference to FIG. 39. It is assumed here that a different MAC key is used for each message ID and accordingly has a key ID which is identical to the message ID. Note that in a case where a MAC is generated by the MAC generation unit 3410, the MAC key after the update is basically used unless otherwise indicated.

The counter holding unit 3440 is implemented by a storage medium such as a memory, and holds a counter table in which a counter value is associated with each counter ID for identifying a counter key. The counter table and the update (reset) of a counter value will be described later with reference to FIG. 40. It is assumed here that a different counter is used for each message ID and accordingly has a counter ID which is identical to the message ID.

When the frame transceiving unit 460 receives a key-update frame or a key-update & counter-reset frame, the MAC key update unit 4410 updates a MAC key held in the MAC key holding unit 4430 in accordance with the frame.

When the frame transceiving unit 460 receives a counter-reset frame or a key-update & counter-reset frame, the counter reset unit 4420 resets a counter value held in the counter holding unit 3440 in accordance with the frame.

The ECUs 4400*b* to 4400*d* are obtained by partially modifying the ECUs 3400*b* to 3400*d* illustrated in the third embodiment, respectively, and have a configuration basically similar to that of the ECU 4400*a* described above. However, the reception-ID list held in the reception-ID list holding unit 440, the key table held in the MAC key holding unit 4430, and the counter table held in the counter holding unit 3440 may have different content from one ECU to another. In addition, as illustrated in the first embodiment, the content of the process of the frame processing unit 410 differs from one ECU to another.

4.3 Configuration of Fraud-Sensing ECU 4100*a*

FIG. 36 is a configuration diagram of the fraud-sensing ECU 4100*a*. The fraud-sensing ECU 4100*a* is configured to include a frame transceiving unit 160, a frame interpretation unit 4151, a fraudulent MAC sensing unit 4131, a MAC key holding unit 4180, a counter holding unit 3190, a frame generation unit 140, a MAC generation unit 3170, a MAC key update unit 4110, a counter reset unit 4120, a security processing unit 4130, a security condition holding unit 4140, a fraudulent-ID list holding unit 4150, a fraud log holding unit 4160, and a mode change processing unit 4170. These constituent elements are functional ones, and each of their functions is implemented by an element in the fraud-sensing ECU 4100*a*, such as a communication circuit, a processor that executes a control program stored in a memory, or a digital circuit. The fraud-sensing ECU 4100*a* is obtained by partially modifying the fraud-sensing ECU 3100*a* illustrated in the third embodiment (or the fraud-sensing ECU 100*a* illustrated in the first embodiment), and constituent elements having functions similar to those in the first and third embodiments are designated by the same numerals and are not described. The fraud-sensing ECU 4100*b* also has a similar configuration.

The frame interpretation unit 4151 is obtained by partially modifying the frame interpretation unit 3150 illustrated in the third embodiment and adding a function. The frame interpretation unit 4151 receives values of a frame from the frame transceiving unit 160, and interprets and maps the values into the respective fields in the frame formats specified in the CAN protocol. The frame interpretation unit 4151 transfers a value (data) judged to correspond to the data field when the frame is judged to be a data frame, together with the ID (message ID) in the ID field, to the fraudulent MAC sensing unit 4131. Further, the frame interpretation unit 4151 notifies the frame generation unit 140 that the frame generation unit 140 is requested to transmit an error frame if the frame is judged not to comply with the CAN protocol or if the message ID is an ID included in a fraudulent-ID list held in the fraudulent-ID list holding unit 4150. Further, when an error frame is received, that is, when an error frame is interpreted to have started from a value in the received frame, the frame interpretation unit 4151 discards the subsequent part of the frame, that is, aborts interpretation of the frame.

The MAC key holding unit 4180 is implemented by a storage medium such as a memory, and holds a key table in which two MAC keys before and after an update (keys necessary for calculating a MAC) are associated with each key ID for identifying a MAC key. It is assumed here that a different MAC key is used for each message ID and accordingly has a key ID which is identical to the message ID. Note that in a case where a MAC is generated by the MAC generation unit 3170, the MAC key after the update is basically used unless otherwise indicated.

The counter holding unit 3190 is implemented by a storage medium such as a memory, and holds a counter table in which a counter value (a counter value necessary for computing a MAC) is associated with each counter ID for identifying a counter key. It is assumed here that a different counter is used for each message ID and accordingly has a counter ID which is identical to the message ID. The counter value is incremented when a frame is properly received.

When the frame transceiving unit 160 receives a key-update frame or a key-update & counter-reset frame, the MAC key update unit 4110 updates a MAC key held in the MAC key holding unit 4180 in accordance with the frame.

When the frame transceiving unit 160 receives a counter-reset frame or a key-update & counter-reset frame, the counter reset unit 4120 resets a counter value held in the counter holding unit 3190 in accordance with the frame.

The fraudulent MAC sensing unit 4131 is obtained by partially modifying the fraudulent MAC sensing unit 3130 illustrated in the third embodiment, and has a function of receiving the message ID and the value in the data field (data) sent from the frame interpretation unit 4151 and verifying the MAC in the data field. The fraudulent MAC sensing unit 4131 notifies the MAC generation unit 3170 of the message ID and the value in the data field, which have been sent, and obtains a MAC generated by the MAC generation unit 3170. The fraudulent MAC sensing unit 4131 determines whether or not the data in the data field meets a predetermined condition indicating a fraud. The predetermined condition indicating a fraud is failure of verification in a preset verification process procedure (a procedure including the generation of a MAC, the comparison of MACs, and so forth), that is, a condition in which the MAC included in the data does not match the MAC generated by the MAC generation unit 3170. The fraudulent MAC sensing unit 4131 compares the MAC obtained from the MAC generation unit 3170 with the MAC in the data field to determine whether or not a fraud has occurred (that is, verify the MAC). If a match is not found as a result of the comparison between the values of the two MACs, the fraudulent MAC sensing unit 4131 increments the fraud count for the corresponding message ID in a security condition table in the security condition holding unit 4140. If a match is not found as a result of the comparison between the values of the two MACs, furthermore, the fraudulent MAC sensing unit 4131 notifies the frame generation unit 140 that the frame generation unit 140 is requested to transmit an error frame. If a match is not found as a result of the comparison between the values of the two MACs, furthermore, the fraudulent MAC sensing unit 4131 requests the frame generation unit 140 to transmit an update frame because of the possibility of MAC keys or counter values not having been synchronously updated between the corresponding device (the fraud-sensing ECU 4100*a*) and the source ECU that has transmitted the data frame. The update frame transmitted in this case is basically a key-update & counter-reset frame. Instead of the key-update & counter-reset frame, a key-update frame and a counter-reset frame may be sequentially transmitted. Before requesting the frame generation unit 140 to transmit a key-update & counter-reset frame, the fraudulent MAC sensing unit 4131 may generate a MAC by using the MAC key before the update to re-verify the MAC included in the data field described above. If the re-verification is successful (that is, if both MACs match), it may be estimated that the counters are synchronized and, because of the need for synchronization of the MAC keys, the fraudulent MAC sensing unit 4131 may request the frame generation unit 140 to transmit a key-update frame instead of a key-update & counter-reset frame. If the re-verification has failed, a method of transmitting a counter-reset frame may also be adopted in terms of the possibility that the counters might not be synchronized. Further, if the verification of the MAC is successful (if the values of the two MACs match as a result of comparison), the fraudulent MAC sensing unit 4131 notifies the MAC generation unit 3170 that the MAC generation unit 3170 is requested to increment the counter value corresponding to the message ID, which is held in the counter holding unit 3190.

The security condition holding unit 4140 is implemented by a storage medium such as a memory, and holds a security condition table 620 that defines security actions, each of which is a process for addressing a case where a verification failure (the state where a match is not found as a result of comparison between the value of the generated MAC and the value of the MAC in the received data field) still occurs as a result of further verifying the MAC even after an update frame (a key-update frame, a counter-reset frame, or a key-update & counter-reset frame) has been transmitted. The security condition table 620 will be described later with reference to FIG. 41.

The security processing unit 4130 executes a security action in accordance with the security condition table 620 held in the security condition holding unit 4140. The security actions include processes such as a process of adding the message ID of a frame for which the verification of the MAC has failed to the fraudulent-ID list held in the fraudulent-ID list holding unit 4150, a process of recording the message ID in a log held in the fraud log holding unit 4160, a process of instructing the mode change processing unit 4170 to put the vehicle into a safe state.

The fraudulent-ID list holding unit 4150 is implemented by a storage medium such as a memory, and holds a fraudulent-ID list for listing message IDs of data frames judged to be fraudulent (such as data frames for which the verification of the MACs has failed).

The fraud log holding unit 4160 is implemented by a storage medium (recording medium) such as a memory or a hard disk, and holds a log for recording events such as the transmission of a fraudulent data frame. Examples of information on events to be recorded in the log include a message ID of a fraudulent data frame, the date and time at which the fraudulent data frame was transmitted, and the number of times the fraudulent data frame has been transmitted. In order to prevent tampering with the log, the content of the log may be marked with digital signature or the like or the content of the log may be encrypted.

Upon being instructed by the security processing unit 4130 to put the vehicle into the safe state, the mode change processing unit 4170 causes the frame generation unit 140 to generate a mode change frame that is a frame determined in advance to inform any other ECU that the vehicle is to be put into the safe state (such as a state where the speed of the vehicle is limited to a certain speed or less). A mode change frame is generated by the frame generation unit 140 and is transmitted from the frame transceiving unit 160. Then, upon receipt of the mode change frame, any other ECU can execute predetermined control (such as control for limiting the speed of the engine of the vehicle to a certain speed or less). Note that the content of the predetermined control for putting the vehicle into the safe state is not specifically limited to reducing the speed of the vehicle.

4.4 Example Reception-ID List in ECU 4400*a*

FIG. 37 is a diagram illustrating an example of a reception-ID list held in the reception-ID list holding unit 440 of the ECU 4400*a*. The ECU 4400*a* selectively receives and processes a frame including any of the message IDs listed in the reception-ID list among the frames flowing in the bus. Since the ECU 4400*a* receives a key-update frame for providing instructions to update a MAC key, a counter-reset frame for providing instructions to update a counter value, and a key-update & counter-reset frame for providing instructions to update a MAC key and reset a counter, these IDs are registered in the reception-ID list. In the example of the reception-ID list illustrated in FIG. 37, "2001" represents an ID of a key-update frame, "2002" represents an ID of a counter-reset frame, and "2003" represents an ID of a key-update & counter-reset frame. The ECU 4400*b* also holds a similar reception-ID list. In this embodiment, because of the need for synchronized updating of MAC keys or the like, the reception-ID list (see FIG. 5) held in the gateway 300 is assumed to further include the ID "2001" of the key-update frame, the ID "2002" of the counter-reset frame, and the ID "2003" of the key-update & counter-reset frame.

4.5 Update Frame

FIG. 38 is a diagram illustrating an example of an update frame. While this figure illustrates an example of the key-update & counter-reset frame among the update frames, the key-update frame and the counter-reset frame each also have a similar configuration.

In the key-update & counter-reset frame, a key-update & counter-reset ID (an ID used for the key-update & counter-reset frame), namely, "2003", is used as the message ID in the ID field. In the data field, target message IDs (update target ID) for which processes such as updating a MAC key and resetting a counter are to be performed and the MAC are set. In FIG. 38, (a) illustrates a specific example of a key-update & counter-reset frame for providing instructions to update all the MAC keys and reset all the counters at a time regardless of the message ID. The data "0xFFFF" is used to indicate all the message IDs. In FIG. 38, furthermore, (b) illustrates a specific example of a key-update & counter-reset frame for providing instructions to update a MAC key and reset a counter for the message ID "4" at a time.

4.6 Key Table

FIG. 39 is a diagram illustrating an example of the key table held in the MAC key holding unit 4180 of the fraud-sensing ECU 4100a. The key table is constructed such that a key ID, update information for identifying a MAC key before an update or a MAC key after the update, and a key value are associated with one another. When a MAC key is updated, a new MAC key generated by the MAC key update unit 4110 is written in the table as the key value "after the update" and the previously available MAC key is recorded as the key value "before the update". It is assumed here that a different MAC key is used for each message ID and accordingly has a key ID which is identical to the message ID.

The fraud-sensing ECU 4100a holds MAC keys with a plurality of key IDs to support frames receivable by the corresponding device. Similarly to the fraud-sensing ECU 4100a, each of the fraud-sensing ECU 4100b and the ECUs 4400a to 4400d also holds a MAC key table for storing MAC keys before and after an update in association with each of the message IDs of the frames to be transmitted or received by the corresponding device.

The MAC key update unit 4110 of the fraud-sensing ECU 4100a and the like or the MAC key update unit 4410 of the ECU 4400a and the like updates a MAC key by, for example, the following procedures: recording a key value (MAC key) "after an update", which is used for the generation of a MAC, in the key table as a key value "before the update" and recording a value derived by inputting the MAC key "after the update" to a predetermined one-way function (such as a hash function) in the key table as a new MAC key, that is, newly as a key value "after the update". The arithmetic procedure for deriving a new MAC key may be implemented using a function that outputs a new MAC key in accordance with a predetermined algorithm on the basis of an input seed. In this case, for example, a seed may be included in the data field of an update frame (key-update frame or a key-update & counter-reset frame) for providing instructions to update a MAC key, or the counter value, information on the current time, or the like may be used as a seed. That is, it is desirable that a plurality of ECUs (or fraud-sensing ECUs) among which MAC keys are to be synchronously updated generate an identical MAC key.

4.7 Counter Table

FIG. 40 is a diagram illustrating an example of the counter table held in the counter holding unit 3190 of the fraud-sensing ECU 4100a. The counter table is constructed such that a counter ID and a counter value are associated with each other. It is assumed here that a different counter is used for each message ID and accordingly has a counter ID which is identical to the message ID. The fraud-sensing ECU 4100a holds counter values with a plurality of counter IDs to support frames receivable by the corresponding device. Similarly to the fraud-sensing ECU 4100a, each of the fraud-sensing ECU 4100b and the ECUs 4400a to 4400d also holds a counter table for storing a counter value in association with each of the message IDs of the frames to be transmitted or received by the corresponding device. A counter value corresponding to a message ID in the counter table is incremented (increased by 1) when the frame having the message ID is properly transmitted or received. In this method, a counter value is handled as a transmission counter for the transmission of a data frame, and the number of transmissions is counted. For the reception of a data frame, a counter value is handled as a reception counter, and the number of receptions is counted. For example, in the ECU 4400a that transmits a data frame whose message ID is "1", the counter value corresponding to the counter ID "1" in the counter table is handled as a transmission counter, and the transmission counter is incremented each time a transmission is initiated. In addition, for example, in the ECU 4400b that receives a data frame whose message ID is "1", the counter value corresponding to the counter ID "1" in the counter table is handled as a reception counter, and the reception counter is incremented each time a transmitted data frame is properly received.

The reset of a counter value by the counter reset unit 4120 of the fraud-sensing ECU 4100a and the like or the counter reset unit 4420 of the ECU 4400a and the like is achieved by, for example, updating the counter value to reach a predetermined specific value such as zero. The specific value may not necessarily be zero so long as a plurality of ECUs (or fraud-sensing ECUs) among which counter values are to be synchronously updated (reset) hold an identical counter value after the reset.

4.8 Security Condition Table 620

FIG. 41 is a diagram illustrating an example of the security condition table 620 held in the security condition holding unit 4140. The security condition table 620 is constituted by a functional category 621, a message ID 622, a fraud count 623, a fraud count threshold 624, and a security action 625. The functional category 621 is an item for classifying message IDs of frames by data that is the content of the frame (data frame) or by the function associated with the source ECU that has transmitted the frame (such as the function of the device to which the source ECU is connected). Each of a plurality of buses in the in-vehicle network system 13 belongs to any one or a plurality of groups among a plurality of types of groups (functional groups) in terms of a function associated with an ECU connected to the bus. Accordingly, the functional category 621 can be said to indicate via which bus the frame with the corresponding message ID is transmitted, that is, to which group among the plurality of types of groups the bus via which the frame is transmitted belongs. A "drive system" indicates a function associated with movement of a vehicle, such as control of the engine, motor, fuel, battery, and transmission, and corresponds to, for example, the ECU 4400a. A "chassis system" indicates a function associated with control of the brakes, steering, and the like, such as vehicle behavior, for example, "turning", "stopping", etc., and corresponds to, for example, the ECU 4400b. A "body system" indicates a function of controlling vehicle equipment such as a door lock, an air-conditioner, lights, and turn signals, and corresponds to, for example, the ECUs 4400c and 4400d. In addition, for example, a "safe and comfortable support function" is a function for automatically providing a safe and comfortable drive, including automatic braking, a lane keeping function, a distance keeping function, and a collision avoidance function. An "ITS (Intelligent Transportation Systems) function" is a function supporting an advanced road transportation system such as an ETC (Electronic Toll Collection System). "Telematics" is a function supporting services based on mobile communication, such as vehicle theft tracking. "Infotainment" is an entertainment function associated with car navigation and audio systems and the like. The message ID 622 is an ID of a frame based on the CAN protocol. The fraud count 623 is an item (field) for storing the number of times the verification of the MAC has failed (the number of error occurrences). The fraud count threshold 624 indicates a threshold at which the security action is triggered, where the security action is executed when the value of the fraud count 623 becomes greater than or equal to this threshold. The security action 625 is information that defines whether or not to execute each of various security actions that are processes for measures against fraud, each of the security actions being executed when the value of the fraud count 623 becomes greater than or equal to the threshold identified by the fraud count threshold 624. As illustrated in FIG. 41, the security action 625 defines whether or not to add to the fraudulent-ID list a message ID for which the verification of the MAC has failed, whether or not to notify the head unit 200 of the occurrence of a fraud, whether or not to record the occurrence of a fraud in a log, and whether or not to issue a mode change instruction to the mode change processing unit 4170 to put the vehicle into the safe state.

In the security condition table 620 illustrated in FIG. 41, the fraud count threshold 624 is set to "5" for the "drive system" and the "chassis system", and the fraud count threshold 624 is set to "10" for the "body system". In the example illustrated in FIG. 41, the security action 625 is "enabled" for adding to the fraudulent-ID list an message ID of a fraudulent frame (a frame for which verification has failed) and notifying the head unit 200 of the occurrence of a fraud so that these operations are executed for all the functional categories. In addition, a mode change instruction ("enabled (transition to safe state)") for putting the vehicle into the safe state is defined only for the functional categories associated with safety, such as the "drive system", the "chassis system", and the "safe and comfortable support function". In the manner described above, the conditions under which security actions are executed and the content of processing of security actions are defined for each functional category in the security condition table 620. The content of the security condition table 620 may be set at the time of manufacture, sale, or the like of the in-vehicle network system.

4.9 Fraudulent-ID List

FIG. 42 is a diagram illustrating an example of the fraudulent-ID list held in the fraudulent-ID list holding unit 4150. When a frame with a message ID for which the addition to the fraudulent-ID list is defined to be "enabled" as the security action 625 in the security condition table is judged to be fraudulent (that is, when the verification of the MAC in the frame has failed), the security processing unit 4130 adds the message ID to the fraudulent-ID list. A message ID that is not usually transmitted in the in-vehicle network system 13 may be included in advance in the fraudulent-ID list.

4.10 Sequence for Fraudulent-Frame Sensing and Security Action

A description will now be given of the operation of the fraud-sensing ECU 4100a, the ECU 4400a, the ECU 4400b, the gateway 300, and so forth connected to the bus 500a in the in-vehicle network system 13 having the configuration described above in a case where a fraudulent ECU is connected to the bus 500a.

FIGS. 43 to 45 illustrate a sequence diagram illustrating an example operation in which the fraud-sensing ECU 4100a senses a fraudulent frame (message), each ECU updates a MAC key and resets a counter value, and the fraud-sensing ECU 4100a executes a security action. Here, the description is given assuming that the security condition table held in the fraud-sensing ECU 4100a has the content illustrated by way of example in FIG. 41. An example in which a fraudulent ECU is connected to the bus 500a is assumed here. The fraudulent ECU transmits a data frame whose message ID is "4" and which includes the data "0xFF" or the like in the data field.

First, a fraudulent ECU starts to transmit the fraudulent data frame described above (sequence S4001). The fraud-sensing ECU 4100a, the ECU 4400a, the ECU 4400b, and the gateway 300 each receive a message ID (sequence S4002). Each of the ECU 4400a, the ECU 4400b, and the gateway 300 checks the message ID by using the reception-ID list held therein (sequence S4003). The ECU 4400a and the ECU 4400b terminate reception since the respectively held reception-ID lists do not include "4" (see FIG. 37). The gateway 300 continues reception and receives the data field since the held reception-ID list includes "4" (see FIG. 5) (sequence S4004). Likewise, the fraud-sensing ECU 4100a also receives the data field (sequence S4004).

Subsequently to sequence S4004, the fraud-sensing ECU 4100a verifies the MAC included in the data in the data field (sequence S4005). That is, the fraud-sensing ECU 4100a verify the MAC by comparing the content at a predetermined position at which the MAC in the data in the data field in the transmitted frame should be included with a MAC generated by the MAC generation unit 3170 using the MAC key (that is, the MAC key held in the key table as the key value "after the update" corresponding to the ID "4") and the like. Since the fraudulent data frame transmitted from the fraudulent ECU does not store a correct MAC, a match is not found as a result of the comparison and the verification of the MAC fails. When the verification of the MAC has failed, the fraud-sensing ECU 4100a increments the value of the fraud count 623 corresponding to the message ID "4" in the security condition table 620.

If any fraudulent ECU is connected in the in-vehicle network system 13, it is useful to update data used for generating a MAC (that is, update a MAC key or reset a counter value) in order to enhance resistance against a brute-force attack and the like on a MAC from a fraudulent ECU. In connection with the update of the data, if a fraud-sensing ECU has failed to verify the MAC, it is probable that the synchronization of MAC keys or counter values has failed between the fraud-sensing ECU and an authorized ECU. It is also probable that the verification of the MAC has failed due to a fraudulent data frame transmitted from a fraudulent ECU. In terms of these probabilities, if the verification of the MAC has failed, the fraud-sensing ECU 4100a transmits an update frame. That is, in the fraud-sensing ECU 4100a, in response to a failure in the verification of the MAC, the frame generation unit 140 generates a key-update & counter-reset frame (see FIG. 38) in which the message ID "4" is set as the update target ID (sequence S4006), and the frame transceiving unit 160 transmits the key-update & counter-reset frame (sequence S4007).

Each of the ECU 4400a, the ECU 4400b, and the gateway 300 receives the key-update & counter-reset frame since the reception-ID list includes the message ID "2003" of the key-update & counter-reset frame, which is an update frame (sequence S4008).

Then, each of the ECU 4400a, the ECU 4400b, and the gateway 300 judges whether or not the received update frame indicates instructions to update a MAC key (sequence S4009), and updates a MAC key (sequence S4010) if the received update frame is a key-update frame for providing instructions to update a MAC key or a key-update & counter-reset frame.

Further, each of the ECU 4400a, the ECU 4400b, and the gateway 300 judges whether or not the received update frame indicates instructions to update (reset) a counter value (sequence S4011), and resets a counter value (sequence S4012) if the received update frame is a counter-reset frame for providing instructions to reset a counter value or a key-update & counter-reset frame.

Although not illustrated in FIG. 44, the fraud-sensing ECU 4100a also performs the process procedure in sequences S4008 to S4012 and can also update the MAC key corresponding to the message ID "4" and reset the counter value corresponding to the message ID "4" in a similar way.

Further, the fraud-sensing ECU 4100a judges whether or not the value of the fraud count 623 corresponding to any message ID in the security condition table 620 becomes greater than or equal to the corresponding threshold identified by the fraud count threshold 624 (sequence S4013), and performs a security action process (FIG. 46) (sequence S4014) if the value of the fraud count 623 becomes greater than or equal to the threshold. Prior to the further description of the sequences in FIG. 45, the security action process will be described in conjunction with FIG. 46. The description will be made using an example in which the value of the fraud count 623 corresponding to the message ID "4" in the security condition table 620 becomes greater than or equal to the threshold identified by the fraud count threshold 624.

FIG. 46 is a flowchart illustrating a security action process performed by the fraud-sensing ECU 4100a.

The fraud-sensing ECU 4100a determines whether or not adding to the fraudulent-ID list is "enabled", in accordance with the security action 625 corresponding to a message ID (in the example sequence illustrated in FIG. 45, "4") for which the value of the fraud count 623 in the security condition table 620 becomes greater than or equal to the threshold identified by the fraud count threshold 624 (step S4020). If it is "enabled", the security processing unit 4130 of the fraud-sensing ECU 4100a adds the message ID to the fraudulent-ID list held in the fraudulent-ID list holding unit 4150 (step S4021).

The fraud-sensing ECU 4100a further determines whether or not providing notification to the head unit is "enabled", in accordance with the security action 625 corresponding to the message ID "4" in the security condition table 620 (step S4022). If it is "enabled", the security processing unit 4130 of the fraud-sensing ECU 4100a provides notification to the head unit 200 by, for example, performing control to transmit a frame including information indicating that a fraudulent frame has been transmitted (step S4023).

The fraud-sensing ECU 4100a further determines whether or not recording a log is "enabled", in accordance with the security action 625 corresponding to the message ID "4" in the security condition table 620 (step S4024). If it is "enabled", the security processing unit 4130 of the fraud-sensing ECU 4100a additionally writes information on the event of the transmission of a fraudulent frame in the log held in the fraud log holding unit 4160 (step S4025).

The fraud-sensing ECU 4100a further determines whether or not a mode change to put the vehicle into the safe state is "enabled", in accordance with the security action 625 corresponding to the message ID "4" in the security condition table 620 (step S4026). If it is "enabled", the security processing unit 4130 of the fraud-sensing ECU 4100a issues a mode change instruction to the mode change processing unit 4170 to put the vehicle into the safe state (step S4027).

When the value of the fraud count 623 corresponding to the message ID "4" becomes greater than or equal to the corresponding threshold identified by the fraud count threshold 624, adding the message ID to the fraudulent-ID list (step S4021) and notifying the head unit 200 of information on the transmission of a fraudulent frame (step S4023) are performed.

Reference back to the description of the sequences in FIG. 45 is made.

It is assumed here that a fraudulent ECU re-transmits a data frame whose message ID is "4" and which includes the data "0xFF" or the like in the data field (sequence S4015) after the fraud-sensing ECU 4100a has performed the security action process described above.

At this point in time, the same message ID as the message ID "4" received by the fraud-sensing ECU 4100a is included in the fraudulent-ID list held in the fraudulent-ID list holding unit 4150 (sequence S4016). Thus, the frame interpretation unit 4151 of the fraud-sensing ECU 4100a causes the frame generation unit 140 to generate an error frame (sequence S4017).

Then, the fraud-sensing ECU 4100a transmits an error frame from the frame transceiving unit 160 (sequence S4018). Accordingly, before the transmission of the data frame with the message ID "4" from the fraudulent ECU is completed, part of the data frame is overwritten with the error frame. This prevents any other ECU from receiving the fraudulent data frame and performing the corresponding process. When a data frame is received, if the same message ID as the received message ID is not included in the fraudulent-ID list, the fraud-sensing ECU 4100a continues reception of the data frame (sequence S4019), and executes the procedure in sequences S4004 to S4014.

4.11 Advantageous Effects of Fourth Embodiment

In the in-vehicle network system 13 illustrated in the fourth embodiment, if the verification of the MAC in the data frame fails because the synchronization of updating of MAC keys or resetting of counter values is not taken between a fraud-sensing ECU and an authorized ECU, an update frame transmitted from a fraud-sensing ECU to provide instructions to update a MAC key or reset a counter value may allow the synchronization failure to be overcome. In addition, a fraudulent ECU that fails to correctly update a MAC key and reset a counter value can be identified, and any other ECU may be prevented from performing a process based on a frame from the fraudulent ECU in accordance with the frame. In addition, a security condition table, which appropriately defines processes for taking measures in accordance with, for example, the number of times a fraudulent data frame is detected through the verification of the MAC, may take measures against fraud.

Other Embodiments

As described above, the first to fourth embodiments have been described as illustrative examples of the technique according to the present disclosure. However, the technique according to the present disclosure is not limited to these embodiments and is also applicable to embodiments in which modifications, replacements, additions, omissions, and others are made as desired. For example, the following modifications are also included in embodiments of the present disclosure.

(1) While the embodiments described above provide an example in which frames are periodically transmitted from individual ECUs, a frame may be transmitted as an event that provides notification of a state change. For example, each ECU may transmit a frame only when the open or closed state of the door is changed, rather than periodically transmitting the open or closed state of the door. Alternatively, each ECU may periodically transmit a frame and also transmit a frame when a state change occurs.

(2) In the embodiments described above, a MAC is generated (calculated) through arithmetic procedure based on a message ID, a data value, and a counter value. It is sufficient to reflect the content of part of a data frame (that is, based on the content of part of the data frame) to generate a MAC, and a MAC may be generated by using only a data value. Alternatively, a MAC may be generated by using only a counter value. It is desirable that a MAC verification scheme by an ECU that receives a data frame be a scheme corresponding to that in which an ECU that transmits a data frame assigns a MAC to the data frame. In addition, the data frame to which a MAC is assigned may include, in addition to the data value and the MAC, some or all the counter values in the data field. Furthermore, the size of the MAC included in a frame is not limited to 4 bytes and may be different from one transmission to another. Likewise, the size of the data value, such as the average speed per hour, and the size of the counter value are also not limited to 1 byte.

(3) While the embodiments described above provide an example in which a counter value is incremented for each transmission, a counter value may be a value that is incremented automatically with time. Alternatively, the value of a time itself may be used instead of that of a counter. That is, generation of a MAC based on a variable (such as a counter or a time) changing each time a data frame is transmitted can make fraudulent interpretation of the MAC difficult. In addition, the arithmetic procedure of the value of a counter is not limited to increment (increase by 1). Alternatively, the increase by 2 or more may be applied, or counting down by decrement may be used instead of counting up by increment. In addition, the arithmetic procedure of the counter value may be, for example, bit shifting or an arithmetic procedure or the like in which an output value specified in accordance with a predetermined algorithm by using the result of the previous arithmetic procedure as an input value is a result of the arithmetic procedure.

(4) In the embodiments described above, a data frame in the CAN protocol is configured in the standard ID format. The data frame may be in an extended ID format. In the extended ID format, an ID (message ID) is expressed in 29 bits in which the base ID at the ID position in the standard ID format and an ID extension are combined. This 29-bit ID may be handled as an ID (message ID) in the embodiments described above.

(5) In the embodiments described above, HMAC is used as a MAC calculation algorithm. Alternatively, CBC-MAC (Cipher Block Chaining Message Authentication Code) or CMAC (Cipher-based MAC) may be used. In addition, padding used in MAC computation may be any type of padding in which the data size of a block is necessary for computation, such as zero padding or that in ISO 10126, PKCS#1, PKCS#5, or PKCS#7. Furthermore, also in the method of changing the size to that of a block such as 4 bytes, padding may be provided either at the beginning, end, or in the middle. Furthermore, data used for MAC calculation may not necessarily be data that is consecutive (for example, continuous data of 4 bytes), but may be a composite one configured through bit-by-bit collection in accordance with a specific rule.

(6) The fraudulent frame sensing unit and the fraudulent MAC sensing unit illustrated in the embodiments described above may be implemented by hardware called a CAN controller or by firmware running on a processor that operates when connected to the CAN controller. In addition, the MAC key holding unit, the counter holding unit, the authorized-ID list holding unit, the data range list holding unit, the fraudulent-ID list holding unit, and the security condition holding unit may be stored in a register of hardware called a CAN controller or in firmware running on a processor that operates when connected to the CAN controller.

(7) The security condition table in the embodiment described above is an example, and may have values different from the values illustrated by way example or define a plurality of conditions. In addition, the security condition table is set in a fraud-sensing ECU in advance. Alternatively, the security condition table may be set at the time of the shipment of the in-vehicle network system or at the time of the shipment of a vehicle body in which the in-vehicle network system is to be installed. Some kind of information such as the security condition table described above may be updated after the information is held in the security condition holding unit, or some kind of information such as the security condition table may be set based on communication with the outside, set using various recording media and the like, or set by using a certain type of tool or the like.

(8) In the embodiments described above, one MAC key is held for each message ID. Alternatively, one MAC key may be used for each ECU (that is, for every one or more message ID groups). In addition, not all the ECUs may need to hold the same MAC key. In addition, ECUs connected to the same bus may hold a common MAC key. Note that an ECU that transmits a frame with the same message ID and an ECU that receives and verifies the frame need to hold the same MAC key. In addition, as to the range within which an identical MAC key is held, the same key may be used for even ECUs connected to different buses, the same key per vehicle, the same key for the same type of vehicle, the same key for each same producer, the same key for even different producers, or any other pattern may be used. MAC keys before and after an update may be encrypted by and held in the MAC key holding unit.

(9) In the embodiments described above, one counter value is held for each message ID. Alternatively, one counter value may be used for each ECU (that is, for every one or more message ID groups). In addition, a common counter value may be used for all the frames flowing in the same bus.

(10) In the embodiments described above, a head unit is notified of the transmission of a fraudulent frame when a fraud-sensing ECU has failed to verify the MAC (when the number of times the failure has occurred exceeds a threshold). The head unit may notify a server device or the like located outside the in-vehicle network system of information on the fraud by using communication. This enables the external server device or the like to collect information on frauds caused in the in-vehicle network system. In addition, upon being notified of the transmission of a fraudulent frame, the head unit may notify the driver of this with display indication, buzzer alarming, or the like. In the embodiments described above, furthermore, control is performed so that the state of the vehicle is brought into the safe state when a fraud-sensing ECU has failed to verify the MAC (when the number of times the failure has occurred exceeds a threshold). This control is sufficient to impose certain limitations on the function of the vehicle to bring the vehicle into a predetermined specific state. Examples of the control for bringing the vehicle into the specific state include controlling some mechanisms of the vehicle, and transmitting via a bus a frame for instructing one or a plurality of ECUs to control some mechanisms of the vehicle.

(11) Instead of a fraud-sensing ECU transmitting a key-update & counter-reset frame in response to a failure in the verification of the MAC in the embodiment described above, a fraud-sensing ECU may use only either of a key-update frame and a counter-reset frame. For example, in a case where each of ECUs including a fraud-sensing ECU does not use a counter value to generate a MAC or uses a counter value but does not reset the counter value, it is useful for the fraud-sensing ECU to transmit only a key-update frame among update frames in response to a failure in the verification of the MAC. In addition, when the verification of the MAC in a data frame received by a fraud-sensing ECU has failed, an ECU and the fraud-sensing ECU on the transmission side and reception side of a data frame with the same message ID as that of the data frame may synchronously update MAC keys or reset counter values by using a method other than that for transmitting and receiving an update frame (such as by exchanging signals via a communication path that is not based on the CAN protocol).

(12) The CAN protocol illustrated in the embodiments described above may have a broad meaning also including its derivative protocols, such as TTCAN (Time-Triggered CAN) and CAN FD (CAN with Flexible Data Rate).

(13) The individual ECUs (including a fraud-sensing ECU, a gateway, and a head unit) in the embodiments described above are each assumed to be a device including, for example, digital circuits such as a processor and a memory, analog circuits, a communication circuit, and so forth, but may include other hardware components such as a hard disk drive, a display, a keyboard, and a mouse. In addition, instead of a control program stored in a memory being executed by a processor to implement functions in software, the functions may be implemented by dedicated hardware (such as a digital circuit).

(14) Some or all of the constituent elements included in each device in the embodiments described above may be constituted by a single system LSI (Large Scale Integration). The system LSI is a super-multifunctional LSI manufactured by integrating a plurality of configuration units on one chip, and is specifically a computer system configured to include a microprocessor, a ROM, a RAM, and so forth. The RAM has recorded thereon a computer program. The microprocessor operates in accordance with the computer program, thereby allowing the system LSI to achieve its function. In addition, constituent units included in each device may be integrated into individual chips or into a single chip that includes some or all of the units. While the system LSI is used here, an integrated circuit may also be referred to as an IC, an LSI, a super LSI, or an ultra LSI depending on the difference in the degree of integration. In addition, a technique for forming an integrated circuit is not limited to the LSI, and may be implemented by using a dedicated circuit or a general-purpose processor. FPGA (Field Programmable Gate Array) that can be programmed after the manufacture of the LSI or a reconfigurable processor capable of reconfiguring connection or setting of circuit cells in the LSI may be used. Additionally, if a technique for forming an integrated circuit is introduced in place of the LSI along with development in semiconductor technology or other derivative technology, it is a matter of course that the technique may be used for the integration of functional blocks. One potential approach is to apply biotechnology, for example.

(15) Some or all of the constituent elements included in each of the devices described above may be constituted by an IC card removably set in each device or a stand-alone module. The IC card or the module is a computer system constituted by a microprocessor, a ROM, a RAM, and so forth. The IC card or the module may include the super-multifunctional LSI described above. The microprocessor operates in accordance with a computer program, thereby allowing the IC card or the module to achieve its function. This IC card or module may be tamper-resistant.

(16) An aspect of the present disclosure may provide a method such as the anti-fraud method described above. An aspect of the present disclosure may also provide a computer program for implementing these methods by using a computer, or a digital signal including the computer program. In an aspect of the present disclosure, furthermore, the computer program or the digital signal may be recorded on a computer-readable recording medium such as a flexible disk, a hard disk, a CD-ROM, an MO, a DVD, a DVD-ROM, a DVD-RAM, a BD (Blu-ray (registered trademark) Disc), or a semiconductor memory. An aspect of the present disclosure may also provide the digital signal recorded on such recording media. In an aspect of the present disclosure, furthermore, the computer program or the digital signal may be transmitted via a telecommunication line, a wireless or wired communication line, a network represented by the Internet, data broadcasting, or the like. A further aspect of the present disclosure may provide a computer system including a microprocessor and a memory, in which the memory has recorded thereon the computer program described above and the microprocessor operates in accordance with the computer program. Moreover, the program or the digital signal may be recorded on the recording medium and transported, or the program or the digital signal may be transported via the network or the like, so as to be performed by any other independent computer system.

(17) Embodiments achieved by any combination of constituent elements and functions illustrated in the embodiments described above and the modifications described above also fall within the scope of the present disclosure.

The present disclosure is applicable for measures against the transmission of a fraudulent frame in an in-vehicle network system.

What is claimed is:

1. An anti-fraud method for use in an in-vehicle network system including a plurality of electronic control units that exchange data frames, each having added thereto a message authentication code (MAC), via at least one bus in accordance with a Controller Area Network (CAN) protocol, the anti-fraud method comprising:
receiving a data frame transmitted on the at least one bus;
generating a first MAC by using a MAC key and a value of a counter that counts a number of times a data frame having added thereto a MAC is transmitted;
performing verification that the data frame received has added thereto the first MAC;
incrementing a number of error occurrences when the verification has failed for the data frame, the data frame including a predetermined message ID; and executing, when the number of error occurrences exceeds a predetermined threshold, a process associated in advance with the predetermined message ID.

2. The method according to claim 1, wherein
when the predetermined message ID is identical to any of one or more message IDs indicated in a predetermined fraudulent-ID list, the process associated in advance with the predetermined message ID comprises adding the predetermined message ID to the fraudulent-ID list.

3. The method according to claim 1, wherein
the process associated in advance with the predetermined message ID comprises transmitting a frame including information indicating that a fraudulent frame has been transmitted.

4. The method according to claim 1, wherein
the process associated in advance with the predetermined message ID comprises a control for imposing certain limitations on a function of a vehicle in which the in-vehicle network system is installed to bring the vehicle to a predetermined specific state.

5. The method according to claim 4, wherein
the control comprises a control for limiting a speed of the vehicle to a certain speed or less.

6. The method according to claim 4, wherein
the control comprises generating a predetermined frame for changing a state of the vehicle to the predetermined specific state, and transmitting the predetermined frame.

7. The method according to claim 1, further comprising:
transmitting, when a message ID of a data frame that has started to be transmitted on the at least one bus is identical to any of one or more message IDs indicated in a predetermined fraudulent-ID list, an error frame before an end of the data frame is transmitted, wherein
the process associated in advance with the predetermined message ID comprises adding the predetermined message ID to the fraudulent-ID list.

8. The method according to claim 1, wherein
the process associated in advance with the predetermined message ID comprises recording log information indicating the predetermined message ID on a recording medium.

9. The method according to claim 1, wherein
the at least one bus includes a plurality of buses, each of the plurality of buses belonging to any group among a plurality of types of groups, and
the method further comprises executing, when the verification has failed, by each of the plurality of electronic control units, a process determined in advance in association with a group to which one of the plurality of buses that is connected with the electronic control unit belongs.

10. The method according to claim 1, wherein
a message ID of a data frame that has started to be transmitted on the bus belongs to any group among a plurality of types of groups, and
the method further comprises executing, when a number of times the verification has failed for a data frame including a predetermined message ID belonging to a predetermined group exceeds a predetermined threshold, a process associated in advance with the predetermined group.

11. The method according to claim 1, further comprising:
transmitting, via the at least one bus, a counter-reset frame indicating a request for resetting the counter in response to a failure of re-verification performed using a second MAC, the second MAC being generated using a MAC key before updating of the MAC key, when the verification has failed; and
resetting the counter in response to transmission of the counter-reset frame.

12. An in-vehicle network system including a plurality of electronic control units that exchange data frames, each having added thereto a message authentication code (MAC), via at least one bus in accordance with a Controller Area Network (CAN) protocol, the in-vehicle network system comprising:
a first electronic control unit comprising
one or more memories; and
circuitry configured to:
generate a first MAC using a first MAC key and a value of a first counter that counts a number of times a data frame having added thereto a MAC has been transmitted,
add the first MAC to a data frame, and
transmit the data frame on the at least one bus; and
a second electronic control unit comprising
one or more memories; and
circuitry configured to:
receive the data frame transmitted on the at least one bus,
generate a second MAC by using a second MAC key and a value of a second counter that counts a number of times a data frame having added thereto a MAC has been received,
perform verification that the data frame received has added thereto the second MAC,
increment a number of error occurrences when the verification has failed for the data frame, the data frame including a predetermined message ID, and
execute, when the number of error occurrences exceeds a predetermined threshold, a process associated in advance with the predetermined message ID.

13. An electronic control unit for performing communication via a bus in accordance with a Controller Area Network (CAN) protocol, the electronic control unit comprising:
one or more memories; and
circuitry configured to:
receive a data frame from the bus,
generate a first message authentication code (MAC) using a MAC key and a value of a counter that counts a number of times a data frame having added thereto a MAC has been received,
perform verification that the data frame received has added thereto the first MAC,
increment a number of error occurrences when the verification has failed for the data frame, the data frame including a predetermined message ID, and
execute, when the number of error occurrences exceeds a predetermined threshold, a process associated in advance with the predetermined message ID.

* * * * *